United States Patent
Ofran et al.

(10) Patent No.: US 12,552,844 B2
(45) Date of Patent: Feb. 17, 2026

(54) DE-EPITOPED ALPHA GLIADIN AND USE OF SAME FOR THE MANAGEMENT OF CELIAC DISEASE AND GLUTEN SENSITIVITY

(71) Applicant: Ukko Inc., San Francisco, CA (US)

(72) Inventors: Yanay Ofran, Tel Aviv (IL); Moshe Ben-David, Rehovot (IL); Assaf Biran, Tel-Aviv (IL); Shiri Zakin, Sde Warburg (IL); Orly Marcu Garber, Modi'in (IL); Anna Chuprin, Tel Aviv (IL)

(73) Assignee: Ukko Inc., San Francisco, CA (US)

( * ) Notice: Subject to any disclaimer, the term of this patent is extended or adjusted under 35 U.S.C. 154(b) by 806 days.

(21) Appl. No.: 17/624,600

(22) PCT Filed: Jul. 2, 2020

(86) PCT No.: PCT/IB2020/056263
§ 371 (c)(1),
(2) Date: Jan. 4, 2022

(87) PCT Pub. No.: WO2021/001784
PCT Pub. Date: Jan. 7, 2021

(65) Prior Publication Data
US 2022/0251148 A1    Aug. 11, 2022

Related U.S. Application Data

(60) Provisional application No. 62/870,695, filed on Jul. 4, 2019.

(51) Int. Cl.
*C07K 14/415*    (2006.01)
*A21D 13/066*   (2017.01)
*A23L 33/185*   (2016.01)
*C12N 15/82*    (2006.01)

(52) U.S. Cl.
CPC .......... *C07K 14/415* (2013.01); *A21D 13/066* (2013.01); *A23L 33/185* (2016.08); *C12N 15/8251* (2013.01); *C12N 15/8257* (2013.01)

(58) Field of Classification Search
None
See application file for complete search history.

(56) References Cited

U.S. PATENT DOCUMENTS

| | | |
|---|---|---|
| 3,791,932 A | 2/1974 | Schuurs et al. |
| 3,839,153 A | 10/1974 | Schuurs et al. |
| 3,850,578 A | 11/1974 | Mcconnell |
| 3,850,752 A | 11/1974 | Schuurs et al. |
| 3,853,987 A | 12/1974 | Dreyer |
| 3,867,517 A | 2/1975 | Ling |
| 3,879,262 A | 4/1975 | Schuurs et al. |
| 3,901,654 A | 8/1975 | Gross |
| 3,935,074 A | 1/1976 | Rubenstein et al. |
| 3,984,533 A | 10/1976 | Uzgiris |
| 3,996,345 A | 12/1976 | Ullman et al. |
| 4,034,074 A | 7/1977 | Miles |
| 4,098,876 A | 7/1978 | Piasio et al. |
| 4,666,828 A | 5/1987 | Gusella |
| 4,683,202 A | 7/1987 | Mullis |
| 4,801,531 A | 1/1989 | Frossard |
| 4,855,237 A | 8/1989 | Morinaga et al. |
| 4,879,219 A | 11/1989 | Wands et al. |
| 5,011,771 A | 4/1991 | Bellet et al. |
| 5,192,659 A | 3/1993 | Simons |
| 5,268,463 A | 12/1993 | Jefferson |
| 5,272,057 A | 12/1993 | Smulson et al. |
| 5,281,521 A | 1/1994 | Trojanowski et al. |
| 5,316,931 A | 5/1994 | Donson et al. |
| 5,399,680 A | 3/1995 | Zhu et al. |
| 5,464,764 A | 11/1995 | Capecchi et al. |
| 5,464,765 A | 11/1995 | Coffee et al. |
| 5,466,785 A | 11/1995 | de Framond |
| 5,487,992 A | 1/1996 | Capecchi et al. |
| 5,569,597 A | 10/1996 | Grimsley et al. |
| 5,604,121 A | 2/1997 | Hilder et al. |
| 5,608,142 A | 3/1997 | Barton et al. |
| 5,608,144 A | 3/1997 | Baden et al. |
| 5,608,149 A | 3/1997 | Barry et al. |
| 5,659,026 A | 8/1997 | Baszczynski et al. |
| 6,774,279 B2 | 8/2004 | Dymecki |
| 8,021,867 B2 | 9/2011 | Smith et al. |
| 8,119,381 B2 | 2/2012 | Smith et al. |
| 8,124,369 B2 | 2/2012 | Smith et al. |
| 8,129,134 B2 | 3/2012 | Smith et al. |
| 8,133,697 B2 | 3/2012 | Smith et al. |
| 8,143,015 B2 | 3/2012 | Smith et al. |

(Continued)

FOREIGN PATENT DOCUMENTS

| | | |
|---|---|---|
| JP | 6314693 B2 | 4/2018 |
| WO | WO-1987006261 A1 | 10/1987 |

(Continued)

OTHER PUBLICATIONS

Mitea, et al., PLoS One 5.12 (2010): e15637 (Year: 2010).*
Spangler et al (Annu Rev Immunol. Mar. 21, 2015; 33: 139-167) (Year: 2015).*
Miosge et al (Proc Natl Acad Sci U S A. Sep. 15, 2015;112(37):E5189-98) (Year: 2015).*
Lee et al (Nat Rev Mol Cell Biol. Dec. 2007;8(12):995-1005) (Year: 2007).*
Bowie et al. (Science, 1990, 247:1306-1310) (Year: 1990).*
Burgess et al. (J. Cell Biol. 111:2129-2138, 1990) (Year: 1990).*
Lazar et al. (Mol. Cell. Biol., 8:1247-1252, 1988) (Year: 1988).*
Bork (Genome Research, 2000, 10:398-400) (Year: 2000).*

(Continued)

*Primary Examiner* — Brian Gangle
*Assistant Examiner* — Andrea K McCollum
(74) *Attorney, Agent, or Firm* — Mark S. Cohen; PEARL COHEN ZEDEK LATZER BARATZ LLP

(57) ABSTRACT

A de-epitoped alpha gliadin is provided. Methods of generating same and uses thereof are also provided.

8 Claims, 8 Drawing Sheets
Specification includes a Sequence Listing.

(56) References Cited

U.S. PATENT DOCUMENTS

| | | | |
|---|---|---|---|
| 8,143,016 | B2 | 3/2012 | Smith et al. |
| 8,148,098 | B2 | 4/2012 | Smith et al. |
| 8,163,514 | B2 | 4/2012 | Smith et al. |
| 8,304,222 | B1 | 11/2012 | Smith et al. |
| 8,586,526 | B2 | 11/2013 | Gregory et al. |
| 8,771,945 | B1 | 7/2014 | Zhang |
| 2002/0019009 | A1 | 2/2002 | Roggen et al. |
| 2003/0232410 | A1 | 12/2003 | Liljedahl et al. |
| 2005/0026157 | A1 | 2/2005 | Baltimore et al. |
| 2006/0014264 | A1 | 1/2006 | Sauer et al. |
| 2006/0178299 | A1 | 8/2006 | Anderson et al. |
| 2016/0338366 | A1 | 11/2016 | Elituv et al. |
| 2020/0124615 | A1 | 4/2020 | Ofran |

FOREIGN PATENT DOCUMENTS

| | | | | |
|---|---|---|---|---|
| WO | WO-2003104273 | A2 | 12/2003 | |
| WO | WO-2005105129 | A2 * | 11/2005 | ............. A23L 33/17 |
| WO | WO-2009071334 | A2 | 6/2009 | |
| WO | WO-2011146121 | A1 | 11/2011 | |
| WO | WO-2011157806 | A1 | 12/2011 | |
| WO | 2013/017591 | A1 | 2/2013 | |
| WO | WO-2014085593 | A1 | 6/2014 | |
| WO | 2016/086185 | A1 | 6/2016 | |
| WO | WO-2018122771 | A1 | 7/2018 | |
| WO | WO-2020008412 | A1 | 1/2020 | |
| WO | 2021/001784 | A1 | 1/2021 | |

OTHER PUBLICATIONS

Kasarda et al (Proceedings of the National Academy of Sciences of the United States of America, vol. 81, No. 15, [Part 1: Biological Sciences] (Aug. 1, 1984), pp. 4712-4716) (Year: 1984).*
Altschul, S. F. et al. (1990). Basic local alignment search tool. *Journal of Molecular Biology*, 215(3), 403-410.
Altschul, S. F. et al. (1997). Gapped BLAST and PSI-BLAST: a new generation of protein database search programs. *Nucleic Acids Research*, 25(17), 3389-3402.
Anderson. R. P. et al. (2005). T cells in peripheral blood after gluten challenge in coeliac disease. *Gut*, 54(9), 1217-1223.
Atreya, C. D. et al. (1992). Site-directed mutations in the potyvirus HC-Pro gene affect helper component activity, virus accumulation, and symptom expression in infected tobacco plants. *Virology*, 191(1), 106-111.
Ausubel, F. M. (Ed.). (1987). Current protocols in molecular biology. *Greene Pub. Associates and Wiley-Interscience*. Whole Book.
Booth, R. J. et al. (1988). The use of a 'universal' yeast expression vector to produce an antigenic protein of *Mycobacterium leprae*. *Immunology Letters*, 19(1), 65-69.
Brottveit, M. et al. (2011). Assessing possible celiac disease by an HLA-DQ2-gliadin tetramer test. *Official Journal of the American College of Gastroenterology, ACG*, 106(7), 1318-1324.
Bui, M. et al. (2009). Simple allele-discriminating PCR for cost-effective and rapid genotyping and mapping. *Plant Methods*, 5(1), 1-8.
Capecchi, M. R. (1989). Altering the genome by homologous recombination. *Science*, 244(4910), 1288-1292.
Carlson, D. F. et al. (2012). Efficient TALEN-mediated gene knock-out in livestock. *Proceedings of the National Academy of Sciences*, 109(43), 17382-17387.
Castelli, F. et al. (2000). Thermoanalytical characterization of high molecular weight glutenin subunits: Water effect on their glass transition. *Thermochimica Acta*, 346(1-2), 153-160.
Celis J. E., (Ed.) (2006). Cell Biology: A Laboratory Handbook. 3rd Edition, Institute of Cancer Biology, Danish Cancer Society, vols. I-III, Elsevier Academic Press—Whole Book.
Cermak, T. et al. (2011). Efficient design and assembly of custom TALEN and other TAL effector-based constructs for DNA targeting. *Nucleic Acids Research*, 39(12), e82-e82.

Certo, M. T. et al. (2012). Coupling endonucleases with DNA end-processing enzymes to drive gene disruption. *Nature Methods*, 9(10), 973-975.
Chang, P. L. (1995). Somatic gene therapy. *CRC Press*. Whole Book.
Chao, G. et al. (2006). Isolating and engineering human antibodies using yeast surface display. *Nature Protocols*, 1(2), 755-768.
Cho, S. W. et al. (2013). Targeted genome engineering in human cells with the Cas9 RNA-guided endonuclease. *Nature Biotechnology*, 31(3), 230-232.
Christensen, A. H. et al. (1992). Maize polyubiquitin genes: structure, thermal perturbation of expression and transcript splicing, and promoter activity following transfer to protoplasts by electroporation. *Plant Molecular Biology*, 18(4), 675-689.
Christian, M. et al. (2010). Targeting DNA double-strand breaks with TAL effector nucleases. *Genetics*, 186(2), 757-761.
Chum, P. Y. et al. (2012). Genotyping of plant and animal samples without prior DNA purification. *JoVE (Journal of Visualized Experiments)*, (67), e3844.
Coligan J.E. (Ed.) (2010). Current Protocols in Immunology. John Wiley & Sons, Inc.—Whole Book.
Cong, L. et al. (2013). Multiplex genome engineering using CRISPR/Cas systems. *Science*, 339(6121), 819-823.
Dahesh, M. et al. (2014). Polymeric assembly of gluten proteins in an aqueous ethanol solvent. *The Journal of Physical Chemistry B*, 118(38), 11065-11076.
Dawson, W. O. et al. (1989). A tobacco mosaic virus-hybrid expresses and loses an added gene. *Virology*, 172(1), 285-292.
Dicarlo, J. E. et al. (2013). Genome engineering in *Saccharomyces cerevisiae* using CRISPR-Cas systems. *Nucleic Acids Research*, 41(7), 4336-4343.
Egorov, T. A. et al. (1998). Characterisation of high M r wheat glutenin polymers by agarose gel eletrophoresis and dynamic light scattering. *FEBS Letters*, 434(1-2), 215-217.
Eliezer, D. (2009). Biophysical characterization of intrinsically disordered proteins. *Current Opinion in Structural Biology*, 19(1), 23-30.
Field, J. M. et al. (1987). The structure of a high-M r subunit of durum-wheat (*Triticum durum*) gluten. *Biochemical Journal*, 247(1), 215-221.
Foster, G. D. et al. (Eds.). (1998). Plant virology protocols: from virus isolation to transgenic resistance (vol. 81). *Springer Science & Business Media* —Whole Book.
French, R. et al. (1986). Bacterial gene inserted in an engineered RNA virus: efficient expression in monocotyledonous plant cells. *Science*, 231(4743), 1294-1297.
Freshney I. R et al. (Eds.) (2006). Culture of Animal Cells—A Manual of Basic Technique. Fifth Edition, John Wiley & Sons, Inc.—Whole Book.
Fromm, M. E. et al. (1986). Stable transformation of maize after gene transfer by electroporation. *Nature*, 319(6056), 791-793.
Gadaleta, A. G. A. T. A. et al. (2008). Stably expressed D-genome-derived HMW glutenin subunit genes transformed into different durum wheat genotypes change dough mixing properties. *Molecular Breeding*, 22(2), 267-279.
Gal-On, A. et al. (1992). A zucchini yellow mosaic virus coat protein gene mutation restores aphid transmissibility but has No. effect on multiplication. *Journal of General Virology*, 73(9), 2183-2187.
Gardella, T. J. et al. (1990). Expression of human parathyroid hormone-(1-84) in *Escherichia coli* as a factor X-cleavable fusion protein. *Journal of Biological Chemistry*, 265(26), 15854-15859.
Gibbs, E. B. et al. (2015). Quantitative biophysical characterization of intrinsically disordered proteins. *Biochemistry*, 54(6), 1314-1326.
Gotor, C. et al. (1993). Analysis of three tissue-specific elements from the wheat Cab-1 enhancer. *The Plant Journal*, 3(4), 509-518.
Herman, A. et al. (2007). Incorporating Synthetic Oligonucleotides via Gene Reassembly (ISOR): a versatile tool for generating targeted libraries. *Protein Engineering, Design & Selection*, 20(5), 219-226.

(56) References Cited

OTHER PUBLICATIONS

Huet, H. et al. (1994). Mutations in the helper component protease gene of zucchini yellow mosaic virus affect its ability to mediate aphid transmissibility. *Journal of General Virology*, 75(6), 1407-1414.
Hwang, W. Y. et al. (2013). Efficient genome editing in zebrafish using a CRISPR-Cas system. *Nature Biotechnology*, 31(3), 227-229.
Innis, M. A. et al. (Eds.). (1990). PCR protocols: a guide to methods and applications. Academic Press—Whole Book.
International Search Report and Written Opinion of the International Searching Authority dated Sep. 30, 2020, issued for the corresponding PCT International Application No. PCT/IB2020/056263, dated Jul. 2, 2020.
Ishida, Y. et al. (1996). High efficiency transformation of maize (*Zea mays* L.) mediated by Agrobacterium tumefaciens. *Nature Biotechnology*, 14(6), 745-750.
Ishida, Y. et al. (2015). Wheat (*Triticum aestivum* L.) transformation using immature embryos. In *Agrobacterium Protocols* (pp. 189-198). Springer, New York, NY.
Izsvak, Z. et al. (2004). Sleeping beauty transposition: biology and applications for molecular therapy. *Molecular Therapy*, 9(2), 147-156.
Jinek, M. et al. (2012). A programmable dual-RNA-guided DNA endonuclease in adaptive bacterial immunity. *Science*, 337(6096), 816-821.
Jinek, M. et al. (2013). RNA-programmed genome editing in human cells. *Elife*, 2, e00471.
Jo, Y. M. et al. (2017). Cellular localization of wheat high molecular weight glutenin subunits in transgenic rice grain. *International Journal of Molecular Sciences*, 18(11), 2458.
Karlin, S. et al. (1990). Methods for assessing the statistical significance of molecular sequence features by using general scoring schemes. *Proceedings of the National Academy of Sciences*, 87(6), 2264-2268.
Karlin, S. et al. (1993). Applications and statistics for multiple high-scoring segments in molecular sequences. *Proceedings of the National Academy of Sciences*, 90(12), 5873-5877.
Kawakami, K. et al. (2000). Identification of a functional transposase of the Tol2 element, an Ac-like element from the Japanese medaka fish, and its transposition in the zebrafish germ lineage. *Proceedings of the National Academy of Sciences*, 97(21), 11403-11408.
Kim, Y. G. et al. (1996). Hybrid restriction enzymes: zinc finger fusions to Fok I cleavage domain. *Proceedings of the National Academy of Sciences*, 93(3), 1156-1160.
Klee, H. et al. (1987). Agrobacterium-mediated plant transformation and its further applications to plant biology. *Annual Review of Plant Physiology*, 38(1), 467-486.
Klein, T. M. et al. (1988). Factors influencing gene delivery into *Zea mays* cells by high-velocity microprojectiles. *Bio/technology*, 6(5), 559-563.
Kooy-Winkelaar, Y. et al. (2011). Gluten-specific T cells cross-react between HLA-DQ8 and the HLA-DQ2α/DQ8β transdimer. *The Journal of Immunology*, 187(10), 5123-5129.
Kumar, R. et al. (2002). Human genome search in celiac disease: mutated gliadin T-cell-like epitope in two human proteins promotes T-cell activation. *Journal of Molecular Biology*, 319(3), 593-602.
Kurihara, Y. et al. (2003). Cross-protection in *Arabidopsis* against crucifer tobamovirus Cg by an attenuated strain of the virus. *Molecular Plant Pathology*, 4(4), 259-269.
Kwon, H. B. et al. (1994). Identification of a light-responsive region of the nuclear gene encoding the B subunit of chloroplast glyceraldehyde 3-phosphate dehydrogenase from *Arabidopsis thaliana*. *Plant Physiology*, 105(1), 357-367.
Lanio, T. et al. (2000). Automated purification of His6-tagged proteins allows exhaustive screening of libraries generated by random mutagenesis. *Biotechniques*, 29(2), 338-342.
Last, D. I. et al. (1991). pEmu: an improved promoter for gene expression in cereal cells. *Theoretical and applied genetics*, 81(5), 581-588.
Lee, H. J. et al. (2010). Targeted chromosomal deletions in human cells using zinc finger nucleases. *Genome Research*, 20(1), 81-89.
Li, T. et al. (2011). TAL nucleases (TALNs): hybrid proteins composed of TAL effectors and FokI DNA-cleavage domain. *Nucleic Acids Research*, 39(1), 359-372.
Liang, Z. et al. (2018). Genome editing of bread wheat using biolistic delivery of CRISPR/Cas9 in vitro transcripts or ribonucleoproteins. *Nature Protocols*, 13(3), 413-430.
Liang, Z. et al. (2018). Genotyping genome-edited mutations in plants using CRISPR ribonucleoprotein complexes. *Plant Biotechnology Journal*, 16(12), 2053-2062.
McCabe, D. E. et al. (1988). Stable transformation of soybean (*Glycine max*) by particle acceleration. *Bio/technology*, 6(8), 923-926.
Mahfouz, M. M. et al. (2011). De novo-engineered transcription activator-like effector(TALE) hybrid nuclease with novel DNA binding specificity creates double-strand breaks. *Proceedings of the National Academy of Sciences*, 108(6), 2623-2628.
Mali, P. et al. (2013). CAS9 transcriptional activators for target specificity screening and paired nickases for cooperative genome engineering. *Nature Biotechnology*, 31(9), 833-838.
Maramorosch, K. et al (Eds.) (1984). Methods in Virology: vol. 8. Academic Press—Whole Book.
Matsuoka, M. et al. (1993). Tissue-specific light-regulated expression directed by the promoter of a C4 gene, maize pyruvate, orthophosphate dikinase, in a C3 plant, rice. *Proceedings of the National Academy of Sciences*, 90(20), 9586-9590.
McElroy, D. et al. (1990). Isolation of an efficient actin promoter for use in rice transformation. *The Plant Cell*, 2(2), 163-171.
Menke, D. B. (2013). Engineering subtle targeted mutations into the mouse genome. *Genesis*, 51(9), 605-618.
Miller, J. C. et al. (2011). A TALE nuclease architecture for efficient genome editing. *Nature Biotechnology*, 29(2), 143-148.
Miskey, C. et al. (2003). The Frog Prince: a reconstructed transposon from Rana pipiens with high transpositional activity in vertebrate cells. *Nucleic Acids Research*, 31(23), 6873-6881.
Mitea, C. et al. (2010). A universal approach to eliminate antigenic properties of alpha-gliadin peptides in celiac disease. *PLoS One*, 5(12), e15637.
Molberg, O. et al. (1997). Gliadin specific, HLA DQ2-restricted T cells are commonly found in small intestinal biopsies from coeliac disease patients, but not from controls. *Scandinavian Journal of Immunology*, 46(3), 103-109.
Neuhaus, G. et al. (1987). Transgenic rapeseed plants obtained by the microinjection of DNA into microspore-derived embryoids. *Theoretical and Applied Genetics*, 75(1), 30-36.
Neuhaus, G. et al. (1990). Plant transformation by microinjection techniques. *Physiologia Plantarum*, 79(1), 213-217.
Ni, M. et al. (1995). Strength and tissue specificity of chimeric promoters derived from the octopine and mannopine synthase genes. *The Plant Journal*, 7(4), 661-676.
Odell, J. T. et al. (1985). Identification of DNA sequences required for activity of the cauliflower mosaic virus 35S promoter. *Nature*, 313(6005), 810-812.
Ohta, Y. (1986). High-efficiency genetic transformation of maize by a mixture of pollen and exogenous DNA. *Proceedings of the National Academy of Sciences*, 83(3), 715-719.
Orozco, B. M. et al. (1993). Localization of light-inducible and tissue-specific regions of the spinach ribulose bisphosphate carboxylase/oxygenase (rubisco) activase promoter in transgenic tobacco plants. *Plant Molecular Biology*, 23(6), 1129-1138.
Ozuna Serafini, C. V. et al. (2015). Diversification of the celiac disease α-gliadin complex in wheat: A 33-mer peptide with six overlapping epitopes, evolved following polyploidization. *Plant Journal*, 82 (5), 794-805.
Patrascu, L. et al. (2017). Effect of gluten, egg and soy proteins on the rheological and thermo-mechanical properties of wholegrain rice flour. *Food Science and Technology International*, 23(2), 142-155.
Petersen, J. et al. (2014). T-cell receptor recognition of HLA-DQ2-gliadin complexes associated with celiac disease. *Nature Structural & Molecular Biology*, 21(5), 480-488.

(56) References Cited

OTHER PUBLICATIONS

Popineau, Y. et al. (2001). Prolamin aggregation, gluten viscoelasticity, and mixing properties of transgenic wheat lines expressing 1Ax and 1Dx high molecular weight glutenin subunit transgenes. *Journal of Agricultural and Food Chemistry*, 49(1), 395-401.
Potrykus, I. (1991). Gene transfer to plants: assessment of published approaches and results. *Annual Review of Plant Biology*, 42(1), 205-225.
Qiao. S. W. et al. (2011). Posttranslational modification of gluten shapes TCR usage in celiac disease. *The Journal of Immunology*, 187(6), 3064-3071.
Qu, L. Q. et al. (2008). Expression pattern and activity of six glutelin gene promoters in transgenic rice. *Journal of Experimental Botany*, 59(9), 2417-2424.
Raki, M. et al. (2007). Tetramer visualization of gut-homing gluten-specific T cells in the peripheral blood of celiac disease patients. *Proceedings of the National Academy of Sciences*, 104(8), 2831-2836.
Reyon, D. et al. (2012). FLASH assembly of TALENs for high-throughput genome editing. *Nature Biotechnology*, 30(5), 460-465.
Rooke, L. et al. (1999). Overexpression of a gluten protein in transgenic wheat results in greatly increased dough strength. *Journal of Cereal Science*, 30(2), 115-120.
Ruiz-Carnicer, A. et al. (2019). Celiac immunogenic potential of α-gliadin epitope variants from *Triticum* and *Aegilops* species. *Nutrients*, 11(2), 220.
Sambrook, J. et al. (1989). Molecular cloning: a laboratory manual (No. Ed. 2). Cold spring harbor laboratory press. Whole Book.
Sanchez-Leon, S. et al. (2018). Low-gluten, nontransgenic wheat engineered with CRISPR/Cas9. *Plant Biotechnology Journal*, 16(4), 902-910.
Santiago, Y. et al. (2008). Targeted gene knockout in mammalian cells by using engineered zinc-finger nucleases. *Proceedings of the National Academy of Sciences*, 105(15), 5809-5814.
Shewry, P. R. et al. (2016). Improving wheat to remove coeliac epitopes but retain functionality. *Journal of Cereal Science*, 67, 12-21.
Shimamoto, K. et al. (1989). Fertile transgenic rice plants regenerated from transformed protoplasts. *Nature*, 338(6212), 274-276.
Sidney, J. et al. (2013). Measurement of MHC/peptide interactions by gel filtration or monoclonal antibody capture. *Current Protocols in Immunology*, 100(1), 18-3.
Smirnova, O. G. et al. (2012). Wheat promoter sequences for transgene expression. *Russian Journal of Genetics: Applied Research*, 2(6), 434-439.
Sollid, L. M. et al. (2012). Nomenclature and listing of celiac disease relevant gluten T-cell epitopes restricted by HLA-DQ molecules. *Immunogenetics*, 64(6), 455-460.
Srinivasan, B. et al. (2015). Usefulness of recombinant γ-gliadin 1 for identifying patients with celiac disease and monitoring adherence to a gluten-free diet. *Journal of Allergy and Clinical Immunology*, 136(6), 1607-1618.
Takamatsu, N. et al. (1987). Expression of bacterial chloramphenicol acetyltransferase gene in tobacco plants mediated by TMV-RNA. *The EMBO Journal*, 6(2), 307-311.
Takamatsu, N. et al. (1990). Production of enkephalin in tobacco protoplasts using tobacco mosaic virus RNA vector. *FEBS Letters*, 269(1), 73-76.
Tatham, A. S. et al. (1985). The conformation of wheat gluten proteins. The secondary structures and thermal stabilities of α-, β-, γ- and ω-gliadins. *Journal of Cereal Science*, 3(2), 103-113.
Thomson, N. H. et al. (1999). Small angle X-ray scattering of wheat seed-storage proteins: α-, γ- and ω-gliadins and the high molecular weight (HMW) subunits of glutenin. *Biochimica et Biophysica Acta (BBA)-Protein Structure and Molecular Enzymology*, 1430(2), 359-366.
Tonikian, R. et al. (2007). Identifying specificity profiles for peptide recognition modules from phage-displayed peptide libraries. *Nature Protocols*, 2(6), 1368-1386.
Toriyama, K. et al. (1988). Transgenic rice plants after direct gene transfer into protoplasts. *Bio/technology*, 6(9), 1072-1074.
Urnov, F. D. et al. (2005). Highly efficient endogenous human gene correction using designed zinc-finger nucleases. *Nature*, 435(7042), 646-651.
Van Den Broeck, H. C. et al. (2009). Removing celiac disease-related gluten proteins from bread wheat while retaining technological properties: a study with Chinese Spring deletion lines. *BMC Plant Biology*, 9(1), 1-12.
Van Herpen, T. W. et al. (2006). Alpha-gliadin genes from the A, B, and D genomes of wheat contain different sets of celiac disease epitopes. *BMC Genomics*, 7(1), 1-13.
Walkey, D. G. (1991). Applied plant virology. *Springer Science & Business Media B.V.*—Whole Book.
Watson et al. (1992). Recombinant DNA, 2nd Edition, Scientific American Books, New York—Whole Book.
Wilson, M. H. et al. (2007). PiggyBac transposon-mediated gene transfer in human cells. *Molecular Therapy*, 15(1), 139-145.
Yamamoto, N. et al. (1994). The promoter of a pine photosynthetic gene allows expression of a β-glucuronidase reporter gene in transgenic rice plants in a light-independent but tissue-specific manner. *Plant and Cell Physiology*, 35(5), 773-778.
Yamamoto, Y. Y et al. (1997). Light-responsive elements of the tobacco PSI-D gene are located both upstream and within the transcribed region. *The Plant Journal*, 12(2). 255-265.
Zhang, H. M. et al. (1988). Transgenic rice plants produced by electroporation-mediated plasmid uptake into protoplasts. *Plant Cell Reports*, 7(6), 379-384.
Zhang, F. et al. (2011). Efficient construction of sequence-specific TAL effectors for modulating mammalian transcription. *Nature Biotechnology*, 29(2), 149-153.
Broekman et al. "IgE-the main player of food allergy" Drug Discovery Today: Disease Models. Dec. 1, 2015; 17:37-44.
Burkovitz et al. "Computational identification of antigen-binding antibody fragments" The Journal of Immunology. Mar. 1, 2013;190(5):2327-34.
Burkovitz et al. "Large-scale analysis of somatic hypermutations in antibodies reveals which structural regions, positions and amino acids are modified to improve affinity" The FEBS journal. Jan. 2014;281(1):306-19.
Carlson et al. "Targeting DNA with fingers and TALENs" Molecular therapy Nucleic acids. Jan. 1, 2012;1.
Cong et al. "Genome engineering using CRISPR-Cas9 system" in Chromosomal mutagenesis Nov. 3, 2014 (pp. 197-217). New York, NY: Springer New York.
Fu et al. "Identification of allergenic epitopes and critical amino acids of major allergens in Chinese shrimp (*Penaeus chinensis*) by immunoinformatics coupled with competitive-binding strategy" Journal of Agricultural and Food Chemistry. Feb. 26, 2018;66(11):2944-53.
Hwang et al. "Efficient in vivo genome editing using RNA-guided nucleases" Nature biotechnology. Jan. 29, 2013;31(3):227.
Hwang et al. "Heritable and precise zebrafish genome editing using a CRISPR-Cas system" PloS one. Jul. 9, 2013;8(7):e68708.
International Search Report issued for PCT Application No. PCT/IB2017/0058470 Dated Apr. 11, 2018.
International Search Report issued for PCT Application No. PCT/IB2019/055724 Dated Sep. 26, 2019.
Kim et al. "Analysis of targeted chromosomal deletions induced by zinc finger nucleases" Cold Spring Harbor Protocols. Aug. 1, 2010;2010(8):pdb-rot5477.
Konig F. "Adverse effects of wheat gluten" Annals of Nutrition and Metabolism. Nov. 1, 2015;67(Suppl. 2):7-14.
Kunik et al. "Paratome: an online tool for systematic identification of antigen-binding regions in antibodies based on sequence or structure" Nucleic acids research. Jul. 1, 2012;40(W1):W521-4.
Kunik et al. "Structural consensus among antibodies defines the antigen binding site" PLoS computational biology. Feb. 23, 2012;8(2):e1002388.
Li et al. "In vivo genome editing restores haemostasis in a mouse model of haemophilia" Nature. Jul. 14, 2011;475(7355):217-21.

(56) References Cited

OTHER PUBLICATIONS

Li et al. "Modularly assembled designer TAL effector nucleases for targeted gene knockout and gene replacement in eukaryotes" Nucleic acids research. Aug. 1, 2011;39(14):6315-25.
Mali et al. "RNA-guided human genome engineering via Cas9" Science. Feb. 15, 2013;339(6121):823-6.
Matsuo et al. "Common food allergens and their IgE-binding epitopes" Allergology International. 2015;64(4):332-43.
Rubinstein et al. "A machine-learning approach for predicting B-cell epitopes" Molecular immunology. Feb. 1, 2009;46(5):840-7.
Sela-Culang et al. "PEASE: predicting B-cell epitopes utilizing antibody sequence" Bioinformatics. Apr. 15, 2015;31(8):1313-5.
Sela-Culang et al. "Using a combined computational-experimental approach to predict antibody-specific B cell epitopes" Structure. Apr. 8, 2014;22(4):646-57.
Thalhamer et al. "Designing hypoallergenic derivatives for allergy treatment by means of in silico mutation and screening" Journal of allergy and clinical immunology. Apr. 1, 2010;125(4):926-34.

\* cited by examiner

| SEQ ID NO: | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 |
|---|---|---|---|---|---|---|---|---|---|---|---|---|---|---|---|---|---|---|---|---|---|---|---|---|---|---|---|---|---|---|---|---|---|
| 33 | L | Q | L | Q | P | F | P | Q | P | Q | L | P | Y | P | Q | P | Q | L | P | Y | P | Q | P | Q | L | P | Y | P | Q | P | Q | P | F |
| 49 | L | Q | L | Q | P | F | P | Q | P | H | L | F | P | P | Q | P | M | L | N | Y | T | Q | P | H | L | P | G | P | Q | P | Q | P | F |
| 50 | L | Q | L | Q | P | F | P | Q | P | P | L | P | Y | G | Q | P | P | L | P | Y | G | Q | A | P | L | P | Y | G | Q | A | P | P | F |
| 51 | L | Q | L | Q | P | F | P | Q | P | H | L | F | P | S | Q | P | H | L | S | Y | S | Q | P | H | L | P | G | P | Q | P | Q | P | F |
| 52 | L | Q | L | Q | P | F | P | Q | P | P | L | P | S | G | Q | P | M | L | N | Y | T | Q | P | P | L | P | Y | G | Q | A | P | P | F |
| 53 | L | Q | L | Q | P | F | P | Q | P | P | L | P | I | G | Q | P | K | L | F | Y | S | Q | P | P | L | P | Y | G | Q | A | P | P | F |
| 54 | L | Q | L | Q | P | F | P | Q | P | P | L | P | I | G | Q | P | K | L | S | Y | P | Q | P | H | L | P | G | P | Q | P | Q | P | F |
| 55 | L | Q | L | Q | P | F | P | Q | P | H | L | F | I | P | Q | P | K | L | F | Y | S | Q | P | H | L | P | G | P | Q | P | Q | P | F |
| 56 | L | Q | L | Q | P | F | P | Q | P | H | L | F | P | M | Q | P | H | L | S | Y | S | Q | P | H | L | P | G | P | Q | P | Q | P | F |
| 57 | L | Q | L | Q | P | F | P | Q | P | P | L | P | Y | M | Q | P | H | L | P | Y | S | Q | P | P | L | P | Y | G | Q | A | P | P | F |
| 58 | L | Q | L | Q | P | F | P | Q | P | P | L | P | Y | S | Q | P | H | R | P | Y | H | Q | P | H | R | P | Y | H | Q | P | Q | P | F |
| 59 | L | Q | L | Q | P | F | P | Q | P | H | L | F | P | P | Q | | | | | | | | | | | | | | | | | | |
| 60 | | | | | | | | | | Q | K | P | Y | R | Q | P | K | L | P | Y | P | Q | P | Q | | | | | | | | | |
| 61 | | | | | | | | | | Q | L | P | Y | S | Q | P | H | R | P | Y | H | Q | P | Q | | | | | | | | | |
| | | | | | | | | | | | | | | | | | | | | | | | | | | | | | | | | | |
| 36 | L | Q | L | Q | P | F | P | H | P | E | L | S | Y | S | Q | | | | | | | | | | | | | | | | | | |
| 37 | L | Q | L | Q | P | F | D | Q | P | R | L | P | W | P | Q | | | | | | | | | | | | | | | | | | |
| 38 | L | Q | L | Q | P | F | W | Q | P | K | L | P | G | P | Q | | | | | | | | | | | | | | | | | | |
| 41 | | | | | | | | | | H | L | P | Y | P | Q | P | E | L | R | Y | S | Q | P | Q | | | | | | | | | |

Figure 3

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| 42 | | | | | | | M | L | R | Y | P | Q | P | W | L | P | Y | P | Q | P | Q | | | | | | |
| 43 | | | | | | | K | L | P | Y | P | Q | G | R | L | P | G | P | Q | P | Q | | | | | | |
| 46 | | | | | | | | | | | | | | P | Y | P | H | P | R | L | P | Y | T | Q | P | Q | P | F |
| 47 | | | | | | | | | | | | | | P | Y | S | Q | P | E | S | P | Y | M | Q | P | Q | P | F |
| 48 | | | | | | | | | | | | | | P | Y | P | H | P | W | L | R | G | P | Q | P | Q | P | F |

Figure 3 Continued

Alpha gliadin from Nordic autumn wheat strain Mjoelner
MVRVPVPQLQPQNPSQQQPQEQVPLVQQQQFPGQQQPFPPQQPYPQPQPFPSQQPYLQLQPF
PQPQLPYPQPQLPYPQPQLPYPQPQPFRPQQPYPQSQPQYSQPQQPISQQQQQQQQQQQKQQQQQ
QQQILQQILQQQLIPCRDVVLQQHSIAYGSSQVLQQSTYQLVQQLCCQQLWQIPEQSRCQAIHNVVHAIILH
QQQQQQQQQQQPLSQVSFQQPQQQYPSGQGSFQPSQQNPQAQGSVQPQQLPQFEEIRNLALETLPA
MCNVYIPPYCTIAPVGIFGTNYR — SEQ ID NO: 32

Alpha gliadin from wheat cultivar Chinese Spring
MKTFLILALVATTAATAVRVPVPQLQPKNPSQQQPQEQVPLVQQQQFPGQQQQFPPQQPYPQP
QPFPSQQPYLQLQPFPQPQPFLPQLPYPQPQSFPPQQPYPQQRPKYLQPQQPISQQQAQQQQQQQQQ
QQQQQQQRQQILQQILQQQLIPCRDVVLQQHNIAHASSQVLQQSTYQLLQQLCCQQLLQIPEQSRCQAIH
NVVHAIIMHQQEQQQQLQQQQQQQLQQQQQQQQQQQPSSQVSFQQPQRQYPSSQVSFQPSQLNP
QAQGSVQPQQLPQFAEIRNLALQTLPAMCNVYIPPHCSTTIAPFGIFGTNYR — SEQ ID NO: 81

Alpha gliadin from wheat cultivar Cheyenne
MKTFLILALLAIVATTATTAVRVPVPQLQPQNPSQQQPQEQVPLVQQQQFPGQQQQFPPQQPYP
QPQPFPSQQPYLQLQPFPQPQPFPPLPYPQPQSFPPQQPYPQQQPQYLQPQQPISQQQAQQQQQQQQ
QQQQQQQILQQILQQQLIPCRDVVLQQHNIAHASSQVLQQSTYQLLQQLCCQQLLQIPEQSQCQAIHNVA
HAIIMHQQQQQQEQKQQLQQQQQQQQLQQQQQQQQQPSSQVSFQQPQQQYPSSQVSFQPSQL
NPQAQGSVQPQQLPQFAEIRNLALQTLPAMCNVYIPPHCSTTIAPFGISGTN - SEQ ID NO: 82

Alpha gliadin CS-2 isolate
VRVPVPQLQPQNPSQQQPQEQVPLVQQQQFPGQQQQFPPQQPYPQPQPFPSQQPYLQLQPFP
QPQPFPPQLPYPQPQSFPPQQPYPQQQPQYLQPQQPISQQQAQQQQQQQQQQQQILQQILQQQ
LIPCRDVVLQQHNIAHASSQVLQQSTYQLLQQLCCQQLLQIPEQSRCQAIHNVAHAIIMHQQQQQQEQQ
QQLQQQQQQLHQQRQQPSSQVSFQQPQQQYPSSQVSFQPSQLNPQAQGSVQPQQLPQFAEIRNLAL
QTLPAMCNVYIPPHCSTTIAPFGIFGTN — SEQ ID NO: 83

Alpha gliadin from wheat cultivar Chinese Spring
MKTFLILALLAIVATTATTAVRVPVPQLQPQNPSKQQSQEQVPLVQQQQFLGQQQPFPPQQPYPQ
PQPFPSQQPYLQLQPFPQPQLPYSQPQPFRPQQPYPQPQPQYSQPQEPISQQQQQQQQQQQILQQILQQ
QLIPCMDVVLQQHNIAHGRSQVLQQSTYQLLQELCCQHLWQIPEQSQCQAIQNVVNAIILHQQQKQQQQ
PSSQVSFQQPLQQYPLGQGSFRPSQQNPQDQGSVQPQQLPQFEEIRNLALQTLPAMCNVYIPPYCTIAPFGI
FGTN - SEQ ID NO: 84

Figure 4

Alpha gliadin from wheat cultivar Chinese Spring

MKTFLILALLAIVATTATTAVRVPVPQLQPQNPSQQQPQEQVPLVQQQQFLGQQQPFPPQQPYPQ
PQPFPSQQPYLQLQPFPQPQLPYSQPQPFRPQQPYPQPQPQYSQLQQPISQQQQQQQQQQQQQQQ
QQQQQQQQQQQQQQQQEQQILQQILQQQLIPCMDVVLQQHNIAHGRSQVLQQSTYQLLQELCCQ
HLWQIPEQSQCQAIHNVVHAIILHQQQKQQQQQPSSQVSFQQPQQQYPLGQGSFRPSQQNPQAQGSVQ
PQQLPQFEEIRNLALQTLPAMCNVYIPPYCTIVPFGIFGTN - SEQ ID NO: 85

Alpha gliadin from wheat cultivar Chinese Spring

MKTFLILVLLAIVATTAPTAVRFPVPQLQPQNPSQQLPQEQVPLVQQQQFLGQQQPFPPQQPYPQ
PQFPSQLPYLQLQPFPQPQLPYSQPQPFRPQQPYPQPQPQYSQPQQPISQQQQQQQQQQQQQQQQ
QQILQQILQQQLIPCMDVVLQQHNKAHGRSQVLQQSTYQLLRELCCQHLWQIPEQSQCQAIHNVVHAIILH
QQQKQQQQQPSSQVSFQQPLQQYPLGQGSFRPSQQNPQTQGSVQPQQLPQFEEIRNLALQTLPSMCNV
YIPPYCTIAPFGIFGTN –SEQ ID NO: 86

Alpha gliadin from wheat cultivar Cheyenne

MKTFLILALLAIVATTATIAVRVPVPQLQPQNPSQQQPQEQVPLVQQQQFPGQQQPFPPQQPYPQ
PQPFPSQQPYLQLQPFPQPQLPYPQPQQPFPQPQLPYSQPQPFRPQQPYPQPQPQYSQPQQPISQQQQ
QQQQQQQQQQILQQILQQQLIPCMDVVLQQHNIAHGRSQVLQQSTYQLLQELCCQHLWQIPEQSQC
QAIHNVVHAIILHQQQKPQQQPSSQVSFQQPLQQYPLGQGSFRPSQQNPQARGSVQPQQLPQFEEIRNLA
LQTLPAMCNVYIPPYCTIAPFGIFGTN – SEQ ID NO: 87

Alpha gliadin from wheat cultivar Conil

MKTFLILALLAIVATTATIAVRVPVPQLQPQNPSQQQPQEQVPLVQQQQFPGQQQPFPPQQPYPQ
LQPFPSQQPYMQLQPFPQPQLPYPQPQLPYPQPQPFRPQQSYPQPQPQYSQPQQPISQQQQQQQQQ
QQQQQILQQILQQQLIPCRDVVLQQHNIAHGSSQVLQESTYQLVQQLRCQQLWQIPEQSRCQAIHNVVHA
IILHQQHHHHQQQQQQQQQQQPLSQVSFQQPQQQYPSGQGFFQPSQQNPQAQGSVQPQQLPQFEEIRN
LALQMLPAMCNVYIPPYCTIAPFGIFGTN - SEQ ID NO: 88

Alpha gliadin from wheat cultivar Conil

MKTFLILALLAIVATTATIAVRVPVPQLQPQNPSQQQPQEQVPLVQQQQFPGQQQPFPPQQPYPQ
LQPFPSQQPYMQLQPFPQPQLPYPQPQLPYPQPQPFRPQQSYPQPQPQYSQPQQPISQQQQQQQQQ
QQQILQQILQQQLTPCRDVVLQQHSIAHGSSQVLQQSTYQLVQQLCCQQLWQIPEQSRCQAIHNVVHAIIL
HQQQQQQQQQQQQQQQQQQPLSQVCSQQSQQQYPSGQGSFQPSQQNPQAQGSVQPQQLPQFEEI
RNLALETLPAMCNVYIPPYCTIAPVGIFGTN - SEQ ID NO: 89

Figure 4 Continued

DE-EPITOPED ALPHA GLIADIN AND USE OF SAME FOR THE MANAGEMENT OF CELIAC DISEASE AND GLUTEN SENSITIVITY

CROSS-REFERENCE TO RELATED APPLICATIONS

This application is a National Phase Application of PCT International Application No. PCT/IB2020/056263, International Filing Date Jul. 2, 2020, claiming the benefit of U.S. Provisional Patent Application No. 62/870,695 filed Jul. 4, 2019, the contents of which are incorporated herein by reference in their entirety.

SEQUENCE LISTING STATEMENT

The ASCII file, entitled 83105 Sequence Listing.txt, created on 30 Jun. 2020, comprising 58,437 bytes, submitted concurrently with the filing of this application is incorporated herein by reference.

FIELD AND BACKGROUND OF THE INVENTION

The present invention, in some embodiments thereof, relates to methods of de-epitoping alpha gliadin and use of same for the management of gluten sensitivity, including celiac disease.

Celiac disease (CD) is an acquired chronic immune disorder that develops in susceptible individuals (many of whom are of HLA genotype DQ2 or DQ8) related to an environmental factor, gluten, which is the storage protein of wheat and related grains like rye and barley. The prevalence of celiac disease in Europe and in the United States has been estimated to be approximately 1-2% of the population. Celiac disease has a wide range of clinical manifestations including latent or silent celiac disease, disease with only mild gastrointestinal disturbances, chronic gastrointestinal symptoms, malabsorption, and/or weight loss. Celiac disease is often diagnosed in patients with isolated iron deficiency anemia.

The ingestion of gluten-containing cereals can also induce manifestations outside the gut, such as osteoporosis, peripheral and central nervous system involvement, mild or severe liver disease, infertility problems, and the classical example is the gluten-induced skin disease, dermatitis herpetiformis.

For patients with celiac disease, lifelong complete gluten exclusion needs to be strictly followed to avoid a substantially enhanced risk for the development of further complications, such as bone disorders, infertility, and cancer. The mortality rate in patients with celiac disease exceeds that of the general population; however, there is a trend towards reduction in mortality after 1-5 years on a gluten-free diet.

Following a completely gluten-free diet is, however, very challenging. Even highly motivated patients who try to maintain a strict dietary regimen are affected due to inadvertent or background exposure to gluten. As many as 80% of patients with celiac disease who are in clinical remission and who claim to be following a gluten-free diet, have persistent abnormalities in small bowel biopsy specimens. Inadvertent exposure to gluten has been identified as the leading cause of non-responsive celiac disease among clinically diagnosed patients who were presumed to be on a gluten-free diet.

Taken together, there is an acute need for additional dietary therapies for celiac disease which are both non-costly and accessible.

Sánchez-León, Susana et al. "Low-gluten, Nontransgenic Wheat Engineered with CRISPR/Cas9." Plant Biotechnology Journal 16.4 (2018): 902-910. PMC.

Additional background art includes US Patent Application No. 20160338366.

Additional background art includes Herpen et al., BMC Genomics volume 7, Article number: 1 (2006); Kumar et al., Volume 319, Issue 3, 7 Jun. 2002, Pages 593-602; Ozuna et al., The Plant Journal (2015) 82, 794-805; Petersen et al., Nature Structural & Molecular Biology volume 21, pages 480-488(2014); Mitea et al., PLoS One. 2010; 5(12): e15637; Qiao et al., J Immunol 2011; 187:3064-3071

SUMMARY OF THE INVENTION

According to an aspect of the present invention there is provided a method of de-epitoping an alpha gliadin which comprises an antigenic unit having an amino acid sequence as set forth in QLPYPQP (SEQ ID NO: 90), QLPYSQP (SEQ ID NO: 91) and/or PLPYPQP (SEQ ID NO: 92), the method comprising substituting the amino acid residue at position 1 of the antigenic unit with an amino acid selected from the group consisting of a positively charged amino acid, a proline and an aliphatic amino acid; and substituting at least one more amino acid residue at position 4 or 5 of the antigenic unit, thereby generating a de-epitoped alpha gliadin.

According to an aspect of the present invention there is provided a method of generating de-epitoped alpha gliadin, the method comprising mutating one or more amino acid residues at a position between amino acid 57 and amino acid 89 of the alpha gliadin, wherein at least one of the mutations is effected on an amino acid at a position selected from the group consisting of 63, 64, 66, 68, 69, 70, 72, 73, 75, 76, 77, 78, 80, 81, 82, 83 and 84, thereby generating the de-epitoped alpha gliadin, wherein the position of the mutation is according to the amino acid sequence of the wild-type alpha gliadin as set forth in SEQ ID NO: 32.

According to an aspect of the present invention there is provided a de-epitoped alpha gliadin comprising:

(i) a substitution at position 1 of an antigenic unit of the wild-type alpha gliadin with an amino acid selected from the group consisting of a positively charged amino acid, a proline and an aliphatic amino acid; and (ii) a substitution at position 4 and/or 5 of the antigenic unit;

wherein the antigenic unit has an amino acid sequence as set forth in QLPYPQP (SEQ ID NO: 90), QLPYSQP (SEQ ID NO: 91) or PLPYPQP (SEQ ID NO: 92).

According to an aspect of the present invention there is provided a de-epitoped alpha gliadin, comprising at least one or more mutation at a position between amino acid 57 and amino acid 89 of the alpha gliadin, wherein at least one of the mutations is effected on an amino acid at a position selected from the group consisting of 63, 64, 66, 68, 69, 70, 72, 73, 75, 76, 77, 78, 80, 81, 82, 83 and 84, wherein the position of the mutation is according to the amino acid sequence of the wild-type alpha gliadin as set forth in SEQ ID NO: 32.

According to an aspect of the present invention there is provided an isolated polynucleotide encoding the de-epitoped alpha gliadin described herein.

According to an aspect of the present invention there is provided an expression vector comprising the isolated polynucleotide described herein, operatively linked to a transcriptional regulatory sequence so as to allow expression of the alpha gliadin in a plant cell.

According to an aspect of the present invention there is provided a cell comprising the de-epitoped alpha gliadin described herein.

According to an aspect of the present invention there is provided a method of generating de-epitoped alpha gliadin comprising culturing cells which comprise the expression vector described herein, under conditions which allow for expression of the de-epitoped alpha gliadin in the cells, thereby generating de-epitoped alpha gliadin.

According to an aspect of the present invention there is provided a flour derived from a non-gluten plant, comprising the de-epitoped alpha described herein.

According to an aspect of the present invention there is provided a dough comprising the flour described herein.

According to an aspect of the present invention there is provided a wheat being genetically modified to express the de-epitoped alpha gliadin described herein.

According to an aspect of the present invention there is provided a corn plant being genetically modified to express the de-epitoped alpha gliadin described herein.

According to an aspect of the present invention there is provided a flour generated from the wheat described herein.

According to an aspect of the present invention there is provided a dough generated from the wheat described herein.

According to an aspect of the present invention there is provided a processed dough product prepared by processing the dough described herein, the processing being selected from the group consisting of combining the dough with a food ingredient, rising, kneading, extruding, molding, shaping, cooking, stewing, boiling, broiling, baking, frying and any combination of same.

According to an aspect of the present invention there is provided a method of producing flour comprising processing the wheat disclosed herein, thereby producing the flour.

According to embodiments of the present invention, the de-epitoped alpha gliadin protein does not comprise 15 mer peptides that bind to MHC class DQ2 or DQ8 with an IC50 less than 30 µM.

According to embodiments of the present invention, the de-epitoped alpha gliadin comprises an amino acid sequence as set forth in SEQ ID NOs: 60-80.

According to embodiments of the present invention, the de-epitoped alpha gliadin comprises an amino acid sequence as set forth in SEQ ID NOs: 49-58.

According to embodiments of the present invention, the substituting is carried out on at least two of the antigenic units.

According to embodiments of the present invention, the substituting is carried out on at least three of the antigenic units.

According to embodiments of the present invention, the method comprises substituting the amino acid residue at positions 1, 4 and 5 of the antigenic unit.

According to embodiments of the present invention, the substitution at position 1 of the antigenic unit comprises a replacement with a positively charged amino acid.

According to embodiments of the present invention, the positively charged amino acid is histidine or lysine.

According to embodiments of the present invention, the substitution at position 4 of the antigenic unit comprises a substitution with a proline, an aliphatic amino acid, a polar amino acid or glycine.

According to embodiments of the present invention, the substitution at position 4 comprises a replacement with proline.

According to embodiments of the present invention, the substitution at position 5 of the antigenic unit comprises a replacement with a small amino acid, a polar amino acid or an aromatic amino acid.

According to embodiments of the present invention, the substitution at position 5 comprises a replacement with a small amino acid.

According to embodiments of the present invention, the small amino acid comprises glycine or serine.

According to embodiments of the present invention, the method further comprises substituting the amino acid residue at position 3 of the antigenic unit with an aromatic or polar amino acid.

According to embodiments of the present invention, the de-epitoping does not reduce the allergenicity of the alpha gliadin.

According to embodiments of the present invention, the alpha gliadin comprises an amino acid sequence at least 50% identical to the sequence set forth in SEQ ID NO: 32, 81, 82, 83, 84, 85, 86, 87, 88 or 89.

According to embodiments of the present invention, the alpha gliadin comprises an amino acid sequence at least 80% identical to the sequence set forth in SEQ ID NO: 32, 81, 82, 83, 84, 85, 86, 87, 88 or 89.

According to embodiments of the present invention, the mutation is selected from the group consisting of P63D/W, Q64H, Q66R/K/H/M, P68S/R, Y69W/G, P70S, P72G, Q73W/R, P75R, Y76G, P77S, Q78H, Q80R/W, L81S, P82R, Y83G and P84T/M.

According to embodiments of the present invention, at least one glutamine of the alpha gliadin is mutated to glutamic acid.

According to embodiments of the present invention, the position is selected from the group consisting of 66, 73 and/or 80, wherein the position of the mutation is according to the amino acid sequence of the wild-type alpha gliadin as set forth in SEQ ID NO: 32.

According to embodiments of the present invention, the de-epitoped alpha gliadin binds with a lower affinity to T-cells derived from a celiac patient than a corresponding non-mutated alpha gliadin binds to T cells derived from the celiac patient.

According to embodiments of the present invention, the de-epitoped alpha gliadin activates T-cells derived from a celiac patient to a lesser extent than a corresponding non-mutated alpha gliadin activates T cells derived from the celiac patient, as measured using a HLA-DQ-peptide tetramer-based assay or by an interferon-γ ELISA assay.

According to embodiments of the present invention, the affinity is reduced by at least about 10%.

According to embodiments of the present invention, the de-epitoping does not disrupt the three-dimensional structure of the polypeptide.

According to embodiments of the present invention, the de-epitoping does not disrupt folding of the polypeptide.

According to embodiments of the present invention, the de-epitoped alpha gliadin does not comprise a 15 mer peptide that binds to MHC class DQ2 or DQ8 with an IC50 less than 30 µM.

According to embodiments of the present invention, the de-epitoped alpha gliadin comprises an amino acid sequence as set forth in SEQ ID NOs: 60-80.

According to embodiments of the present invention, the de-epitoped alpha gliadin comprises an amino acid sequence as set forth in SEQ ID NOs: 49-57.

According to embodiments of the present invention, the de-epitoped alpha gliadin comprises substitutions on at least two of the antigenic units.

According to embodiments of the present invention, the de-epitoped alpha gliadin comprises substitutions on at least three of the antigenic units.

According to embodiments of the present invention, the de-epitoped alpha gliadin comprises substitutions at positions 1, 4 and 5 of the antigenic unit.

According to embodiments of the present invention, the substitution at position 1 of the antigenic unit comprises a replacement with a positively charged amino acid.

According to embodiments of the present invention, the positively charged amino acid is histidine or lysine.

According to embodiments of the present invention, the substitution at position 4 comprises a replacement with a proline, an aliphatic amino acid, a polar amino acid or glycine.

According to embodiments of the present invention, the substitution at position 4 comprises a replacement with proline.

According to embodiments of the present invention, the substitution at position 5 of the antigenic unit comprises a replacement with a small amino acid, a polar amino acid or an aromatic amino acid.

According to embodiments of the present invention, the substitution at position 5 comprises a replacement with a small amino acid.

According to embodiments of the present invention, the small amino acid comprises glycine or serine.

According to embodiments of the present invention, the de-epitoped alpha gliadin further comprises a substitution at position 3 of the antigenic unit with an aromatic or polar amino acid.

According to embodiments of the present invention, the mutation is selected from the group consisting of P63D/W, Q64H, Q66R/K/H/M, P68S/R, Y69W/G, P70S, P72G, Q73W/R, P75R, Y76G, P77S, Q78H, Q80R/W, L81S, P82R, Y83G and P84T/M.

According to embodiments of the present invention, the alpha gliadin comprises an amino acid sequence at least 50% identical to the sequence set forth in SEQ ID NO: 32, 81, 82, 83, 84, 85, 86, 87, 88 or 89.

According to embodiments of the present invention, the alpha gliadin comprises an amino acid sequence at least 80% identical to the sequence set forth in SEQ ID NO: 32, 81, 82, 83, 84, 85, 86, 87, 88 or 89.

According to embodiments of the present invention, at least one glutamine of the alpha gliadin is mutated to glutamic acid.

According to embodiments of the present invention, the position is selected from the group consisting of 66, 73 and/or 80, wherein the position of the mutation is according to the amino acid sequence of the wild-type alpha gliadin as set forth in SEQ ID NO: 32.

According to embodiments of the present invention, the de-epitoped alpha gliadin comprises an amino acid sequence as set forth in SEQ ID NOs: 60-80.

According to embodiments of the present invention, the de-epitoped alpha gliadin comprises an amino acid sequence as set forth in SEQ ID NOs: 49-57.

According to embodiments of the present invention, the transcriptional regulatory sequence comprises a plant promoter.

According to embodiments of the present invention, the plant promoter comprises a wheat promoter.

According to embodiments of the present invention, the dough is characterized by at least one property selected from the group consisting of: a higher development time (DT), a lower stability time (S), a higher degree of softening (DS), a higher consistency (C) value and any combination thereof, as compared to a corresponding dough being absent of the de-epitoped gliadin polypeptide.

According to embodiments of the present invention, the dough is characterized by at least one property selected from the group consisting of: a. higher rigidity relative to a corresponding dough being absent of the de-epitoped glutenin or gliadin polypeptide; b. higher stability to mechanical solicitations relative to a corresponding dough being absent of the de-epitoped gliadin polypeptide; c. higher critical tension value relative to a corresponding dough being absent of the de-epitoped gliadin polypeptide; d. a lower deformation capacity relative to a corresponding dough being absent of the de-epitoped gliadin polypeptide; e. has higher plasticity relative to a corresponding dough being absent of the de-epitoped gliadin polypeptide; and f. higher consistency relative to a corresponding dough being absent of the de-epitoped gliadin polypeptide.

According to embodiments of the present invention, the dough is characterized by at least one property selected from the group consisting of: a. lower rigidity relative to a corresponding dough being absent of any gliadin polypeptide; b. higher stability to mechanical solicitations relative to a corresponding dough being absent of any gliadin polypeptide; c. higher critical tension value relative to a corresponding dough being absent of any gliadin polypeptide; d. a lower deformation capacity relative to a corresponding dough being absent of any gliadin polypeptide; e. has higher plasticity relative to a corresponding dough being absent of any gliadin polypeptide; and f. higher consistency relative to a corresponding dough being absent of any gliadin polypeptide.

According to embodiments of the present invention, the dough additionally comprises salt.

According to embodiments of the present invention, the dough is combined with at least one additional food ingredient, the at least one additional food ingredient is selected from the group consisting of flavoring agent, vegetable or vegetable part, oil, plant starch, vitamins and olives.

According to embodiments of the present invention, the dough further comprises a leavening agent, the leavening agent is selected from the group consisting of: unpasteurized beer, buttermilk, ginger beer, kefir, sourdough starter, yeast, whey protein concentrate, yogurt, biological leaveners, chemical leaveners, baking soda, baking powder, baker's ammonia, potassium bicarbonate and any combination thereof.

According to embodiments of the present invention, the expression of the corresponding non-mutated polypeptide is down-regulated compared to a wild-type wheat.

According to embodiments of the present invention, the wheat comprises an RNA silencing agent directed towards the non-mutated polypeptide.

According to embodiments of the present invention, the wheat is genetically modified by a DNA editing agent.

According to embodiments of the present invention, the processed dough product is in a form selected from the group consisting of a pan bread, a pizza bread crust, a pasta, a tortilla, a Panini bread, a pretzel, a pie and a sandwich bread product.

According to some embodiments of the invention, the processing comprises grinding or milling.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a table providing the sequences of modified alpha gliadin peptides that can be used according to embodiments of the present invention. The top row provides the positioning of the epitope according to the wild type protein as set forth in SEQ ID NO: 32. Position 66, 73 and 80 are indicated by solid line boxing and correspond to position 1 of the antigenic unit. Positions 69, 76 and 83 are indicated by dotted line boxing and correspond to position 4 of the antigenic unit. Positions 70, 77 and 84 are indicated by dashed line boxing and correspond to position 4 of the antigenic unit. The second row provides the wild type sequence of the epitope as set forth in SEQ ID NO: 33. The dotted boxed region corresponds to the first antigenic unit. The dashed boxed region corresponds to the second antigenic unit. The dot-dash-dot-dash boxed region corresponds to the third antigenic unit. The proposed substitutions of the alpha gliadin peptides are shown in lighter black lettering.

FIG. 4 provides sequences of wild-type alpha gliadins. The underlined region in each comprises the T cell epitope.

FIGS. 5A-B are graphs illustrating that modifications to 33-mer peptide lead to abolishment of T-cell activation. Response to tested gluten WT and modified peptides of TCLs from patient biopsies was assayed by an ELISA detecting levels of IFN-γ. Data shown as mean±SD of four experiments performed for each sample. The TCL response to gliadin was considered positive when normalized IFN-γ production was significantly higher for a tested peptide compared to control (as determined by a one-sided student's T-test. * p-val<0.05; p<0.01; *p<0.001) (A) or by a >2-fold response over control (B). Lower case letters signify modified amino acids. da—deamidated. The number to the left of each of the sequences corresponds to the SEQ ID NO.

DESCRIPTION OF SPECIFIC EMBODIMENTS OF THE INVENTION

The present invention, in some embodiments thereof, relates to methods of de-epitoping wheat proteins and use of same for the treatment of celiac disease.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Celiac disease relevant T-cell epitopes from wheat, barley and rye have been disclosed—see for example P. R. Shewry, A. S. Tatham, Journal of Cereal Science 67 (2016) 12e21.

The present inventors have now uncovered the most important amino acids of the wheat gluten protein, α-gliadin, that are responsible for bringing about an immune-sensitive reaction. The present inventors propose mutating α-gliadin at these sites in order to generate non-toxic gluten. Contemplated mutations are disclosed herein.

Thus, according to a first aspect of the present invention there is provided a method of de-epitoping an alpha gliadin which comprises an antigenic unit having an amino acid sequence as set forth in QLPYPQP (SEQ ID NO: 90), QLPYSQP (SEQ ID NO: 91) or PLPYPQP (SEQ ID NO: 92), the method comprising substituting the amino acid residue at position 1 of the antigenic unit with an amino acid selected from the group consisting of a positively charged amino acid, a proline and an aliphatic amino acid; and substituting at least one more amino acid residue at position 4 or 5 of the antigenic unit, thereby generating a de-epitoped alpha gliadin.

The term "alpha gliadin" as used herein refers to a wheat gluten protein comprising at least one copy of a unit having an amino acid sequence as set forth in SEQ ID NOs: 90, 91 or 92.

Typically, alpha gliadin has at least two or three of the above described units. It will be appreciated that the unit (also referred to herein as an antigenic unit) need not be the identical unit in each alpha gliadin. Thus for example a single alpha gliadin may comprise one copy of SEQ ID NO: 90 and another copy of SEQ ID NO: 91. Alternatively, a single alpha gliadin may comprise two or three copies of SEQ ID NO: 90 etc.

Alpha gliadins have a characteristic electrophoretic mobility in two-dimensional electrophoresis with isoelectric focusing in the first dimension and starch gel electrophoresis at acidic pH in the second dimension.

Alpha gliadins usually contain a signal peptide of 20 amino acids, an N-terminal region of 5 residues, a repetitive domain of 110-130 residues, and a C-terminal region of 140-160 residues. The C-terminal region is distinguished by a cysteine-rich region (CI) that contains four cysteine residues, a glutamine-rich region (CII) that contains stretches of glutamine residues, and a sequence of 35-39 residues (CIII) with the final two cysteine residues. Six of the cysteine residues form three intramolecular disulfide bonds. The N-terminal repetitive domains contain a repeat motif: P(F/Y)P$Q_{3-5}$. Two stretches of polyglutamine are present in the C-terminal part of the repetitive domain and in CII of the C-terminal region. Alpha-gliadins vary in mass from 30 to 34 kD, and this variation is attributed to variation in the lengths of the repetitive domain and the two polyglutamine stretches.

Exemplary amino acid sequences of wild-type alpha gliadin are provided in SEQ ID NOs: 32 and 81-89.

In one embodiment, the modified alpha gliadins disclosed herein have a sequence that is at least 50%, 55%, 60%, 65%, 70%, 75%, 80%, 85%, 90%, 91%, 92%, 93%, 94%, 95%, 96%, 97%, 98%, 99% identical to any one of the sequences as set forth in SEQ ID NOs: 32 and 81-89.

The "percent identity" of two amino acid sequences may be determined using the algorithm of Karlin and Altschul, *Proc. Natl. Acad. Sci. USA* 87:2264-68, 1990, modified as in Karlin and Altschul, *Proc. Natl. Acad. Sci. USA* 90:5873-77, 1993. Such an algorithm is incorporated into the NBLAST and XBLAST programs (version 2.0) of Altschul, et al. *J. Mol. Biol.* 215:403-10, 1990. BLAST protein searches can be performed with the XBLAST program, score=50, word length=3 to obtain amino acid sequences homologous to the protein molecules of interest. Where gaps exist between two sequences, Gapped BLAST can be utilized as described in Altschul et al., Nucleic Acids Res. 25(17):3389-3402, 1997. When utilizing BLAST and Gapped BLAST programs, the default parameters of the respective programs (e.g., XBLAST and NBLAST) can be used. BLAST nucleotide searches can be performed with the NBLAST nucleotide program parameters set, e.g., for score=100, wordlength=12 to obtain nucleotide sequences homologous to a nucleic acid molecule described herein. BLAST protein searches can be performed with the XBLAST program parameters set, e.g., to score 50, wordlength=3 to obtain amino acid sequences homologous to a protein molecule described herein. To obtain gapped alignments for comparison purposes, Gapped BLAST can be utilized as described in Altschul S F et al., (1997) *Nuc Acids Res* 25: 3389 3402. Alternatively, PSI BLAST can be used to perform an iterated search which detects distant relationships between molecules (Id.). When utilizing BLAST, Gapped BLAST, and PSI Blast programs, the default parameters of the respective programs (e.g., of XBLAST and NBLAST) can be used (see, e.g., National Center for Biotechnology Information (NCBI) on the worldwide web, ncbi.nlm.nih.gov). Another specific, non-limiting example of a mathematical algorithm utilized for the comparison of sequences is the algorithm of Myers and Miller, 1988, CABIOS 4:11 17. Such an algorithm is incorporated in the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used. The percent identity between two sequences can be determined using techniques similar to those described above, with or without allowing gaps. In calculating percent identity, typically only exact matches are counted.

Figure 1:
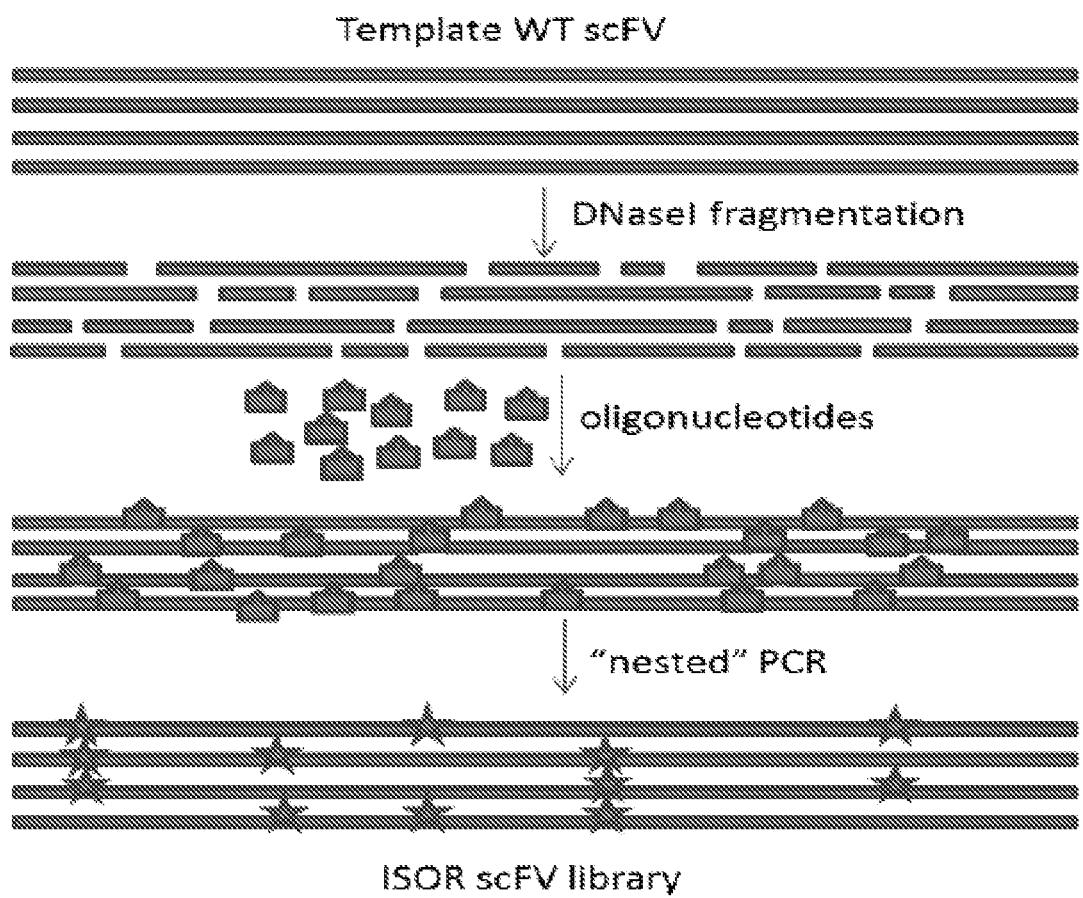
FIG. 1 illustrates a library design strategy according to embodiments of the present invention.
Figure 2B:
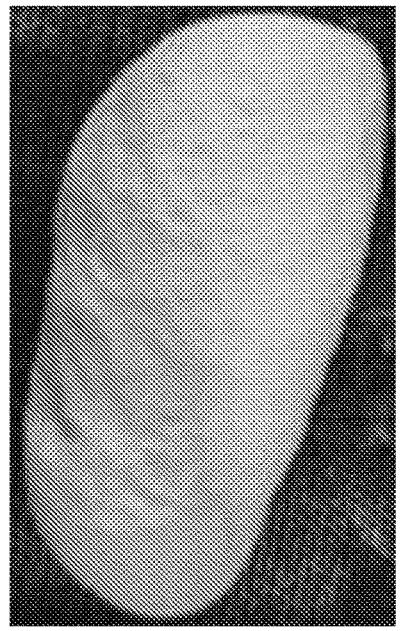
FIGS. 2A-C are photographs of the bread baking process (FIG. 2A), dough (FIG. 2B) and baked bread (FIG. 2C) with isolated gluten and non-wheat flour.
Figure 2A:
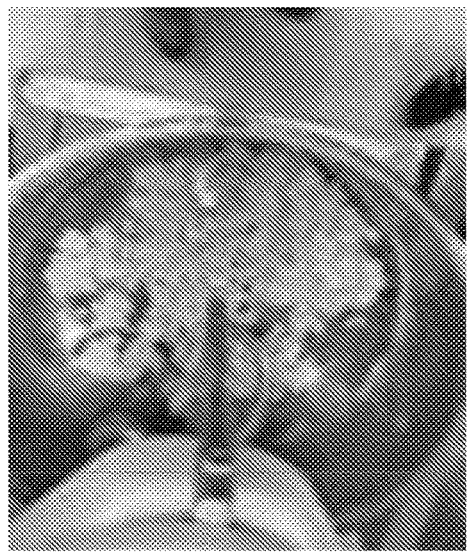
Figure 2C:

As used herein, the term "epitope" refers to a determinant that is recognized by lymphocytes. The epitope can be a peptide which is presented by a major histocompatibility complex (MHC) molecule and is capable of specifically binding to a T-cell receptor. In certain embodiments, an epitope is a region of a T cell immunogen that is specifically bound by a T-cell receptor. In certain embodiments, an epitope may include chemically active surface groupings of molecules such as amino acids, sugar side chains, phosphoryl, or sulfonyl groups. In certain embodiments, an epitope may have specific three-dimensional structural characteristics and/or specific charge characteristics.

The T cell epitope of this aspect of the present invention is typically a short peptide that is bound to a class I or II MHC molecule thus forming a ternary complex that can be recognized by a T-cell bearing a matching T-cell receptor binding to the MHC/peptide complex with appropriate affinity. Peptides binding to MHC class I molecules are typically about 8-14 amino acids in length but can be longer. T-cell epitopes that bind to MHC class II molecules are typically about 12-30 amino acids in length, but can be longer. In the case of peptides that bind to MHC class II molecules, the same peptide and corresponding T cell epitope may share a common core segment, but differ in the overall length due to flanking sequences of differing lengths upstream of the amino-terminus of the core sequence and downstream of its carboxy terminus, respectively. A T-cell epitope may be classified as an antigen if it elicits an immune response.

The term "de-epitoped protein" refers to a protein comprising a mutation at a site which has been identified as an epitope and which binds with less affinity to its relevant MHC protein than its wild-type counterpart and/or activates T cells to a lesser extent than its wild-type counterpart, as further described herein below.

Preferably, the de-epitoped protein comprises at least one essential physical property as present in its wild-type counterpart. Thus, for example in the case of alpha gliadin, de-epitoped alpha gliadin is preferably able to contribute to the flow properties of bread dough.

The molecules that transport and present peptides on the cell surface are referred to as proteins of the major histocompatibility complex (MHC). MHC proteins are classified into two types, referred to as MHC class I and MHC class II. The structures of the proteins of the two MHC classes are very similar; however, they have very different functions. Proteins of MHC class I are present on the surface of almost all cells of the body, including most tumor cells. MHC class I proteins are loaded with antigens that usually originate from endogenous proteins or from pathogens present inside cells, and are then presented to naive or cytotoxic T-lymphocytes (CTLs). MHC class II proteins are present on dendritic cells, B-lymphocytes, macrophages and other antigen-presenting cells. They mainly present peptides, which are processed from external antigen sources, i.e. outside of the cells, to T-helper (Th) cells. T-Cell receptors are capable of recognizing and binding peptides complexed with the molecules of MHC class I or II. Each cytotoxic T-lymphocyte expresses a specific T-cell receptor which is capable of binding specific MHC/peptide complexes.

Antigen presenting cells (APC) are cells which present peptide fragments of protein antigens in association with MHC molecules on their cell surface. Some APCs may activate antigen specific T cells. Examples of APCs include, but are not limited to dendritic cells, beta cells and macrophages.

According to a particular embodiment, the T cell epitope is a celiac disease-associated epitope—i.e. the epitope is presented on antigen presenting cells (APCs) of a celiac patient.

The present teachings also relate to other forms of gluten sensitivity. The term celiac disease is meant to encompass those forms in certain embodiments.

Celiac disease, is a long-term autoimmune disorder that primarily affects the small intestine. Classic symptoms include gastrointestinal problems such as chronic diarrhoea, abdominal distention, malabsorption, loss of appetite and among children failure to grow normally. This often begins between six months and two years of age. Non-classic symptoms are more common, especially in people older than two years. There may be mild or absent gastrointestinal symptoms, a wide number of symptoms involving any part of the body or no obvious symptoms.

Celiac disease is caused by a reaction to gluten, which are various proteins found in wheat and in other grains such as barley and rye. Upon exposure to gluten, an abnormal immune response may lead to the production of several different autoantibodies that can affect a number of different organs. In the small bowel, this causes an inflammatory reaction and may produce shortening of the villi lining the small intestine.

Diagnosis is typically made by a combination of blood antibody tests and intestinal biopsies, helped by specific genetic testing. While the disease is caused by a permanent intolerance to wheat proteins, it is not a form of wheat allergy.

As used herein, the term "T cell receptor" or "TCR" refers to a complex of membrane proteins that participate in the activation of T cells in response to the presentation of antigen. The TCR is responsible for recognizing antigens bound to major histocompatibility complex molecules. TCR is composed of a heterodimer of an alpha (α) and beta (β) chain, although in some cells the TCR consists of gamma and delta chains. TCRs may exist in alpha/beta and gamma/delta forms, which are structurally similar but have distinct anatomical locations and functions. Each chain is composed of two extracellular domains, a variable and constant domain. In some embodiments, the TCR may be modified on any cell comprising a TCR, including, for example, a helper T cell, a cytotoxic T cell, a memory T cell, regulatory T cell, natural killer T cell, and gamma delta T cell. TCRs in the present invention may exist in a variety of forms including different fragments of TCR with or without mutations.

The term "T cell immunogen" refers to an agent (for example a protein) that is capable of eliciting a T cell mediated immune response. A T cell immunogen comprises at least one T cell epitope. In one embodiment, the T cell immunogen is a wheat protein, such as a gluten protein.

In some embodiments, the method comprises mutating one or more amino acid residues of the wheat polypeptide in one or more of the identified epitopes. In some embodiments, the method comprises mutating 1, 2, 3, 4, 5, 6, 7, 8, 9, 10, 11, 12, 13, 14, 15, 16, 17, 18, 19, 20, 21, 22, 23, 24, or 25 or more amino acid residues of the polypeptide. In some embodiments, the one or more mutations destroy one or more (or all) of the identified epitopes on the polypeptide. Methods for making polypeptides comprising one or more mutations are well known to one of ordinary skill in the art. In some embodiments, the one or more mutations are conservative mutations. In some embodiments, the one or more mutations are non-conservative mutations. In some embodiments, the one or more mutations are a mixture of conservative and non-conservative mutations.

The mutation of this aspect of the present invention may be a substitution, a deletion or an insertion.

According to a particular embodiment, the mutation is a substitution.

According to a specific embodiment, the mutation does not affect the function of the wheat polypeptide.

Methods of introducing nucleic acid alterations to a gene of interest are well known in the art [see for example Menke D. Genesis (2013) 51:-618; Capecchi, Science (1989) 244: 1288-1292; Santiago et al. Proc Natl Acad Sci USA (2008) 105:5809-5814; International Patent Application Nos. WO 2014085593, WO 2009071334 and WO 2011146121; U.S. Pat. Nos. 8,771,945, 8,586,526, 6,774,279 and UP Patent Application Publication Nos. 20030232410, 20050026157, US20060014264; the contents of which are incorporated by reference in their entireties] and include targeted homologous recombination, site specific recombinases, PB transposases and genome editing by engineered nucleases. Agents for introducing nucleic acid alterations to a gene of interest can be designed by publicly available sources or obtained commercially from Transposagen, Addgene and Sangamo Biosciences. In some embodiments, the generation of the alterations in the sequences of the genes may be achieved by screening sequences of existing plants in search of an existing variant of the desired sequence. Then, this existing sequence can be introduced into the genome of the target genome by crossbreeding, or by gene editing. In other embodiments the desired variations will be introduced by introducing random mutagenesis, followed by screening for variants where the desired mutations occurred, followed by crossbreeding.

Following is a description of various exemplary methods used to introduce nucleic acid alterations to a gene of interest and agents for implementing same that can be used according to specific embodiments of the present invention.

Genome editing using engineered endonucleases—this approach refers to a reverse genetics method using artificially engineered nucleases to cut and create specific double-stranded breaks at a desired location(s) in the genome, which are then repaired by cellular endogenous processes such as, homology directed repair (HDS) and non-homologous end-joining (NFfEJ). NFfEJ directly joins the DNA ends in a double-stranded break, while HDR utilizes a homologous sequence as a template for regenerating the missing DNA sequence at the break point. In order to introduce specific nucleotide modifications to the genomic DNA, a DNA repair template containing the desired sequence must be present during HDR. Genome editing cannot be performed using traditional restriction endonucleases since most restriction enzymes recognize a few base pairs on the DNA as their target and the probability is very high that the recognized base pair combination will be found in many locations across the genome resulting in multiple cuts not limited to a desired location. To overcome this challenge and create site-specific single- or double-stranded breaks, several distinct classes of nucleases have been discovered and bioengineered to date. These include the meganucleases, Zinc finger nucleases (ZFNs), transcription-activator like effector nucleases (TALENs) and CRISPR/Cas system.

Meganucleases—Meganucleases are commonly grouped into four families: the LAGLIDADG (SEQ ID NO: 119) family, the GIY-YIG (SEQ ID NO: 118) family, the His-Cys box family and the HNH family. These families are characterized by structural motifs, which affect catalytic activity and recognition sequence. For instance, members of the LAGLIDADG (SEQ ID NO: 119) family are characterized by having either one or two copies of the conserved LAGLIDADG (SEQ ID NO: 119) motif. The four families of meganucleases are widely separated from one another with respect to conserved structural elements and, consequently, DNA recognition sequence specificity and catalytic activity. Meganucleases are found commonly in microbial species and have the unique property of having very long recognition sequences (>14 bp) thus making them naturally very specific for cutting at a desired location. This can be exploited to make site-specific double-stranded breaks in genome editing. One of skill in the art can use these naturally occurring meganucleases, however the number of such naturally occurring meganucleases is limited. To overcome this challenge, mutagenesis and high throughput screening methods have been used to create meganuclease variants that recognize unique sequences. For example, various meganucleases have been fused to create hybrid enzymes that recognize a new sequence. Alternatively, DNA interacting amino acids of the meganuclease can be altered to design sequence specific meganucleases (see e.g., U.S. Pat. No. 8,021,867). Meganucleases can be designed using the methods described in e.g., Certo, M T et al. Nature Methods (2012) 9:073-975; U.S. Pat. Nos. 8,304,222; 8,021,867; 8,119,381; 8,124,369; 8,129,134; 8,133,697; 8,143,015; 8,143,016; 8,148,098; or 8,163,514, the contents of each are incorporated herein by reference in their entirety. Alternatively, meganucleases with site specific cutting characteristics can be obtained using commercially available technologies e.g., Precision Biosciences' Directed Nuclease Editor™ genome editing technology.

ZFNs and TALENs—Two distinct classes of engineered nucleases, zinc-finger nucleases (ZFNs) and transcription activator-like effector nucleases (TALENs), have both proven to be effective at producing targeted double-stranded breaks (Christian et al., 2010; Kim et al., 1996; Li et al., 2011; Mahfouz et al., 2011; Miller et al., 2010).

Basically, ZFNs and TALENs restriction endonuclease technology utilizes a non-specific DNA cutting enzyme which is linked to a specific DNA binding domain (either a series of zinc finger domains or TALE repeats, respectively). Typically a restriction enzyme whose DNA recognition site and cleaving site are separate from each other is selected. The cleaving portion is separated and then linked to a DNA binding domain, thereby yielding an endonuclease with very high specificity for a desired sequence. An exemplary restriction enzyme with such properties is FokI. Additionally FokI has the advantage of requiring dimerization to have nuclease activity and this means the specificity increases dramatically as each nuclease partner recognizes a unique DNA sequence. To enhance this effect, FokI nucleases have been engineered that can only function as heterodimers and have increased catalytic activity. The heterodimer functioning nucleases avoid the possibility of unwanted homodimer activity and thus increase specificity of the double-stranded break.

Thus, for example to target a specific site, ZFNs and TALENs are constructed as nuclease pairs, with each member of the pair designed to bind adjacent sequences at the targeted site. Upon transient expression in cells, the nucleases bind to their target sites and the FokI domains heterodimerize to create a double-stranded break. Repair of these double-stranded breaks through the nonhomologous end-joining (NHEJ) pathway most often results in small deletions or small sequence insertions. Since each repair made by NHEJ is unique, the use of a single nuclease pair can produce an allelic series with a range of different deletions at the target site. The deletions typically range anywhere from a few base pairs to a few hundred base pairs in length, but larger deletions have successfully been generated in cell culture by using two pairs of nucleases simultaneously (Carlson et al., 2012; Lee et al., 2010). In addition, when a fragment of DNA with homology to the targeted region is introduced in conjunction with the nuclease pair, the double-stranded break can be repaired via homology directed repair to generate specific modifications (Li et al., 2011; Miller et al., 2010; Urnov et al., 2005).

Although the nuclease portions of both ZFNs and TALENs have similar properties, the difference between these engineered nucleases is in their DNA recognition peptide. ZFNs rely on Cys2-His2 zinc fingers and TALENs on TALEs. Both of these DNA recognizing peptide domains have the characteristic that they are naturally found in combinations in their proteins. Cys2-His2 Zinc fingers typically found in repeats that are 3 bp apart and are found in diverse combinations in a variety of nucleic acid interacting proteins. TALEs on the other hand are found in repeats with a one-to-one recognition ratio between the amino acids and the recognized nucleotide pairs. Because both zinc fingers and TALEs happen in repeated patterns, different combinations can be tried to create a wide variety of sequence specificities. Approaches for making site-specific zinc finger endonucleases include, e.g., modular assembly (where Zinc fingers correlated with a triplet sequence are attached in a row to cover the required sequence), OPEN (low-stringency selection of peptide domains vs. triplet nucleotides followed by high-stringency selections of peptide combination vs. the final target in bacterial systems), and bacterial one-hybrid screening of zinc finger libraries, among others. ZFNs can also be designed and obtained commercially from e.g., Sangamo Biosciences™ (Richmond, CA).

Method for designing and obtaining TALENs are described in e.g. Reyon et al. Nature Biotechnology 2012 May; 30(5):460-5; Miller et al. Nat Biotechnol. (2011) 29: 143-148; Cermak et al. Nucleic Acids Research (2011) 39 (12): e82 and Zhang et al. Nature Biotechnology (2011) 29 (2): 149-53. A recently developed web-based program named Mojo Hand was introduced by Mayo Clinic for designing TAL and TALEN constructs for genome editing applications (can be accessed through www(dot)talendesign (dot)org). TALEN can also be designed and obtained commercially from e.g., Sangamo Biosciences™ (Richmond, CA).

CRISPR-Cas system—Many bacteria and archea contain endogenous RNA-based adaptive immune systems that can degrade nucleic acids of invading phages and plasmids. These systems consist of clustered regularly interspaced short palindromic repeat (CRISPR) genes that produce RNA components and CRISPR associated (Cas) genes that encode protein components. The CRISPR RNAs (crRNAs) contain short stretches of homology to specific viruses and plasmids and act as guides to direct Cas nucleases to degrade the complementary nucleic acids of the corresponding pathogen. Studies of the type II CRISPR/Cas system of *Streptococcus pyogenes* have shown that three components form an RNA/protein complex and together are sufficient for sequence-specific nuclease activity: the Cas9 nuclease, a crRNA containing 20 base pairs of homology to the target sequence, and a trans-activating crRNA (tracrRNA) (Jinek et al. *Science* (2012) 337: 816-821.). It was further demonstrated that a synthetic chimeric guide RNA (gRNA) composed of a fusion between crRNA and tracrRNA could direct Cas9 to cleave DNA targets that are complementary to the crRNA in vitro. It was also demonstrated that transient expression of Cas9 in conjunction with synthetic gRNAs can be used to produce targeted double-stranded brakes in a variety of different species (Cho et al., 2013; Cong et al., 2013; DiCarlo et al., 2013; Hwang et al., 2013a, b; Jinek et al., 2013; Mali et al., 2013).

The CRIPSR/Cas system for genome editing contains two distinct components: a gRNA and an endonuclease e.g. Cas9.

The gRNA is typically a 20 nucleotide sequence encoding a combination of the target homologous sequence (crRNA) and the endogenous bacterial RNA that links the crRNA to the Cas9 nuclease (tracrRNA) in a single chimeric transcript. The gRNA/Cas9 complex is recruited to the target sequence by the base-pairing between the gRNA sequence and the complement genomic DNA. For successful binding of Cas9, the genomic target sequence must also contain the correct Protospacer Adjacent Motif (PAM) sequence immediately following the target sequence. The binding of the gRNA/Cas9 complex localizes the Cas9 to the genomic target sequence so that the Cas9 can cut both strands of the DNA causing a double-strand break. Just as with ZFNs and TALENs, the double-stranded brakes produced by CRISPR/Cas can undergo homologous recombination or NHEJ.

The Cas9 nuclease has two functional domains: RuvC and HNH, each cutting a different DNA strand. When both of these domains are active, the Cas9 causes double strand breaks in the genomic DNA.

A significant advantage of CRISPR/Cas is that the high efficiency of this system coupled with the ability to easily create synthetic gRNAs enables multiple genes to be targeted simultaneously. In addition, the majority of cells carrying the mutation present biallelic mutations in the targeted genes.

However, apparent flexibility in the base-pairing interactions between the gRNA sequence and the genomic DNA target sequence allows imperfect matches to the target sequence to be cut by Cas9.

Modified versions of the Cas9 enzyme containing a single inactive catalytic domain, either RuvC- or HNH-, are called 'nickases'. With only one active nuclease domain, the Cas9 nickase cuts only one strand of the target DNA, creating a single-strand break or 'nick'. A single-strand break, or nick, is normally quickly repaired through the HDR pathway, using the intact complementary DNA strand as the template. However, two proximal, opposite strand nicks introduced by a Cas9 nickase are treated as a double-strand break, in what is often referred to as a 'double nick' CRISPR system. A double-nick can be repaired by either NHEJ or HDR depending on the desired effect on the gene target. Thus, if specificity and reduced off-target effects are crucial, using the Cas9 nickase to create a double-nick by designing two gRNAs with target sequences in close proximity and on opposite strands of the genomic DNA would decrease off-target effect as either gRNA alone will result in nicks that will not change the genomic DNA.

Modified versions of the Cas9 enzyme containing two inactive catalytic domains (dead Cas9, or dCas9) have no nuclease activity while still able to bind to DNA based on gRNA specificity. The dCas9 can be utilized as a platform for DNA transcriptional regulators to activate or repress gene expression by fusing the inactive enzyme to known regulatory domains. For example, the binding of dCas9 alone to a target sequence in genomic DNA can interfere with gene transcription.

There are a number of publically available tools available to help choose and/or design target sequences as well as lists of bioinformatically determined unique gRNAs for different genes in different species such as the Feng Zhang lab's Target Finder, the Michael Boutros lab's Target Finder (E-CRISP), the RGEN Tools: Cas-OFFinder, the CasFinder: Flexible algorithm for identifying specific Cas9 targets in genomes and the CRISPR Optimal Target Finder.

In order to use the CRISPR system, both gRNA and Cas9 should be expressed in a target cell. The insertion vector can contain both cassettes on a single plasmid or the cassettes are expressed from two separate plasmids. CRISPR plasmids are commercially available such as the px330 plasmid from Addgene.

"Hit and run" or "in-out"—involves a two-step recombination procedure. In the first step, an insertion-type vector containing a dual positive/negative selectable marker cassette is used to introduce the desired sequence alteration. The insertion vector contains a single continuous region of homology to the targeted locus and is modified to carry the mutation of interest. This targeting construct is linearized with a restriction enzyme at a one site within the region of homology, electroporated into the cells, and positive selection is performed to isolate homologous recombinants. These homologous recombinants contain a local duplication that is separated by intervening vector sequence, including the selection cassette. In the second step, targeted clones are subjected to negative selection to identify cells that have lost the selection cassette via intrachromosomal recombination between the duplicated sequences. The local recombination event removes the duplication and, depending on the site of recombination, the allele either retains the introduced mutation or reverts to wild type. The end result is the introduction of the desired modification without the retention of any exogenous sequences.

The "double-replacement" or "tag and exchange" strategy—involves a two-step selection procedure similar to the hit and run approach, but requires the use of two different targeting constructs. In the first step, a standard targeting vector with 3' and 5' homology arms is used to insert a dual positive/negative selectable cassette near the location where the mutation is to be introduced. After electroporation and positive selection, homologously targeted clones are identified. Next, a second targeting vector that contains a region of homology with the desired mutation is electroporated into targeted clones, and negative selection is applied to remove the selection cassette and introduce the mutation. The final allele contains the desired mutation while eliminating unwanted exogenous sequences.

Site-Specific Recombinases—The Cre recombinase derived from the P1 bacteriophage and Flp recombinase derived from the yeast *Saccharomyces cerevisiae* are site-specific DNA recombinases each recognizing a unique 34 base pair DNA sequence (termed "Lox" and "FRT", respectively) and sequences that are flanked with either Lox sites or FRT sites can be readily removed via site-specific recombination upon expression of Cre or Flp recombinase, respectively. For example, the Lox sequence is composed of an asymmetric eight base pair spacer region flanked by 13 base pair inverted repeats. Cre recombines the 34 base pair lox DNA sequence by binding to the 13 base pair inverted repeats and catalyzing strand cleavage and religation within the spacer region. The staggered DNA cuts made by Cre in the spacer region are separated by 6 base pairs to give an overlap region that acts as a homology sensor to ensure that only recombination sites having the same overlap region recombine.

Basically, the site specific recombinase system offers means for the removal of selection cassettes after homologous recombination. This system also allows for the generation of conditional altered alleles that can be inactivated or activated in a temporal or tissue-specific manner. Of note, the Cre and Flp recombinases leave behind a Lox or FRT "scar" of 34 base pairs. The Lox or FRT sites that remain are typically left behind in an intron or 3' UTR of the modified locus, and current evidence suggests that these sites usually do not interfere significantly with gene function.

Thus, Cre/Lox and Flp/FRT recombination involves introduction of a targeting vector with 3' and 5' homology arms containing the mutation of interest, two Lox or FRT sequences and typically a selectable cassette placed between the two Lox or FRT sequences. Positive selection is applied and homologous recombinants that contain targeted mutation are identified. Transient expression of Cre or Flp in conjunction with negative selection results in the excision of the selection cassette and selects for cells where the cassette has been lost. The final targeted allele contains the Lox or FRT scar of exogenous sequences.

Transposases—As used herein, the term "transposase" refers to an enzyme that binds to the ends of a transposon and catalyzes the movement of the transposon to another part of the genome.

As used herein the term "transposon" refers to a mobile genetic element comprising a nucleotide sequence which can move around to different positions within the genome of a single cell. In the process the transposon can cause mutations and/or change the amount of a DNA in the genome of the cell.

A number of transposon systems that are able to also transpose in cells e.g. vertebrates have been isolated or designed, such as Sleeping Beauty [Izsvák and Ivics Molecular Therapy (2004) 9, 147-156], piggyBac [Wilson et al. Molecular Therapy (2007) 15, 139-145], Tol2 [Kawakami et al. PNAS (2000) 97 (21): 11403-11408] or Frog Prince [Miskey et al. Nucleic Acids Res. December 1, (2003) 31(23): 6873-6881]. Generally, DNA transposons translocate from one DNA site to another in a simple, cut-and-paste manner. Each of these elements has their own advantages, for example, Sleeping Beauty is particularly useful in region-specific mutagenesis, whereas Tol2 has the highest tendency to integrate into expressed genes. Hyperactive systems are available for Sleeping Beauty and piggyBac. Most importantly, these transposons have distinct target site preferences, and can therefore introduce sequence alterations in overlapping, but distinct sets of genes. Therefore, to achieve the best possible coverage of genes, the use of more than one element is particularly preferred. The basic mechanism is shared between the different transposases, therefore we will describe piggyBac (PB) as an example.

PB is a 2.5 kb insect transposon originally isolated from the cabbage looper moth, *Trichoplusia ni*. The PB transposon consists of asymmetric terminal repeat sequences that flank a transposase, PBase. PBase recognizes the terminal repeats and induces transposition via a "cut-and-paste" based mechanism, and preferentially transposes into the host genome at the tetranucleotide sequence TTAA. Upon insertion, the TTAA target site is duplicated such that the PB transposon is flanked by this tetranucleotide sequence. When mobilized, PB typically excises itself precisely to reestablish a single TTAA site, thereby restoring the host sequence to its pretransposon state. After excision, PB can transpose into a new location or be permanently lost from the genome.

Typically, the transposase system offers an alternative means for the removal of selection cassettes after homologous recombination quit similar to the use Cre/Lox or Flp/FRT. Thus, for example, the PB transposase system involves introduction of a targeting vector with 3' and 5' homology arms containing the mutation of interest, two PB terminal repeat sequences at the site of an endogenous TTAA sequence and a selection cassette placed between PB terminal repeat sequences. Positive selection is applied and homologous recombinants that contain targeted mutation are identified. Transient expression of PBase removes in conjunction with negative selection results in the excision of the selection cassette and selects for cells where the cassette has been lost. The final targeted allele contains the introduced mutation with no exogenous sequences.

For PB to be useful for the introduction of sequence alterations, there must be a native TTAA site in relatively close proximity to the location where a particular mutation is to be inserted.

Genome editing using recombinant adeno-associated virus (rAAV) platform—this genome-editing platform is based on rAAV vectors which enable insertion, deletion or substitution of DNA sequences in the genomes of live mammalian cells. The rAAV genome is a single-stranded deoxyribonucleic acid (ssDNA) molecule, either positive- or negative-sensed, which is about 4.7 kb long. These single-stranded DNA viral vectors have high transduction rates and have a unique property of stimulating endogenous homologous recombination in the absence of double-strand DNA breaks in the genome. One of skill in the art can design a rAAV vector to target a desired genomic locus and perform both gross and/or subtle endogenous gene alterations in a cell. rAAV genome editing has the advantage in that it targets a single allele and does not result in any off-target genomic alterations. rAAV genome editing technology is commercially available, for example, the rAAV GENESIS™ system from Horizon™ (Cambridge, UK).

Methods for qualifying efficacy and detecting sequence alteration are well known in the art and include, but not limited to, DNA sequencing, electrophoresis, an enzyme-based mismatch detection assay and a hybridization assay such as PCR, RT-PCR, RNase protection, in-situ hybridization, primer extension, Southern blot, Northern Blot and dot blot analysis.

Sequence alterations in a specific gene can also be determined at the protein level using e.g. chromatography, electrophoretic methods, immunodetection assays such as ELISA and western blot analysis and immunohistochemistry.

In addition, one ordinarily skilled in the art can readily design a knock-in/knock-out construct including positive and/or negative selection markers for efficiently selecting transformed cells that underwent a homologous recombination event with the construct. Positive selection provides a means to enrich the population of clones that have taken up foreign DNA. Non-limiting examples of such positive markers include glutamine synthetase, dihydrofolate reductase (DHFR), markers that confer antibiotic resistance, such as neomycin, hygromycin, puromycin, and blasticidin S resistance cassettes. Negative selection markers are necessary to select against random integrations and/or elimination of a marker sequence (e.g. positive marker). Non-limiting examples of such negative markers include the herpes simplex-thymidine kinase (HSV-TK) which converts ganciclovir (GCV) into a cytotoxic nucleoside analog, hypoxanthine phosphoribosyltransferase (HPRT) and adenine phosphoribosytransferase (ARPT).

In some embodiments, the one or more mutations do not disrupt the function of the polypeptide (e.g., do not disrupt the function of the mutated polypeptide relative to the function of the corresponding un-mutated polypeptide). In some embodiments the one or more mutation does not disrupt the dough strengthening ability of the polypeptide. In some embodiments the one or more mutation does not disrupt the dough elasticity promoting ability of the polypeptide. In some embodiments the one or more mutation does not disrupt the dough rising promoting ability of the polypeptide. In some embodiments, the one or more mutation does not significantly affect the growth of the wheat (for example production of seeds, number of seeds, size of seeds). In some embodiments, the one or more mutation does not disrupt native protein-protein interactions of the polypeptide (e.g., the mutated polypeptide retains the ability to form substantially the same protein-protein interactions as the corresponding un-mutated polypeptide). In some embodiments, the one or more mutation does not disrupt the three-dimensional structure of the polypeptide (e.g., the mutated polypeptide retains substantially the same three-dimensional structure as the corresponding un-mutated polypeptide). In some embodiments, the one or more mutation does not disrupt the folding of the polypeptide (e.g., the mutated polypeptide retains substantially the same protein folding as the corresponding un-mutated polypeptide). In some embodiments, the one or more mutation does not disrupt the translation of the polypeptide (e.g., the mutated polypeptide is translated with the same timing, at the same rate, to the same levels, etc. as the corresponding un-mutated polypeptide). In some embodiments, the one or more mutation does not disrupt the normal cellular localization of the polypeptide (e.g., the mutated polypeptide retains substantially the same cellular localization as the corresponding un-mutated polypeptide). In some embodiments, the one or more mutation does not disrupt any post-translational modifications on the polypeptide (e.g., the mutated polypeptide retains substantially the same post-translational modification profile as the corresponding un-mutated polypeptide). In still some embodiments, the one or more mutation does not disrupt the allergenicity of the wheat polypeptide (e.g., the mutated polypeptide retains substantially the same IgE antibody binding affinity as the corresponding un-mutated polypeptide). In some embodiments, the one or more mutation does not affect at least two, three, four, five or more of the parameters described herein above. In some embodiments, the one or more mutation does not affect any of the parameters described herein above.

Methods for checking the protein structure/fold/biochemical-biophysical properties of the de-epitoped gluten of the present invention include hydrodynamic studies (see for example Field, J. M., Tatham, A. S. & Shewry, P. R. 1987. Biochem. J. 247, 215-221; Castellia, F. et al., 2000. Thermochimica Acta 346, 153-160); NMR spectroscopy (see for example Bekkers, A. C., et al. 1996, In Gluten 96-Proc. 6th Int. Wheat Gluten Workshop, Sydney, September 1996 pp. 190-194. North Melbourne, Australia: Royal Australian Chemical Institute; Eliezer, D., Biophysical characterization of intrinsically disordered proteins. Curr Opin Struct Biol. 2009; 19(1):23-30); Circular dichroism measurements (see for example Tatham, A. S., Shewry, P. R., 1985. J. Cereal Sci. 3, 104-113); Heterologous expression analysis (see for example Tatham, A. S., Shewry, P. R., 1985. J. Cereal Sci. 3, 104-113); Static and dynamic light scattering measurements (see for example Herrera, M.; Dodero, V. In Proceedings of the F. Bioact. Process. Qual. & Nutr., 10-12 Apr. 2013; Sciforum Electronic Conferences Series; T. A. Egorov, FEBS Letters, Volume 434, Issues 1-2, 1998, Pages 215-217); Small-angle X-ray scattering (see for example Neil H. Thomson Biochimica et Biophysica Acta (BBA)—Protein Structure and Molecular Enzymology, Volume 1430, Issue 2, 1999, Pages 359-366; Eliezer, D., Curr Opin Struct Biol. 2009; 19(1):23-30); very-small-angle Neutron scattering (see for example Mohsen Dahesh et al., The Journal of Physical Chemistry B 2014 118 (38), 11065-11076. DOI: 10.1021/jp5047134; Gibbs, B. E. & Showalter, S. A. 2015, Biochemistry 54, 1314-1326; fluorescence correlation spectroscopy (FCS) (see for example Eliezer, D., Curr Opin Struct Biol. 2009; 19(1):23-3); and Single-Molecule FRET (smFRET) (see for example Gibbs, B. E. & Showalter, S. A. 2015, Biochemistry 54, 1314-1326). The contents of all the above described references are incorporated herein by reference.

Preferably, the mutated (i.e. de-epitoped) polypeptide of any of the aspects of the present invention binds with a poorer affinity to celiac related MHCII proteins (e.g. HLA-DQ2 or HLA-DQ8) or to T-cells derived from a celiac patient than a corresponding non-mutated polypeptide binds to MHCII proteins or T cells derived from the same celiac patient. Furthermore, the de-epitoped polypeptide described herein preferably binds with a poorer affinity to DQ7.5 MHCII II proteins than a corresponding non-mutated polypeptide binds to DQ7.5 MHCII proteins.

Thus, the affinity value, measured in units of concentration, is at least 10%, 20%, 30%, 40%, 50%, 60%, 70% 80%, 90% or 100% higher for the de-epitoped polypeptide to celiac related MHCII proteins (e.g. HLA-DQ2 or HLA-DQ8) or to T-cells derived from a celiac patient than a corresponding non-mutated polypeptide binds to T cells derived from the same celiac patient. In one embodiment, the binding of the mutated (i.e. de-epitoped) polypeptide to celiac related MHCII proteins (e.g. HLA-DQ2 or HLA-DQ8) or to T cells, is abrogated. Methods of measuring the binding of peptides/polypeptides to Celiac related MHCII proteins (e.g. HLA-DQ2 or HLA-DQ8) or to T cells are known in the art and include for example: 1) detection of peptide/MHCII complexes using a combination of gel-filtration and competitive binding to a well-defined radio-labeled reference peptide (Sidney et al., *Curr. Protoc. Immunol.* 2013); 2) Using MHCII tetramers with gluten peptides fusion to detect and quantify binding to gluten-specific CD4+ T cells by flow cytometer (Raki et al., PNAS 2007); 3) ELISpot or ELISA assay to measure activation of gluten-specific CD4+ T cells by probing secretion of IFN-γ (Anderson et al., *Gut* 2005); 4) Proliferation assays of gluten-specific T cells in the presence of relevant APCs (e.g., HLA DQ8 or HLA DQ2.5 expressing cells) and gluten peptides (Kooy-Winkelaar et al., *J. Immunol.* 2011).

According to a particular embodiment, the de-epitoped polypeptide of the present invention does not comprise 15 mer peptides that bind to MHC class DQ2 or DQ8 with an IC50 of less than 20 µM, less than 30 µM or even less than 40 µM—see Example 5 herein below.

Preferably, the mutated (i.e. de-epitoped) polypeptide activates T-cells derived from a celiac patient to a lesser extent (e.g. by at least 10%, 20%, 30%, 40%, 50%, 60%, 70% 80%, 90% or 100%) than a corresponding non-mutated activates T cells derived from the same celiac patient. An exemplary T cell activation assay is described in the Examples section herein below.

In one embodiment, the term "mutating" refers to expressing a recombinant polypeptide that has a mutation with respect to the wild type protein.

Thus, according to a particular embodiment, the alpha gliadin polypeptide is a recombinant polypeptide.

The present inventors further contemplate isolated polynucleotides which encode the above described gliadin polypeptides. Such polynucleotides may be used to express the above described de-epitoped gliadin polypeptides in host cells (e.g. bacteria or plants).

As used herein, the terms "polynucleotide", "nucleic acid sequence", "nucleic acid", and variations thereof shall be generic to polydeoxyribonucleotides (containing 2-deoxy-D-ribose), to polyribonucleotides (containing D-ribose), to any other type of polynucleotide that is an N-glycoside of a purine or pyrimidine base, and to other polymers containing non-nucleotidic backbones, provided that the polymers contain nucleobases in a configuration that allows for base pairing and base stacking, as found in DNA and RNA. Thus, these terms include known types of nucleic acid sequence modifications, for example, substitution of one or more of the naturally occurring nucleotides with an analog, and inter-nucleotide modifications.

Commonly used expression systems for heterologous protein production include bacterial cells (e.g. *E. coli*), fungal cells (e.g. *S. cerevisiae* cells), plant cells (e.g. tobacco, maize), insect cells (lepidopteran cells) and other mammalian cells (Chinese Hamster Ovary cells).

Expressing the exogenous polynucleotide of the present invention within a host cell (e.g. plant) can be effected by transforming one or more cells of the host with the exogenous polynucleotide.

Preferably, the transformation is effected by introducing to the host cell a nucleic acid construct which includes the exogenous polynucleotide of the present invention and at least one promoter capable of directing transcription of the exogenous polynucleotide in the host cell. Further details of suitable transformation approaches are provided hereinbelow.

As used herein, the term "promoter" refers to a region of DNA which lies upstream of the transcriptional initiation site of a gene to which RNA polymerase binds to initiate transcription of RNA. The promoter controls where (e.g., which portion of a plant, which organ within an animal, etc.) and/or when (e.g., which stage or condition in the lifetime of an organism) the gene is expressed.

Any suitable promoter sequence can be used by the nucleic acid construct of the present invention. Preferably the promoter is a constitutive promoter, a tissue-specific promoter or a plant-specific promoter (such as a wheat promoter).

Suitable constitutive promoters include, for example, CaMV 35S promoter (SEQ ID NO: 19; Odell et al., Nature 313:810-812, 1985); maize Ubi 1 (Christensen et al., Plant Sol. Biol. 18:675-689, 1992); rice actin (McElroy et al., Plant Cell 2:163-171, 1990); rice glutelin (Qu, Le Qing et al. J Exp Bot 59:9, 2417-2424, 2008); pEMU (Last et al., Theor. Appl. Genet. 81:581-588, 1991); and Synthetic Super MAS (Ni et al., The Plant Journal 7: 661-76, 1995). Other constitutive promoters include those in U.S. Pat. Nos. 5,659, 026, 5,608,149; 5,608,144; 5,604,121; 5,569,597: 5,466, 785; 5,399,680; 5,268,463; and 5,608,142.

Suitable tissue-specific promoters include, but not limited to, leaf-specific promoters such as described, for example, by Yamamoto et al., Plant J. 12:255-265, 1997; Kwon et al., Plant Physiol. 105:357-67, 1994; Yamamoto et al., Plant Cell Physiol. 35:773-778, 1994; Gotor et al., Plant J. 3:509-18, 1993; Orozco et al., Plant Mol. Biol. 23:1129-1138, 1993; and Matsuoka et al., Proc. Natl. Acad. Sci. USA 90:9586-9590, 1993.

Suitable wheat specific promoters include, but not limited to those described in Smirnova, O. G. and Kochetov, A. V. Russ J Genet Appl Res (2012) 2: 434. www(dot)doi(dot)org/10(dot)1134/S2079059712060123.

The nucleic acid construct of the present invention preferably further includes an appropriate selectable marker and/or an origin of replication. Preferably, the nucleic acid construct utilized is a shuttle vector, which can propagate both in *E. coli* (wherein the construct comprises an appropriate selectable marker and origin of replication) and be compatible for propagation in cells. The construct according to the present invention can be, for example, a plasmid, a bacmid, a phagemid, a cosmid, a phage, a virus or an artificial chromosome.

As mentioned, the de-epitoping of alpha gliadin is carried out by substituting the first amino acid (i.e. position 1) of the antigenic unit having an amino acid sequence as set forth in QLPYPQP (SEQ ID NO: 90), QLPYSQP (SEQ ID NO: 91) or PLPYPQP (SEQ ID NO: 92), with a positively charged amino acid, a proline or an aliphatic amino acid; and substituting at least one more amino acid residue at position 4 or 5 of the antigenic unit.

The present inventors propose that the first amino acid of at least one of the antigenic units is replaced as described herein above, the first amino acid of at least two of the antigenic units is replaced as described above, the first amino acid of at least three of the antigenic units is replaced as described above, or the first amino acid of all of the antigenic units is replaced as described above.

Contemplated positively charged amino acids include histidine, lysine and arginine.

In one embodiment, the first amino acid of the unit is substituted to histidine or lysine.

An example of an aliphatic amino acid contemplated by the present invention at position 1 is methionine. Additional examples of aliphatic amino acids include, but are not limited to valine, leucine, isoleucine and alanine.

According to a particular embodiment, position 1 and position 4 of at least one, at least two, at least three or all the antigenic units is substituted.

The fourth amino acid of the antigenic unit may be substituted with a proline, an aliphatic amino acid, a polar amino acid or glycine.

Exemplary aliphatic amino acids have been described herein above.

An example of a polar amino acid is serine.

Additional contemplated polar amino acids include threonine, asparagine, glutamine and tyrosine.

According to a particular embodiment, the fourth amino acid is replaced with proline.

According to a particular embodiment, position 1 and position 5 of at least one, at least two, at least three or all the antigenic units is substituted.

The fifth amino acid of the antigenic unit may be substituted with a small amino acid, a polar amino acid or an aromatic amino acid.

According to a particular embodiment, the fifth amino acid is replaced with a small amino acid (e.g. glycine or serine).

According to a particular embodiment, position 1, position 4 and position 5 of at least one, at least two, at least three or all the antigenic units is substituted.

As well as substituting amino acids at positions 1, 4 and/or 5, the present inventors contemplate mutating (e.g. substituting) additional amino acids in the antigenic unit. Thus, for example the present inventors contemplate substituting the amino acid residue at position 3 of the antigenic unit with an aromatic or polar amino acid.

In one embodiment, the de-epitoped alpha gliadin comprises an amino acid sequence as set forth in SEQ ID NOs: 60-80.

In another embodiment, the de-epitoped alpha gliadin comprises an amino acid sequence as set forth in SEQ ID NOs: 49-58.

In still another embodiment, the de-epitoped alpha gliadin is typically devoid of an amino acid sequence as set forth in SEQ ID NOs: 93-112 and 115-117.

According to another aspect of the present invention there is provided a method of generating de-epitoped alpha gliadin, the method comprising mutating one or more amino acid residues at a position between amino acid 57 and amino acid 89 of said alpha gliadin, wherein at least one of the mutations is effected on an amino acid at a position selected from the group consisting of 63, 64, 66, 68, 69, 70, 72, 73, 75, 76, 77, 78, 80, 81, 82, 83 and 84, thereby generating the de-epitoped alpha gliadin, wherein the position of the mutation is according to the amino acid sequence of the wild-type alpha gliadin as set forth in SEQ ID NO: 32.

According to a particular embodiment of this aspect of the present invention, at least one mutation lies in the sequence LQLQPFPQPQLPYPQPQLPYPQPQLPYPQPQPF-SEQ ID NO: 33 of the alpha gliadin protein (i.e. between amino acid 57 and amino acid 89, wherein the numbering is according to wild-type alpha gliadin having an amino acid sequence as set forth in SEQ ID NO: 32.

In one embodiment, the mutation of the alpha gliadin protein is such that the amino acid sequence of the deamidated (i.e. when glutamine of the amino acid sequence is changed to glutamic acid), the protein comprises the sequence as set forth in SEQ ID NOs: 36, 37, 38, 41, 42, 43, 46, 47 or 48.

In one embodiment, the de-epitoped alpha gliadin of the present invention comprises a base sequence as set forth in SEQ ID NO: 32 and at least one conservative or non-conservative substitution at the specified positions—63, 64, 66, 68, 69, 70, 72, 73, 75, 76, 77, 78, 80, 81, 82, 83 and 84.

The phrase "non-conservative substitutions" as used herein refers to replacement of the amino acid as present in the parent sequence by another naturally or non-naturally occurring amino acid, having different electrochemical and/or steric properties. Thus, the side chain of the substituting amino acid can be significantly larger (or smaller) than the side chain of the native amino acid being substituted and/or can have functional groups with significantly different electronic properties than the amino acid being substituted. Examples of non-conservative substitutions of this type include the substitution of phenylalanine or cycohexylmethyl glycine for alanine, isoleucine for glycine, or —NH—CH[(—CH$_2$)$_5$COOH]—CO— for aspartic acid.

It will be appreciated that conservative substitutions are also contemplated herein. Conservative substitution tables providing functionally similar amino acids are well known in the art. Guidance concerning which amino acid changes are likely to be phenotypically silent can also be found in Bowie et al., 1990, Science 247: 1306 1310. Such conservatively modified variants are in addition to and do not exclude polymorphic variants, interspecies homologs, and alleles. Typical conservative substitutions include but are not limited to: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine (S), Threonine (T); and 8) Cysteine (C), Methionine (M) (see, e.g., Creighton, Proteins (1984)). Amino acids can be substituted based upon properties associated with side chains, for example, amino acids with polar side chains may be substituted, for example, Serine (S) and Threonine (T); amino acids based on the electrical charge of a side chain, for example, Arginine (R) and Histidine (H); and amino acids that have hydrophobic side chains, for example, Valine (V) and Leucine (L). As indicated, changes are typically of a minor nature, such as conservative amino acid substitutions that do not significantly affect the folding or activity of the protein.

Exemplary substitutions include, but are not limited to P63D/W, Q64H, Q66R/K/H/M, P68S/R, Y69W/G, P70S, P72G, Q73W/R, P75R, Y76G, P77S, Q78H, Q80R/W, L81S, P82R, Y83G and P84T/M.

According to another embodiment, at least one glutamine of the amino acid sequence is changed to glutamic acid.

Exemplary positions where glutamine can be converted to glutamic acid can include 66, 73 and/or 80.

Various methods can be used to introduce the expression vector of some embodiments of the invention into cells. Such methods are generally described in Sambrook et al., Molecular Cloning: A Laboratory Manual, Cold Springs Harbor Laboratory, New York (1989, 1992), in Ausubel et al., Current Protocols in Molecular Biology, John Wiley and Sons, Baltimore, Md. (1989), Chang et al., Somatic Gene Therapy, CRC Press, Ann Arbor, Mich. (1995), Vega et al., Gene Targeting, CRC Press, Ann Arbor Mich. (1995), Vectors: A Survey of Molecular Cloning Vectors and Their Uses, Butterworths, Boston Mass. (1988) and Gilboa et at. [Biotechniques 4 (6): 504-512, 1986] and include, for example, stable or transient transfection, lipofection, electroporation and infection with recombinant viral vectors. In addition, see U.S. Pat. Nos. 5,464,764 and 5,487,992 for positive-negative selection methods.

The nucleic acid construct of the present invention can be utilized to stably or transiently transform plant cells. In stable transformation, the exogenous polynucleotide of the present invention is integrated into the plant genome and as such it represents a stable and inherited trait. In transient transformation, the exogenous polynucleotide is expressed by the cell transformed but it is not integrated into the genome and as such it represents a transient trait.

There are various methods of introducing foreign genes into both monocotyledonous and dicotyledonous plants (Potrykus, I., Annu. Rev. Plant. Physiol., Plant. Mol. Biol. (1991) 42:205-225; Shimamoto et al., Nature (1989) 338: 274-276).

The principle methods of causing stable integration of exogenous DNA into plant genomic DNA include two main approaches:

(i) *Agrobacterium*-mediated gene transfer: Klee et al. (1987) Annu. Rev. Plant Physiol. 38:467-486; Klee and Rogers in Cell Culture and Somatic Cell Genetics of Plants, Vol. 6, Molecular Biology of Plant Nuclear Genes, eds. Schell, J., and Vasil, L. K., Academic Publishers, San Diego, Calif. (1989) p. 2-25; Gatenby, in Plant Biotechnology, eds. Kung, S. and Arntzen, C. J., Butterworth Publishers, Boston, Mass. (1989) p. 93-112.

(ii) Direct DNA uptake: Paszkowski et al., in Cell Culture and Somatic Cell Genetics of Plants, Vol. 6, Molecular Biology of Plant Nuclear Genes eds. Schell, J., and Vasil, L. K., Academic Publishers, San Diego, Calif. (1989) p. 52-68; including methods for direct uptake of DNA into protoplasts, Toriyama, K. et al. (1988) Bio/Technology 6:1072-1074. DNA uptake induced by brief electric shock of plant cells: Zhang et al. Plant Cell Rep. (1988) 7:379-384. Fromm et al. Nature (1986) 319:791-793. DNA injection into plant cells or tissues by particle bombardment, Klein et al. Bio/Technology (1988) 6:559-563; McCabe et al. Bio/Technology (1988) 6:923-926; Sanford, Physiol. Plant. (1990) 79:206-209; by the use of micropipette systems: Neuhaus et al., Theor. Appl. Genet. (1987) 75:30-36; Neuhaus and Spangenberg, Physiol. Plant. (1990) 79:213-217; glass fibers or silicon carbide whisker transformation of cell cultures, embryos or callus tissue, U.S. Pat. No. 5,464,765 or by the direct incubation of DNA with germinating pollen, DeWet et al. in Experimental Manipulation of Ovule Tissue, eds. Chapman, G. P. and Mantell, S. H. and Daniels, W. Longman, London, (1985) p. 197-209; and Ohta, Proc. Natl. Acad. Sci. USA (1986) 83:715-719.

The *Agrobacterium* system includes the use of plasmid vectors that contain defined DNA segments that integrate into the plant genomic DNA. Methods of inoculation of the plant tissue vary depending upon the plant species and the *Agrobacterium* delivery system. A widely used approach is the leaf disc procedure which can be performed with any tissue explant that provides a good source for initiation of whole plant differentiation. Horsch et al. in Plant Molecular Biology Manual A5, Kluwer Academic Publishers, Dordrecht (1988) p. 1-9. A supplementary approach employs the *Agrobacterium* delivery system in combination with vacuum infiltration. The *Agrobacterium* system is especially viable in the creation of transgenic dicotyledonous plants.

There are various methods of direct DNA transfer into plant cells. In electroporation, the protoplasts are briefly exposed to a strong electric field. In microinjection, the DNA is mechanically injected directly into the cells using very small micropipettes. In microparticle bombardment, the DNA is adsorbed on microprojectiles such as magnesium sulfate crystals or tungsten particles, and the microprojectiles are physically accelerated into cells or plant tissues.

Following stable transformation plant propagation is exercised. The most common method of plant propagation is by seed. Regeneration by seed propagation, however, has the deficiency that due to heterozygosity there is a lack of uniformity in the crop, since seeds are produced by plants according to the genetic variances governed by Mendelian rules. Basically, each seed is genetically different and each will grow with its own specific traits. Therefore, it is preferred that the transformed plant be produced such that the regenerated plant has the identical traits and characteristics of the parent transgenic plant. Therefore, it is preferred that the transformed plant be regenerated by micropropagation which provides a rapid, consistent reproduction of the transformed plants.

Micropropagation is a process of growing new generation plants from a single piece of tissue that has been excised from a selected parent plant or cultivar. This process permits the mass reproduction of plants having the preferred tissue expressing the fusion protein. The new generation plants which are produced are genetically identical to, and have all of the characteristics of, the original plant. Micropropagation allows mass production of quality plant material in a short period of time and offers a rapid multiplication of selected cultivars in the preservation of the characteristics of the original transgenic or transformed plant. The advantages of cloning plants are the speed of plant multiplication and the quality and uniformity of plants produced.

Micropropagation is a multi-stage procedure that requires alteration of culture medium or growth conditions between stages. Thus, the micropropagation process involves four basic stages: Stage one, initial tissue culturing; stage two, tissue culture multiplication; stage three, differentiation and plant formation; and stage four, greenhouse culturing and hardening. During stage one, initial tissue culturing, the tissue culture is established and certified contaminant-free. During stage two, the initial tissue culture is multiplied until a sufficient number of tissue samples are produced to meet production goals. During stage three, the tissue samples grown in stage two are divided and grown into individual plantlets. At stage four, the transformed plantlets are transferred to a greenhouse for hardening where the plants' tolerance to light is gradually increased so that it can be grown in the natural environment.

Although stable transformation is presently preferred, transient transformation of leaf cells, meristematic cells or the whole plant is also envisaged by the present invention.

Transient transformation can be affected by any of the direct DNA transfer methods described above or by viral infection using modified plant viruses.

Viruses that have been shown to be useful for the transformation of plant hosts include CaMV, TMV and BV. Transformation of plants using plant viruses is described in U.S. Pat. No. 4,855,237 (BGV), EP-A 67,553 (TMV), Japanese Published Application No. 63-14693 (TMV), EPA 194,809 (BV), EPA 278,667 (BV); and Gluzman, Y. et al., Communications in Molecular Biology: Viral Vectors, Cold Spring Harbor Laboratory, New York, pp. 172-189 (1988). Pseudovirus particles for use in expressing foreign DNA in many hosts, including plants, is described in WO 87/06261.

Preferably, the virus of the present invention is avirulent and thus is incapable of causing severe symptoms such as reduced growth rate, mosaic, ring spots, leaf roll, yellowing, streaking, pox formation, tumor formation and pitting. A suitable avirulent virus may be a naturally occurring avirulent virus or an artificially attenuated virus. Virus attenuation may be effected by using methods well known in the art including, but not limited to, sub-lethal heating, chemical treatment or by directed mutagenesis techniques such as described, for example, by Kurihara and Watanabe (Molecular Plant Pathology 4:259-269, 2003), Gal-on et al. (1992), Atreya et al. (1992) and Huet et al. (1994).

Suitable virus strains can be obtained from available sources such as, for example, the American Type culture Collection (ATCC) or by isolation from infected plants. Isolation of viruses from infected plant tissues can be effected by techniques well known in the art such as described, for example by Foster and Tatlor, Eds. "Plant Virology Protocols: From Virus Isolation to Transgenic Resistance (Methods in Molecular Biology (Humana Pr), Vol 81)", Humana Press, 1998. Briefly, tissues of an infected plant believed to contain a high concentration of a suitable virus, preferably young leaves and flower petals, are ground in a buffer solution (e.g., phosphate buffer solution) to produce a virus infected sap which can be used in subsequent inoculations.

Construction of plant RNA viruses for the introduction and expression of non-viral exogenous polynucleotide sequences in plants is demonstrated by the above references as well as by Dawson, W. O. et al., Virology (1989) 172:285-292; Takamatsu et al. EMBO J. (1987) 6:307-311; French et al. Science (1986) 231:1294-1297; and Takamatsu et al. FEBS Letters (1990) 269:73-76.

When the virus is a DNA virus, suitable modifications can be made to the virus itself. Alternatively, the virus can first be cloned into a bacterial plasmid for ease of constructing the desired viral vector with the foreign DNA. The virus can then be excised from the plasmid. If the virus is a DNA virus, a bacterial origin of replication can be attached to the viral DNA, which is then replicated by the bacteria. Transcription and translation of this DNA will produce the coat protein which will encapsidate the viral DNA. If the virus is an RNA virus, the virus is generally cloned as a cDNA and inserted into a plasmid. The plasmid is then used to make all of the constructions. The RNA virus is then produced by transcribing the viral sequence of the plasmid and translation of the viral genes to produce the coat protein(s) which encapsidate the viral RNA.

Construction of plant RNA viruses for the introduction and expression in plants of non-viral exogenous polynucleotide sequences such as those included in the construct of the present invention is demonstrated by the above references as well as in U.S. Pat. No. 5,316,931.

Techniques for inoculation of viruses to plants may be found in Foster and Taylor, eds. "Plant Virology Protocols: From Virus Isolation to Transgenic Resistance (Methods in Molecular Biology (Humana Pr), Vol 81)", Humana Press, 1998; Maramorosh and Koprowski, eds. "Methods in Virology" 7 vols, Academic Press, New York 1967-1984; Hill, S. A. "Methods in Plant Virology", Blackwell, Oxford, 1984; Walkey, D. G. A. "Applied Plant Virology", Wiley, New York, 1985; and Kado and Agrawa, eds. "Principles and Techniques in Plant Virology", Van Nostrand-Reinhold, New York.

Mature plants generated from the transformed cells may then be cultivated under conditions suitable for expressing the exogenous polynucleotide within the mature plant.

In one embodiment, the plant host cell in which the expression construct is transfected does not naturally express gluten polypeptides (i.e. derived from a non-gluten plant). Thus, in one embodiment, the host cell is selected from the group consisting of amaranth, buckwheat, rice (brown, white, wild), corn millet, quinoa, sorghum, Montina, Job's tears and teff.

In another embodiment, the plant host cell in which the expression construct is transfected expresses wild-type gluten polypeptides. Such host cells include but are not limited to wheat varieties such as spelt, kamut, farro and durum, bulgar, semolina, barley, rye, triticale, *Triticum* (wheat cultivars—fielder. spelling, bobwhite, cheyenne, chinse spring and mnjoelner) and oats. It will be appreciated that in host cells that naturally express gluten polypeptides, the present inventors further contemplate down-regulating expression of the wild-type gluten polypeptides. Methods of down-regulating expression of wild-type gluten polypeptides are known in the art and include for example the use of RNA silencing agent and DNA editing agents. Examples of RNA silencing agents include, but are not limited to siRNA, miRNA, antisense molecules, DNAzyme, RNAzyme. One method of downregulating expression of gluten polypeptides has been described in Sánchez-León, Susana et al. "Low-gluten, Nontransgenic Wheat Engineered with CRISPR/Cas9." Plant Biotechnology Journal 16.4 (2018): 902-910. PMC, the contents of which are incorporated herein by reference.

For generation of recombinant polypeptides, the present invention contemplates expression constructs that include sequences engineered to enhance stability, production, purification or yield of the expressed proteins. For example, the expression of a fusion protein or a cleavable fusion protein comprising the mutated gluten protein of some embodiments of the invention and a heterologous protein can be engineered. Such a fusion protein can be designed so that the fusion protein can be readily isolated by affinity chromatography; e.g., by immobilization on a column specific for the heterologous protein. Where a cleavage site is engineered between the mutated gluten protein and the heterologous protein, the mutated gluten protein can be released from the chromatographic column by treatment with an appropriate enzyme or agent that disrupts the cleavage site [e.g., see Booth et al. (1988) Immunol. Lett. 19:65-70; and Gardella et al., (1990) J. Biol. Chem. 265:15854-15859].

Recovery of the recombinant polypeptide is effected following an appropriate time in culture. The phrase "recovering the recombinant polypeptide" refers to collecting the whole fermentation medium containing the polypeptide and need not imply additional steps of separation or purification. Notwithstanding the above, polypeptides of some embodiments of the invention can be purified using a variety of standard protein purification techniques, such as, but not limited to, affinity chromatography, ion exchange chromatography, filtration, electrophoresis, hydrophobic interaction chromatography, gel filtration chromatography, reverse phase chromatography, concanavalin A chromatography, chromatofocusing and differential solubilization.

The present inventors contemplate using the de-epitoped alpha gliadin polypeptides described herein for the preparation of foods suitable for consumption by a subject having celiac disease. Thus, the de-epitoped alpha gliadin may be used in the preparation of meat products, cheese and vegetarian alternatives to meat products.

In one embodiment, the de-epitoped gluten polypeptides can be used in the preparation of edible flour.

The term "flour" as used herein refers to a foodstuff which is a free-flowing powder, typically obtained by milling. Flour is most often used in bakery food products, such as breads, cakes, pastries etc., but also in other food products such as pasta, noodles, breakfast cereals and the like.

Examples of flours include bread flour, all-purpose flour, unbleached flour, self-raising flour, white flour, brown flour and semolina flour.

Thus, according to still another aspect of the present invention there is provided a flour derived from a non-gluten plant, comprising at least one de-epitoped gliadin polypeptide.

Examples of plants (e.g. grains) from which the flour is derived include but are not limited to amaranth, buckwheat, rice (brown, white, wild), corn millet, *quinoa*, sorghum and teff.

In one embodiment, the non-gluten plant is transformed with the de-epitoped alpha gliadin polypeptide and a flour is generated therefrom (for example by grinding, mincing, milling etc.).

In another embodiment, a flour is generated from a non-gluten plant (for example by grinding, mincing, milling etc.) and at least one recombinant de-epitoped alpha gliadin polypeptide is added. The amount and variety of de-epitoped alpha gliadin polypeptides can be adjusted to change the quality of the flour or the dough generated therefrom. Thus, the present inventors contemplate use of the recombinant de-epitoped alpha gliadin polypeptides of the invention as dough improvers.

According to still another aspect a flour is generated from wheat which has been genetically modified to express at least one de-epitoped alpha gliadin polypeptide of the present invention. Preferably, the genetically modified wheat has been further manipulated such that expression of wild-type alpha gliadin polypeptides have been down-regulated or eliminated (as described herein above). It will be appreciated that the wheat of this aspect of the present invention may be used to generate other edible products such as beer.

The present inventors further contemplate generating dough from any of the flours described herein.

The term "dough" should be understood as having its commonly used meaning, namely, a composition comprising as minimal essential ingredients flour and a source of liquid, for example at least water that is subjected to kneading and shaping. The dough is characterized by its malleability.

The term "malleable" should be understood as defining the capacity of the dough for adaptive changes without necessarily being easily broken and as such its pliability, elasticity and/or flexibility which thereby allows the subjecting of the dough to any one of the following processing steps: stretching, shaping, extending, sheeting, morphing, fitting, kneading, molding, modeling, or the like. The shaping of the dough may be by any instrument having predetermined shapes or by a rolling pin or by hand.

The dough may be characterized by at least one property selected from the group consisting of: a higher development time (DT), a lower stability time (S), a higher degree of softening (DS), a higher consistency (C) value, a lower degree of extensibility (DE) and any combination thereof, as compared to a corresponding dough being absent of any gliadin polypeptide. Testing can be performed by adding different quantities of modified recombinant proteins to a glutenin and starch fractions extracted from wheat flour and assessing biophysical properties, for example with farinograph and alveograph.

The dough may further be characterized by at least one property selected from the group consisting of: a. higher rigidity relative to a corresponding dough being absent of the de-epitoped gliadin polypeptide; b. higher stability to mechanical solicitations relative to a corresponding dough being absent of the de-epitoped gliadin polypeptide; c. higher critical tension value relative to a corresponding dough being absent of the de-epitoped gliadin polypeptide; d. a lower deformation capacity relative to a corresponding dough being absent of the de-epitoped gliadin polypeptide; e. has higher plasticity relative to a corresponding dough being absent of the de-epitoped gliadin polypeptide; and f. higher consistency relative to a corresponding dough being absent of the de-epitoped gliadin polypeptide.

The dough of this aspect of the present invention can comprise additional components such as salt, plant starch, a flavoring agent, vegetable or vegetable part, oil, vitamins and olives.

The dough may further comprise a leavening agent, examples of which include unpasteurized beer, buttermilk, ginger beer, kefir, sourdough starter, yeast, whey protein concentrate, yogurt, biological leaveners, chemical leaveners, baking soda, baking powder, baker's ammonia, potassium bicarbonate and any combination thereof.

Processed products generated from the doughs of this aspect of the present invention include, but are not limited to pan bread, a pizza bread crust, a pasta, a tortilla, a Panini bread, a pretzel, a pie and a sandwich bread product.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839, 153; 3,850,752; 3,850,578; 3,853,987; 3,867,517; 3,879, 262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Comprehensive Mapping of Celiac Epitopes

Celiac epitopes will be mapped. The assessment is going to be based on the predicted ability of a peptide within the gene sequence to bind specific MHCII molecules. Epitope validation will be performed using MHC II binding assays.
Methodology for Example 1

Literature Search. An extensive and exhaustive literature search for all experimentally-validated celiac epitopes will be carried out.

Computational prediction. Mapping will be performed using bioinformatic tools that predict immunogenic epitope sequences based on their ability to bind HLA class II genes HLA-DQ2 or HLA-DQ8. For each protein, all possible peptides (9-13 residues each) will be synthesized in their unmodified version or deamidated version (post-translational deamidation of glutamine residues to glutamates in peptide sequences by tissue transglutaminase (tTG2) that improves peptide-MHC complex stability (Sollid L, 2012)). All peptide sequences will be analyzed for their potential to serve as T-cell epitopes, and candidates will be further screened by an MHC II binding assay. Prioritization for mapping will be given to gluten proteins with empirically-identified celiac epitopes, and ones that have been identified as essential to bread quality.

Epitope Validation. Computational prediction will be empirically validated using MHC II binding assay. The binding of each predicted epitope to MHC II will be assessed based on its ability to inhibit the binding of a radiolabeled probe peptide to purified MHC molecules. MHC II molecules will be purified by affinity chromatography, and peptides will be radiolabeled using the chloramine T method. After an incubation period, the bound and unbound radiolabeled species will be separated, and their relative amounts will be determined by either size-exclusion gel-filtration chromatography or monoclonal antibody capture of MHC. The percent of bound radioactivity will then be determined. A detailed protocol for the MHC II binding assay to be used is described in Sidney et al. (Sidney J, 2013).

Example 2

Abrogate Peptide Immunogenicity ("De-Epitoping") while Maintaining Gene Product Expression and Folding Overview. For the predicted epitopes identified, we will design a library that introduces nucleic acid variations in the positions predicted to bind the MHC II molecules HLA DQ2.5 or DQ8. We will then use this library to search for mutations that abrogate binding to HLA DQ2.5 or DQ8 using a method for library screening or selection like phage display library. We will use deep-sequencing to identify variants with abrogated binding to HLA DQ2.5 or DQ8 (using MHC II binding assay as described for Example 1) but with intact expression and folding using yeast surface display (YSD) library. In this context the YD library will be used to measure and assess expression and folding, not binding. Together with the binding screening described above, this will confirm that the de-epitoped protein is well expressed, well folded, stable, and does not bind MHC II. Importantly, most glutenins and some gliadins are unfolded and thus, are hard to express on the surface of yeast. For those proteins we will use NickI coated plates and circular dichroism analysis for expression/folding analysis.
Methodology:
De-Epitoping:

Selecting positions for library design: For the predicted epitopes and for the known epitopes, we will select positions that are predicted to be crucial for MHC II binding. Briefly, we will predict HLA-peptide interaction for the WT and for specific mutants. The difference between the predictions will help identify promising mutations. Data from wild wheat strains with reduced toxicity will also be used to determine positions with potential impact on immunogenicity. The selection will be based on a combination score that will take into account: (i) score of the prediction, (ii) a multiple sequence alignment that will assess the conservation of the residues. A higher score will be given to less conserved residues. (iii) synergy with other putative substitutions within the same region of the protein. This way we will choose positions to be altered and variations to be introduced in each position. The final library will include in each altered position also the WT residue. Existing data shows that often a single mutation suffices to abrogate peptide-MHC binding.

Library Design: We will order a library in which each position in the peptide (typically 9-13 amino acids in length, but may be shorter or longer, based on epitope mapping computational analysis) is replaced by other residues. Library design, based on selected positions analysis containing point mutations at selected positions will be generated by dubbed incorporation synthetic oligos via gene reassembly method (ISOR) (Herman 2007). Template gene ("WT") based on the gene sequence will be ordered as a synthetic gene from IDT. Synthetic oligonucleotides containing the desired substitution and complementary to the appropriate DNA region will be ordered from IDT at low purification grade. All substitutions in the library will be encoded by a choice of codons that gives rise to the selected amino acids provided by the predictions, while minimizing the frequency of stop codons. The summary of the strategy is shown in FIG. 1. Briefly, template DNA will be amplified using reverse and forward primers in order to obtain microgram amounts of template. Next, DNA will be fragmented with DNaseI and fragments corresponding to 70-100 bp will be isolated. Next, DNA fragments will be mixed with various oligonucleotides amounts and a PCR assembly reaction using Pfu Turbo DNA polymerase will be performed. The full length assembled genes will be further amplified by "nested" PCR using appropriate forward and reverse primers containing a DNA sequence recognized by specific restriction enzyme. DNA library of the desired diversity in a pCTCON2 plasmid will be created by ligating digested pCTCON2 with digested pure "nested" PCR products and transforming electrocompetent *E. coli* cells with the purified ligation mix. Next, the complexity of the library will be assessed by sequencing random *E. coli* colonies. All plasmid containing cells will be pooled and an EBY100 library will be isolated and saved.

Validation

Phage display library. Phage display involves the display of peptide libraries on the surfaces of bacteriophage F episome, which allows M13 bacteriophage infection and propagation. Once introduced into the bacterial host, the DNA is resolved through DNA repair and replication, and the resulting library is packaged into phage particles. The DNA encapsulated by the positive phage clones (de-epitoped peptide sequences that do not bind HLA DQ2.5 or DQ8, as measured by MHC II binding tests described above) is then used as template for deep sequencing. A detailed protocol can be found in Tonikian R, et al. 2007.

Expression and Folding Assessment

Yeast surface display (YSD): For gluten genes that fold and express well on the surface of yeast, YSD will be performed as previously described (Chao, G, 2006). Briefly, a yeast library will be created at a diversity of about $1\times10^6$ cells by transforming EBY100 cells with pCTCON2 plasmid library. Cells will be pooled and yeasts will be grown in SDCAA media containing pen/strep overnight. Next, cells will be collected by centrifuge and supplemented with SGCAA medium, which allows expression on the surface of yeast. The induction will be performed for 48 hours. Expressing cells will be isolated, analyzed and sorted by flow cytometry based on expression level. Plasmids will be isolated from positive clones and sequenced.

Deep sequencing. For YSD library, we will deep sequence the library and identify all de-epitoped gene variants that are expressed and folded correctly. We will then analyze the mutated gene sequences and assess which residue alteration in the epitope is predicted to reduce binding to MHC II. Based on these results we will synthesize a de-epitoped gliadin gene. For gluten genes that do not fold/express properly on the surface of yeast, candidate de-epitoped gene variants will be tested for expression using a $His_6$-Tagged protein expression and nickel coated plates purification approach. Circular dichroism analysis will provide information on secondary structures in the protein.

Purification of $His_6$-tagged proteins using nickel coated plates. To investigate the expression of individual mutant proteins, a high throughput method for the purification of protein variants will be used. In this method protein purification is based on the interaction between $His_6$-tagged proteins and Ni-NTA-coated microplates. A detailed protocol can be found in Lanio T, et al. 2000. Briefly, a plasmid vector $pHis_6$ that harbors the de-epitoped versions of a gluten gene will be generated. Transcription will be under the control of a combination of two lac-operators and a T7-promoter, which allows for effective repression or induction with IPTG. *E. coli* cells will be grown at 37° C. and transferred to LB medium. Expression of the variants will be induced by adding IPTG. After incubation, cells will be harvested by centrifugation and pellets will be resuspended in lysis buffer. The lysate will be transferred to Ni-NTA HisSorb and incubated with vortexing at room temperature. Plates will be washed with lysis buffer. $His_6$-tagged proteins will be eluted. Cell pellets from pre-cultures will be used to extract DNA from variant genes of interest using a standard DNA plasmid preparation or by PCR.

Circular dichroism analysis. Purified de-epitoped proteins that are adequately expressed will be further tested for folding using circular dichroism analysis as previously described (Srinivasan B, 2015). Purified protein will be dialyzed in acetic acid, and its circular dichroism spectra will be analyzed using a Spectropolarimeter. The far-UV circular dichroism spectra from 190 to 260 nm will be recorded in a 2-mm path length quartz cuvette with a resolution of 1 nm, a scan speed of 50 nm/min, and a protein concentration of 0.10 mg/mL. An average of three scans will be obtained. Mean residue ellipticity (degrees per square centimeter per decimole$\times10^3$) at a given wavelength will be calculated. Subsequent calculation of the contents of secondary structure will be performed using a specialized software. De-epitoped gene variants that preserve expression and folding (similar to unmodified counterparts) will be further validated for lack of immunogenicity using a T-cell activation assay.

Further Validation

Generation of gluten-specific T cell lines: Gluten-reactive TCLs are generated as described previously (Gianfrani C. et al., Gastroenterology (2007)). Briefly, mucosal explants are digested with collagenase A and cells are seeded at 2-3×10 5 cells/ml in complete medium X-Vivol5 (Lonza) supplemented with 5% AB-pooled human serum (Biotag) and antibiotics. Cells are stimulated with 1.5×10 6 irradiated PBMC and TG2 (Sigma-Aldrich)-treated (deamidated) PT-gliadin (50 μg/ml). IL-15 and IL-2 Peprotech) are added after 24 h at 10 ng/ml and 20 units/ml respectively. Cytokines are supplemented every 3-4 days and cells are split according to need. The cells are restimulated approximately 2 weeks after the first stimulation.

T cell activation assay 1. Validation will be performed using an HLA-DQ-peptide tetramer-based assay. In this assay de-epitoped peptides or unmodified controls presented on HLA (DQ2.5 and DQ8) tetramers will be incubated with T-cells isolated from peripheral blood of CD patients (possibly under oral gluten challenge), or from fresh small intestinal biopsies that enable the culture of living cells obtained from the site of inflammation. T-cell binding and/or activation will be measured as previously described (Brottveit M, 2011). Complexes that show significant reduction or a complete abrogation of the binding and activation of these T cells will be selected for further assessment.

T cell assay 2. TCLs are assayed for responses to deamidated PT-gluten proteins and PT-gluten peptides by the detection of IFN-γ by ELISA, as previously described (Gianfrani C. et al., *J. Immunol.* (2006). HLA-matched B-LCLs (Sigma-Aldrich) are used as APCs. PT-gluten proteins (100 μg/ml) or gluten peptides (10 μM) (A&A labs) are added to APCs ($1\times10^5$) concomitantly with responder T cells ($4\times10^4$), the cells are seeded in 200 μl X-vivol5 medium in round-bottom 96 well plate (Corning) and incubated for 48 h. Each peptide/protein is tested in 4 replicates. DMSO serves as negative control for peptides testing and blank medium serves as negative control for protein testing. For Elisa experiments, Nunc MaxiSorp plates (Thermo Fisher) are coated with 1 μg/ml α-IFNγ antibody (Mabtech), blocked and incubated overnight with 50 μl of the sups taken from the TCLs' plates. Recombinant IFN7 (Bactlab) is used for standard curve generation. The plate is incubated with biotin-α-IFNγ antibody (1 μg/ml) (Mabtech), streptavidin-HRP (Bactlab)(1:5000) and TMB (Thermo Fisher). The reaction is stopped and the plate is read on the Elisa plate reader at 450 nM. The results are analysed using Graphpad Prism and IFNγ levels are determined. The results are normalised to the control. Results are considered positive (activating T cells) if IFNγ levels are ≥2 fold in peptide/protein samples compared to control or if IFNγ levels are significantly higher than the control (one-sided student t-test).

The specific alterations identified for each gliadin will be introduced into the full gene sequence of the gene and will be used for functional testing as part of Example 3.

Example 3

Generate "Celiac-Safe" Gluten Protein Variants with Intact Biophysical Properties Full gene sequences of de-epitoped gluten genes will be tested for preservation of their biophysical qualities. This will be done by recombinant expression of de-epitoped genes by any means, including but not restricted to, bacterial, viral or mammalian expression technologies. Purified recombinant de-epitoped gluten genes (single genes or in combination) will be added, in different quantities or combinations to gluten-free dough or flour or any other gluten-free product. Alternatively, flour/dough from crops other than wheat (e.g. rice and/or corn flour) may be used, to attempt improvement of bread quality. The contribution of a de-epitoped variant to bread/flour qualities is exhibited in properties such as mixing properties, rising, elasticity and strength of dough. Biophysical properties of de-epitoped variants will be compared to unmodified ("WT") counterparts to validate comparable functionality.

Methodology:

Recombinant protein production. We will engineer an expression construct with molecular attributes (e.g., a strong promoter, an efficient ribosome binding site) optimized for a selected host. For bacterial expression (e.g. *E. coli*), transformation of modified and unmodified gluten genes will be followed by screening studies and optimization of growth conditions (host, induction, media, temperature, additives) to drive either soluble or inclusion bodies expression. Transcription is under the control of a combination of two lac-operators and a T7 promoter, which allows for effective repression or induction with IPTG. *E. coli* cells are grown at 37° C. and transferred to minimal medium. Expression of gluten proteins is induced by adding IPTG. Following induction, cells will be lysed, and total cell lysate is spotted on a nitrocellulose membrane. The membrane is then blocked with skim milk. His tagged proteins are probed with an anti His antibody. Prior to purification, His tag is removed using restriction enzymes.

Expression assessment will be performed by SDS-PAGE/Coomassie or Western blot. Recombinant proteins will then be purified from lysate fraction or inclusion bodies. Purification of gliadin proteins is done according to a published procedure (Arentz-Hansen E H et al., *J. Exp. Med.* (2000)). Briefly, bacterial cell pellets are resuspended in 70% ethanol at 60° C. for 1 hour. Following centrifugation to remove cellular debris, NaCl (1.5M) is added to the supernatant to precipitate gliadin proteins. The precipitate is collected by centrifugation. The pellet is then washed with distilled water.

For Baculovirus protein expression, genes will be subcloned into baculovirus expression vector and expressed in insect cells (e.g., SF9 or SF21). This will be followed by virus generation, amplification and cloning (limited dilution or plaque purification). High-titer viral stocks will be generated. Expression assessment will be done by Western blot or ELISA. Recombinant proteins will be purified from cell pellets. For mammalian protein expression, we will use mammalian cells (e.g. in CHO, HEK293, HEK293E) for recombinant expression of our vectors. Expression will be tested by western blot or ELISA isolated from cell lysates.

Validation. Similarly to the methods described in Example 1, we will conduct MHCII binding assays with recombinant proteins to validate the lack of immunogenicity (de-epitoped variants) or immunogenicity (WT variants).

Assessment of biophysical qualities of de-epitoped gluten gene sets. The addition of different combinations and quantities of different recombinant proteins will be tested to achieve optimal dough and bread properties. Dough will be produced by mixing purified recombinant gluten proteins with starch. Dough is produced and biophysical properties are assessed, for example with farinograph and alveograph (Testing parameters: mixing properties dough development time and peak consistency values). Baked bread is tested for volume, crumb color and texture attributes, resilience, and adhesiveness. Protocols for testing will be adopted from Patra cu L, et al. 2017 and Uthayakumaran et al., Cereal Chemistry (2000).

Example 4

Engineer a Plant to Express De-Epitoped Gluten Gene Variants with Intact Biophysical Properties We will use the following approaches to express de-epitoped gene(s) in the plant:

1. Genome editing to modify the DNA sequence of target gluten genes in bread wheat (*Triticum aestivum*) using CRISPR/Cas9 approach.
2. Plant genetic engineering to express the de-epitoped gene under the control of the native promoter of the gene while silencing the expression of the native gene with artificial microRNAs (amiRNA).
   2.1. Transformation of the de-epitoped gene under the control of its native promoter while silencing the expression of the native gene using RNAi approach or using deletion lines (in which the WT gene is not expressed) of *Triticum aestivum.*
3. Transformation of de-epitoped gluten genes into other crops (e.g., rice, maize, etc.).

For all approaches, the unmodified (WT) version of the gene will serve as a baseline control. The objective is to ascertain the modifications made to the genes remain non-immunogenic when expressed in the plant, and do not negatively impact dough preparation and baking (as described in Example 3). In addition, for all approaches, we will assess growth of plants.

Methodology

WT gene Silencing in Wheat. We will express the de-epitoped gene under the control of the native promoter of the gene while silencing the expression of the native gene. To this end artificial microRNAs (amiRNA) will be designed to selectively target the native transcript that is 'blind' to de-epitoped gene using the WMD3-web microRNA designer (www(dot)wmd3(dot)weigelworld(dot)org/cgi-bin/webapp(dot)cgi). The silencing efficiency will be tested prior to the transformation of the plant by screening between 2-5 amiRNA for their silencing efficiency using a transient expression assay approach; the native and altered genes fused to two different reporter genes (GFP or luciferase in the two reciprocal possibilities) and controlled by strong constitutive promoter will be transiently co-expressed along with each designed amiRNA in leaves of *Nicotiana benthamiana*. The most efficient amiRNA will be continued to the next step of generating transgenic plants. The expression of the amiRNA will be controlled by a strong wheat-specific promoter. Both the de-epitoped gene (modified genomic fragment including the promoter, UTRs and introns) and the selected amiRNA will be cloned into the same binary vector. Transgenic plants will be generated by *agrobacterium* mediate transformation according to the efficient protocol (Ishida Y, 2015). The resulting transgenic wheat will be evaluated for silencing efficiency and expression levels of the altered gene using single nucleotide polymorphisms (SNPs) discriminating approach on cDNA; either derived cleaved amplified polymorphic sequences (dCAPS) or simple allele discriminating PCR (SAP) (Chum, P Y, 2012; Bui, M, 2009). Transgenic lines with maximal silencing of the native transcript that show good plant growth and non-disrupted development phenotype similar to the WT will be continued.

Cloning and Transformation: Gluten genes will be cloned from select wheat cultivars.

Glutenin genes Dx5 and Dy10 were previously reported to contribute to dough viscoelasticity (Rooke L, 1999; Popineau Y, 2001; Gadaleta, A, 2008). It has been previously reported that the highly immunogenic α2-gliadin locus on the short arm of chromosome 6D resulted in significant loss of dough functionality (Van den Broeck H C, 2009). Based on these data, we will transform the plant with Dx5 and Dy10 glutenins in combination with α2-gliadin to generate a gluten complex and serve as a baseline comparator in functionality assays.

Transgene expression in wheat: Immature embryos of healthy plants of wheat cultivar grown in a well-conditioned greenhouse will be pretreated with centrifuging and co-cultivated with *Agrobacterium tumefaciens* under the protocol described by Ishida et al. (Ishida Y, 2015). Transgene expression in rice: In general, cloning and transformation strategies will follow protocols described in Jo, et al. 2017. Genes will be inserted individually into an expression vector and expressed in the high-amylose Korean rice cultivar Koami (*Oryza sativa* L.) under the control of the rice endosperm-specific Glu-B1 promoter. The constructed vectors will be introduced into *Agrobacterium tumefaciens* (LBA4404) and genes of interest will be inserted into the genome of japonica-type Korean rice cultivar Koami.

Transgene expression in maize: Genes will be inserted individually into an expression vector and expressed in Maize (*Zea mays* L.), under the control of a maize endogenous promoter. *Agrobacterium*-mediated maize immature transformation will be performed based on a method developed by Ishida et al. (Ishida Y, 1996) to yield high frequency of transgenic event production.

For all transgenes cultivation will be performed and harvested transgenic seeds will be stored at 4° C. Transgene expression will be characterized by SDS-PAGE, imaging or other molecular techniques for expression and localization analyses.

Validation. MHCII binding assays with extracts from transgenic seeds/plants will be conducted to validate the lack of immunogenicity of the variants expressed in the plant. Assessment of Biophysical Qualities of De-Epitoped Gluten Gene Sets.

This will be performed similarly to the methods described for Example 3.

Genome editing: De-epitoped gluten genes that will exhibit the best performance in the transgenic wheat and immunological assays will be chosen for genome editing using the CRISPR/Cas9 approach. We will use CRISPR/cas9 to remove the WT gluten gene from the wheat genome and replace it with the sequence of the de-epitoped gene. This will yield several cells, each of which containing a different version of the de-epitoped gene. A recent approach uses of DNA-free editing of bread wheat by delivering in vitro transcripts or ribonucleoprotein complexes of CRISPR/Cas9 by particle bombardment and may be used for this purpose (Liang Z, 2018). Genotyping genome-edited mutations in wheat using CRISPR ribonucleoprotein complexes will be done using the method described by Liang et al. (Liang Z, 2018a).

Example 5

Exemplary Alpha Gliadin Peptides Showing Reduced Binding to MHC

Materials and Methods

Measurement of MHC/peptide interactions: Computational prediction algorithm was used to generate a list of putative non-binding peptides. Those peptides were synthesized and binding to MHC was measured as described in Sidney J et al, 2013.

Briefly, competition assays using different concentrations of WT and modified gluten peptides are conducted by diluting the peptides in NP40 buffer, and incubation for 2-4 days with purified MHC and a radiolabelled known MHC binding peptide. MHC II molecules are purified by affinity chromatography, and peptides are radiolabeled using the chloramine T method. After an incubation period, the bound and unbound radiolabeled species are separated, and their relative amounts are determined by either size-exclusion gel-filtration chromatography or monoclonal antibody capture of MHC. The percent of bound radioactivity is then determined. For each modified peptide, IC50 values of WT and modified peptide are calculated. The validated gluten peptide epitopes are analyzed for MHC binding as a positive control. Some of the peptides are tested also in a deamidated form. Values greater than that of the native peptide by over 4-5-fold signify that the binding of the engineered peptide sequence is compromised with respect to that of the native gluten peptide. Non-binding is defined as IC50≥30,000 nM Results Table 1 shows the IC50 measured for several variants that were predicted to have compromised binding to MHC. Values greater than that of the native peptide mean that the binding of the engineered peptide chain is compromised with respect to the native gluten. For each peptide, the number of modifications with respect to the WT native peptide is listed.

TABLE 1

| Variant | # of modifications | IC50 (nM) | Sequence |
| --- | --- | --- | --- |
| P1a | native | 271 | LQLQPFPQPQLPYPQ SEQ ID NO: 34 |
| P1b | deamidated | 14 | LQLQPFPQPELPYPQ SEQ ID NO: 35 |
| P1d | 3 | 1614 | LQLQPFPHPELSYSQ SEQ ID NO: 36 |
| P1f | 3 | 5439 | LQLQPFDQPRLPWPQ SEQ ID NO: 37 |
| P1g | 3 | 11158 | LQLQPFWQPKLPGPQ SEQ ID NO: 38 |
| P2a | native | 437 | QLPYPQPQLPYPQPQ SEQ ID NO: 39 |

TABLE 1-continued

| Variant | # of modifications | IC50 (nM) | Sequence |
|---|---|---|---|
| P2b | deamidated | 56 | ELPYPQPELPYPQPQ SEQ ID NO: 40 |
| P2c | 3 | 2208 | HLPYPQPELRYSQPQ SEQ ID NO: 41 |
| P2f | 3 | 2584 | MLRYPQPWLPYPQPQ SEQ ID NO: 42 |
| P2g | 4 | 3747 | KLPYPQGRLPGPQPQ SEQ ID NO: 43 |
| P3a | native | 481 | PYPQPQLPYPQPQPF SEQ ID NO: 44 |
| P3b | deamidated | 87 | PYPQPELPYPQPQPF SEQ ID NO: 45 |
| P3c | 3 | 2993 | PYPHPRLPYTQPQPF SEQ ID NO: 46 |
| P3d | 3 | 1991 | PYSQPESPYMQPQPF SEQ ID NO: 47 |
| P3f | 4 | 879 | PYPHPWLRGPQPQPF SEQ ID NO: 48 |
| P1c | 3 | 38588 | LQLQPFPQPHLFPPQ SEQ ID NO: 62 |
| P1d | 3 | >40000* | LQLQSFPQPHLPGPQ SEQ ID NO: 63 |
| P1e | 2 | 30706 | LQLQPFPQPPLPYGQ SEQ ID NO: 64 |
| P1f | 3 | >40000 | LQLQPFPQPHLPGGQ SEQ ID NO: 65 |
| P1g | 7 | >40000 | PQPQLFPQPHPFPPQ SEQ ID NO: 66 |
| P2c | 3 | >40000 | QKPYRQPKLPYPQPQ SEQ ID NO: 67 |
| P2d | 4 | >40000 | QLPYSQPHRPYHQPQ SEQ ID NO: 68 |
| P2e | 5 | >40000 | HLPGPQPHLSYPQPH SEQ ID NO: 69 |
| P2f | 7 | >40000 | HLPGGQPHLPGGQPH SEQ ID NO: 70 |
| P2g | 9 | >40000 | HPFPPQPHPFPPQPH SEQ ID NO: 71 |
| P2h | 6 | >40000 | TLPSPQPTLGYGQPT SEQ ID NO: 72 |
| P2i | 6 | >40000 | SLPMPQPSLRYRQPS SEQ ID NO: 73 |
| P3c | 3 | >40000 | SYPQPHLPGPQPEPF SEQ ID NO: 74 |
| P3d | 4 | >40000 | PYPQPPLPYGQAPPF SEQ ID NO: 75 |
| P3e | 4 | >40000 | PYSQPHRPYHQPQPF SEQ ID NO: 76 |
| P3f | 3 | >40000 | PYRQPKLPYRQPQPF SEQ ID NO: 77 |
| P3g | 5 | >40000 | PGGQPHLPGGQPQPF SEQ ID NO: 78 |
| P3h | 6 | >40000 | FPPQPHPFPPQPQPF SEQ ID NO: 79 |
| P3i | 5 | >40000 | PQPFPPLPYPQPQSF SEQ ID NO: 80 |

Example 6

Exemplary Alpha Gliadin Peptides Showing Abolishment of T Cell Activation

Figure 5A:
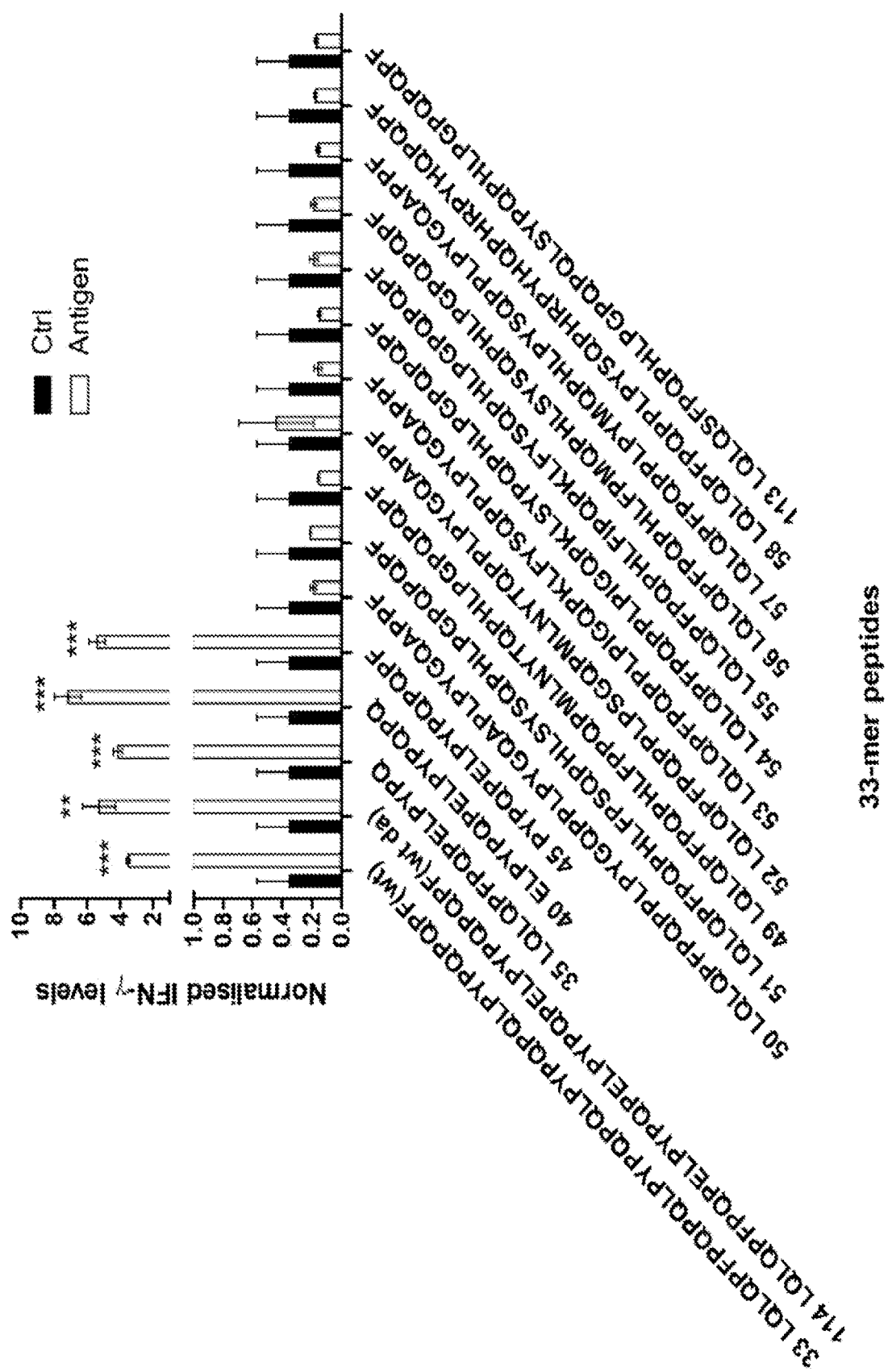
Figure 5B:
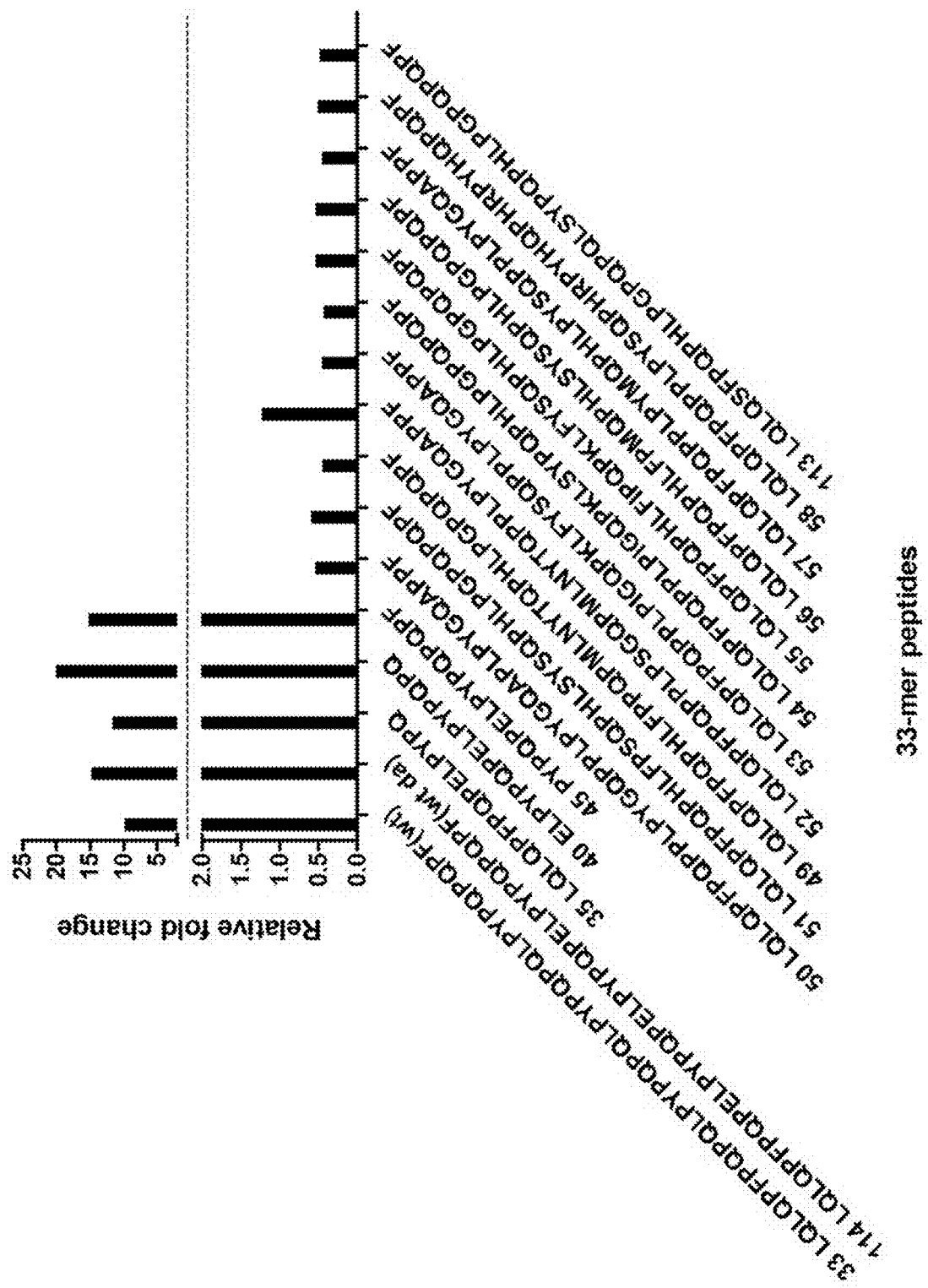

The response to WT alpha gliadin peptides and modified peptides of TCLs from patient biopsies was assayed by an ELISA detecting levels of IFN-γ. The results are illustrated in FIGS. 5A-B.

References

Brottveit M, Riki M, Bergseng E, Fallang L E, Simonsen B, Løvik A, Larsen S, Løberg E M, Jahnsen F L, Sollid L M, Lundin K E. Assessing possible celiac disease by an HLA-DQ2-gliadin Tetramer Test. Am J Gastroenterol. 2011; 106(7):1318-24.

Bui M, Liu Z. Simple allele-discriminating PCR for cost-effective and rapid genotyping and mapping. Plant Methods. 2009; 5:1.

Chao G, Lau W L, Hackel B J, Sazinsky S L, Lippow S M, Wittrup K D. Isolating and engineering human antibodies using yeast surface display. Nat Protoc. 2006; 1(2):755-68.

Chum P Y, Haimes J D, André C P, Kuusisto P K, Kelley M L. Genotyping of plant and animal samples without prior DNA purification. J Vis Exp. 2012; (67).

Gadaleta, A.; Blechl, A. E.; Nguyen, S.; Cardone, M. F.; Ventura, M.; Quick, J. S.; Blanco, A. Stably expressed D-genome-derived HMW glutenin subunit genes transformed into different durum wheat genotypes change dough mixing properties. Mol. Breed. 2008, 22, 267-279.

Herman A, Tawfik D S. Incorporating Synthetic Oligonucleotides via Gene Reassembly (ISOR): a versatile tool for generating targeted libraries. Protein Eng Des Sel. 2007; 20(5):219-26.

Ishida Y, Saito H, Ohta S, Hiei Y, Komari T, Kumashiro T. High efficiency transformation of maize (Zea mays L.) mediated by Agrobacterium tumefaciens. Nat Biotechnol. 1996; 14(6):745-50.

Ishida Y, Tsunashima M, Hiei Y, Komari T. Wheat (Triticum aestivum L.) transformation using immature embryos. Methods Mol Biol. 2015; 1223:189-98.

Jo Y M, Cho K, Lee H J, Lim S H, Kim J S, Kim Y M, Lee J Y. Cellular Localization of Wheat High Molecular Weight Glutenin Subunits in Transgenic Rice Grain. Int J Mol Sci. 2017 Nov. 18; 18(11).

Lanio T, Jeltsch A, Pingoud A. Automated purification of His6-tagged proteins allows exhaustive screening of libraries generated by random mutagenesis. Biotechniques. 2000; 29(2):338-42.

Liang Z, Chen K, Zhang Y, Liu J, Yin K, Qiu J L, Gao C. Genome editing of bread wheat using biolistic delivery of CRISPR/Cas9 in vitro transcripts or ribonucleoproteins. Nat Protoc. 2018; 13(3):413-430.

Liang Z, Chen K, Yan Y, Zhang Y, Gao C. Genotyping genome-edited mutations in plants using CRISPR ribonucleoprotein complexes. Plant Biotechnol J. 2018. doi: 10.1111/pbi.12938. [Epub ahead of print].

Molberg O, Kett K, Scott H, Thorsby E, Sollid L M, Lundin K E. Gliadin specific, HLA DQ2-restricted T cells are commonly found in small intestinal biopsies from coeliac disease patients, but not from controls. Scand J Immunol. 1997; 46(3):103-109.

Pătrașcu L, Banu I, Vasilean I, Aprodu I. Effect of gluten, egg and soy proteins on the rheological and thermo-mechanical properties of wholegrain rice flour. Food Sci Technol Int. 2017; 23(2):142-155.

Popineau, Y.; Deshayes, G.; Lefebvre, J.; Fido, R.; Tatham, A. S.; Shewry, P. R. Prolamin aggregation, gluten viscoelasticity, and mixing properties of transgenic wheat lines expressing 1Ax and 1Dx high molecular weight glutenin subunit transgenes. J. Agric. Food Chem. 2001, 49, 395-401.

Rooke, L.; Bekes, F.; Fido, R.; Barro, F.; Gras, P.; Tatham, A. S.; Barcelo, P.; Lazzeri, P.; Shewry, P. R. Overexpression of a gluten protein in transgenic wheat results in greatly increased dough strength. J. Cereal Sci. 1999, 30, 115-120.

Sidney J, Southwood S, Moore C, Oseroff C, Pinilla C, Grey H M, Sette A. Measurement of MHC/peptide interactions by gel filtration or monoclonal antibody capture. Curr Protoc Immunol. 2013; Chapter 18:Unit 18.3.

Sollid L M, Qiao S W, Anderson R P, Gianfrani C, Koning F. Nomenclature and listing of celiac disease relevant gluten T-cell epitopes restricted by HLA-D Q molecules. Immunogenetics. 2012; 64(6):455-60.

Srinivasan B, Focke-Tejkl M, Weber M, Pahr S, Baar A, Atreya R, Neurath M F, Vogelsang H, Huber W D, Valenta R. Usefulness of recombinant 7-gliadin 1 for identifying patients with celiac disease and monitoring adherence to a gluten-free diet. J Allergy Clin Immunol. 2015; 136(6): 1607-1618.e3.

Tonikian R, Zhang Y, Boone C, Sidhu S S. Identifying specificity profiles for peptide recognition modules from phage-displayed peptide libraries. Nat Protoc. 2007; 2(6): 1368-86.

Van den Broeck H C, van Herpen T W, Schuit C, Salentijn E M, Dekking L, Bosch D, Hamer R J, Smulders M J, Gilissen L J, van der Meer I M. Removing celiac disease-related gluten proteins from bread wheat while retaining technological properties: a study with Chinese Spring deletion lines. BMC Plant Biol. 2009 Apr. 7; 9:41.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A de-epitoped alpha gliadin polypeptide mutated compared to the corresponding wild-type gliadin polypeptide, wherein the de-epitoped gliadin polypeptide comprises the amino acid sequence as set forth in any of SEQ ID NOs: 49-58, SEQ ID NOs: 62-79, or SEQ ID NO: 113.

2. An isolated polynucleotide encoding the de-epitoped alpha gliadin polypeptide of claim 1.

3. An expression vector comprising the isolated polynucleotide of claim 2, operatively linked to a transcriptional regulatory sequence so as to allow expression of said alpha gliadin in a plant cell.

4. The expression vector of claim 3, wherein said transcriptional regulatory sequence comprises a plant promoter.

5. A cell comprising the de-epitoped alpha gliadin polypeptide of claim 1.

6. A flour derived from a non-gluten plant, comprising the de-epitoped alpha gliadin polypeptide of claim 1.

7. A dough comprising the flour of claim 6.

8. A wheat plant genetically modified to express the de-epitoped alpha gliadin polypeptide of claim 1.

* * * * *

SEQUENCE LISTING

```
<160> NUMBER OF SEQ ID NOS: 119

<210> SEQ ID NO 1
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 1

Pro Phe Pro Gln Pro Glu Leu Pro Tyr
1               5

<210> SEQ ID NO 2
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 2

Pro Tyr Pro Gln Pro Glu Leu Pro Tyr
1               5

<210> SEQ ID NO 3
<211> LENGTH: 9
<212> TYPE: PRT
<213> ORGANISM: Artificial sequence
<220> FEATURE:
```

```
<223> OTHER INFORMATION: Celiac disease-associated T cell epitopes amino
      acid sequence

<400> SEQUENCE: 3

Pro Gln Pro Glu Leu Pro Tyr Pro Gln
1               5

<210> SEQ ID NO 4
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 4

Phe Arg Pro Glu Gln Pro Tyr Pro Gln
1               5

<210> SEQ ID NO 5
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 5

Pro Gln Gln Ser Phe Pro Glu Gln Gln
1               5

<210> SEQ ID NO 6
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 6

Ile Gln Pro Glu Gln Pro Ala Gln Leu
1               5

<210> SEQ ID NO 7
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 7

Gln Gln Pro Glu Gln Pro Tyr Pro Gln
1               5

<210> SEQ ID NO 8
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 8

Ser Gln Pro Glu Gln Glu Phe Pro Gln
1               5
```

```
<210> SEQ ID NO 9
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 9

Pro Gln Pro Glu Gln Glu Phe Pro Gln
1               5

<210> SEQ ID NO 10
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 10

Gln Gln Pro Glu Gln Pro Phe Pro Gln
1               5

<210> SEQ ID NO 11
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 11

Pro Gln Pro Glu Gln Pro Phe Cys Gln
1               5

<210> SEQ ID NO 12
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 12

Gln Gln Pro Phe Pro Glu Gln Pro Gln
1               5

<210> SEQ ID NO 13
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 13

Pro Phe Pro Gln Pro Glu Gln Pro Phe
1               5

<210> SEQ ID NO 14
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 14
```

```
Pro Gln Pro Glu Gln Pro Phe Pro Trp
1               5

<210> SEQ ID NO 15
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 15

Pro Phe Ser Glu Gln Glu Gln Pro Val
1               5

<210> SEQ ID NO 16
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 16

Phe Ser Gln Gln Gln Glu Ser Pro Phe
1               5

<210> SEQ ID NO 17
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 17

Pro Phe Pro Gln Pro Glu Gln Pro Phe
1               5

<210> SEQ ID NO 18
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 18

Pro Gln Pro Glu Gln Pro Phe Pro Gln
1               5

<210> SEQ ID NO 19
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 19

Pro Ile Pro Glu Gln Pro Gln Pro Tyr
1               5

<210> SEQ ID NO 20
<211> LENGTH: 9
<212> TYPE: PRT
<213> ORGANISM: Artificial sequence
```

```
<220> FEATURE:
<223> OTHER INFORMATION: Celiac disease-associated T cell epitopes amino
      acid sequence

<400> SEQUENCE: 20

Pro Phe Pro Gln Pro Glu Gln Pro Phe
1               5

<210> SEQ ID NO 21
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 21

Pro Gln Pro Glu Gln Pro Phe Pro Gln
1               5

<210> SEQ ID NO 22
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 22

Pro Tyr Pro Glu Gln Glu Glu Pro Phe
1               5

<210> SEQ ID NO 23
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 23

Pro Tyr Pro Glu Gln Glu Gln Pro Phe
1               5

<210> SEQ ID NO 24
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 24

Pro Phe Ser Glu Gln Glu Gln Pro Val
1               5

<210> SEQ ID NO 25
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 25

Glu Gly Ser Phe Gln Pro Ser Gln Glu
1               5
```

```
<210> SEQ ID NO 26
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 26

Glu Gln Pro Gln Gln Pro Phe Pro Gln
1               5

<210> SEQ ID NO 27
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 27

Glu Gln Pro Gln Gln Pro Tyr Pro Glu
1               5

<210> SEQ ID NO 28
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 28

Gln Gly Tyr Tyr Pro Thr Ser Pro Gln
1               5

<210> SEQ ID NO 29
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 29

Glu Gly Ser Phe Gln Pro Ser Gln Glu
1               5

<210> SEQ ID NO 30
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence

<400> SEQUENCE: 30

Pro Gln Gln Ser Phe Pro Glu Gln Glu
1               5

<210> SEQ ID NO 31
<211> LENGTH: 9
<212> TYPE: PRT
<213> ORGANISM: Artificial sequence
<220> FEATURE:
<223> OTHER INFORMATION: Celiac disease-associated T cell epitopes amino
      acid sequence
```

<400> SEQUENCE: 31

Gln Gly Tyr Tyr Pro Thr Ser Pro Gln
1               5

<210> SEQ ID NO 32
<211> LENGTH: 290
<212> TYPE: PRT
<213> ORGANISM: Artificial sequence
<220> FEATURE:
<223> OTHER INFORMATION: alpha gliadin polypeptide amino acid sequence
<220> FEATURE:
<221> NAME/KEY: MISC_FEATURE
<222> LOCATION: (66)..(66)
<223> OTHER INFORMATION: may be deamidated
<220> FEATURE:
<221> NAME/KEY: MISC_FEATURE
<222> LOCATION: (73)..(73)
<223> OTHER INFORMATION: may be deamidated
<220> FEATURE:
<221> NAME/KEY: MISC_FEATURE
<222> LOCATION: (80)..(80)
<223> OTHER INFORMATION: may be deamidated

<400> SEQUENCE: 32

Met Val Arg Val Pro Val Pro Gln Leu Gln Pro Gln Asn Pro Ser Gln
1               5                   10                  15

Gln Gln Pro Gln Glu Gln Val Pro Leu Val Gln Gln Gln Gln Phe Pro
                20                  25                  30

Gly Gln Gln Gln Pro Phe Pro Pro Gln Gln Pro Tyr Pro Gln Pro Gln
            35                  40                  45

Pro Phe Pro Ser Gln Gln Pro Tyr Leu Gln Leu Gln Pro Phe Pro Gln
    50                  55                  60

Pro Gln Leu Pro Tyr Pro Gln Pro Gln Leu Pro Tyr Pro Gln Pro Gln
65                  70                  75                  80

Leu Pro Tyr Pro Gln Pro Gln Phe Arg Pro Gln Gln Pro Tyr Pro
                85                  90                  95

Gln Ser Gln Pro Gln Tyr Ser Gln Pro Gln Gln Pro Ile Ser Gln Gln
                100                 105                 110

Gln Gln Gln Gln Gln Gln Gln Gln Gln Lys Gln Gln Gln Gln
                115                 120                 125

Gln Gln Gln Ile Leu Gln Gln Ile Leu Gln Gln Leu Ile Pro Cys
130                 135                 140

Arg Asp Val Val Leu Gln Gln His Ser Ile Ala Tyr Gly Ser Ser Gln
145                 150                 155                 160

Val Leu Gln Gln Ser Thr Tyr Gln Leu Val Gln Gln Leu Cys Cys Gln
                165                 170                 175

Gln Leu Trp Gln Ile Pro Glu Gln Ser Arg Cys Gln Ala Ile His Asn
            180                 185                 190

Val Val His Ala Ile Ile Leu His Gln Gln Gln Gln Gln Gln Gln Gln
        195                 200                 205

Gln Gln Gln Gln Pro Leu Ser Gln Val Ser Phe Gln Gln Pro Gln Gln
    210                 215                 220

Gln Tyr Pro Ser Gly Gln Gly Ser Phe Gln Pro Ser Gln Gln Asn Pro
225                 230                 235                 240

Gln Ala Gln Gly Ser Val Gln Pro Gln Gln Leu Pro Gln Phe Glu Glu
                245                 250                 255

Ile Arg Asn Leu Ala Leu Glu Thr Leu Pro Ala Met Cys Asn Val Tyr
                260                 265                 270

Ile Pro Pro Tyr Cys Thr Ile Ala Pro Val Gly Ile Phe Gly Thr Asn

Tyr Arg
    290

<210> SEQ ID NO 33
<211> LENGTH: 33
<212> TYPE: PRT
<213> ORGANISM: Artificial sequence
<220> FEATURE:
<223> OTHER INFORMATION: wild type epitope amino acid sequence

<400> SEQUENCE: 33

Leu Gln Leu Gln Pro Phe Pro Gln Pro Gln Leu Pro Tyr Pro Gln Pro
1               5                   10                  15

Gln Leu Pro Tyr Pro Gln Pro Gln Leu Pro Tyr Pro Gln Pro Gln Pro
            20                  25                  30

Phe

<210> SEQ ID NO 34
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 34

Leu Gln Leu Gln Pro Phe Pro Gln Pro Gln Leu Pro Tyr Pro Gln
1               5                   10                  15

<210> SEQ ID NO 35
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 35

Leu Gln Leu Gln Pro Phe Pro Gln Pro Glu Leu Pro Tyr Pro Gln
1               5                   10                  15

<210> SEQ ID NO 36
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 36

Leu Gln Leu Gln Pro Phe Pro His Pro Glu Leu Ser Tyr Ser Gln
1               5                   10                  15

<210> SEQ ID NO 37
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 37

Leu Gln Leu Gln Pro Phe Asp Gln Pro Arg Leu Pro Trp Pro Gln
1               5                   10                  15

```
<210> SEQ ID NO 38
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 38

Leu Gln Leu Gln Pro Phe Trp Gln Pro Lys Leu Pro Gly Pro Gln
1               5                   10                  15

<210> SEQ ID NO 39
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 39

Gln Leu Pro Tyr Pro Gln Pro Gln Leu Pro Tyr Pro Gln Pro Gln
1               5                   10                  15

<210> SEQ ID NO 40
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 40

Glu Leu Pro Tyr Pro Gln Pro Glu Leu Pro Tyr Pro Gln Pro Gln
1               5                   10                  15

<210> SEQ ID NO 41
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 41

His Leu Pro Tyr Pro Gln Pro Glu Leu Arg Tyr Ser Gln Pro Gln
1               5                   10                  15

<210> SEQ ID NO 42
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 42

Met Leu Arg Tyr Pro Gln Pro Trp Leu Pro Tyr Pro Gln Pro Gln
1               5                   10                  15

<210> SEQ ID NO 43
<211> LENGTH: 15
<212> TYPE: PRT
<213> ORGANISM: Artificial sequence
<220> FEATURE:
<223> OTHER INFORMATION: modified alpha gliadin peptides amino acid
      sequence
```

```
<400> SEQUENCE: 43

Lys Leu Pro Tyr Pro Gln Gly Arg Leu Pro Gly Pro Gln Pro Gln
1               5                   10                  15

<210> SEQ ID NO 44
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 44

Pro Tyr Pro Gln Pro Gln Leu Pro Tyr Pro Gln Pro Gln Pro Phe
1               5                   10                  15

<210> SEQ ID NO 45
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 45

Pro Tyr Pro Gln Pro Glu Leu Pro Tyr Pro Gln Pro Gln Pro Phe
1               5                   10                  15

<210> SEQ ID NO 46
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 46

Pro Tyr Pro His Pro Arg Leu Pro Tyr Thr Gln Pro Gln Pro Phe
1               5                   10                  15

<210> SEQ ID NO 47
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 47

Pro Tyr Ser Gln Pro Glu Ser Pro Tyr Met Gln Pro Gln Pro Phe
1               5                   10                  15

<210> SEQ ID NO 48
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 48

Pro Tyr Pro His Pro Trp Leu Arg Gly Pro Gln Pro Gln Pro Phe
1               5                   10                  15

<210> SEQ ID NO 49
<211> LENGTH: 33
<212> TYPE: PRT
```

<213> ORGANISM: Artificial sequence
<220> FEATURE:
<223> OTHER INFORMATION: modified alpha gliadin peptides amino acid
      sequence

<400> SEQUENCE: 49

Leu Gln Leu Gln Pro Phe Pro Gln Pro His Leu Phe Pro Pro Gln Pro
1               5                   10                  15

Met Leu Asn Tyr Thr Gln Pro His Leu Pro Gly Pro Gln Pro Gln Pro
                20                  25                  30

Phe

<210> SEQ ID NO 50
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 50

Leu Gln Leu Gln Pro Phe Pro Gln Pro Pro Leu Pro Tyr Gly Gln Pro
1               5                   10                  15

Pro Leu Pro Tyr Gly Gln Ala Pro Leu Pro Tyr Gly Gln Ala Pro Pro
                20                  25                  30

Phe

<210> SEQ ID NO 51
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 51

Leu Gln Leu Gln Pro Phe Pro Gln Pro His Leu Phe Pro Ser Gln Pro
1               5                   10                  15

His Leu Ser Tyr Ser Gln Pro His Leu Pro Gly Pro Gln Pro Gln Pro
                20                  25                  30

Phe

<210> SEQ ID NO 52
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 52

Leu Gln Leu Gln Pro Phe Pro Gln Pro Leu Pro Ser Gly Gln Pro
1               5                   10                  15

Met Leu Asn Tyr Thr Gln Pro Pro Leu Pro Tyr Gly Gln Ala Pro Pro
                20                  25                  30

Phe

<210> SEQ ID NO 53
<211> LENGTH: 33
<212> TYPE: PRT
<213> ORGANISM: Artificial sequence
<220> FEATURE:
<223> OTHER INFORMATION: modified alpha gliadin peptides amino acid -continued sequence

<400> SEQUENCE: 53

Leu Gln Leu Gln Pro Phe Pro Gln Pro Pro Leu Pro Ile Gly Gln Pro
1               5                   10                  15

Lys Leu Phe Tyr Ser Gln Pro Pro Leu Pro Tyr Gly Gln Ala Pro Pro
            20                  25                  30

Phe

<210> SEQ ID NO 54
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 54

Leu Gln Leu Gln Pro Phe Pro Gln Pro Pro Leu Pro Ile Gly Gln Pro
1               5                   10                  15

Lys Leu Ser Tyr Pro Gln Pro His Leu Pro Gly Pro Gln Pro Gln Pro
            20                  25                  30

Phe

<210> SEQ ID NO 55
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 55

Leu Gln Leu Gln Pro Phe Pro Gln Pro His Leu Phe Ile Pro Gln Pro
1               5                   10                  15

Lys Leu Phe Tyr Ser Gln Pro His Leu Pro Gly Pro Gln Pro Gln Pro
            20                  25                  30

Phe

<210> SEQ ID NO 56
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 56

Leu Gln Leu Gln Pro Phe Pro Gln Pro His Leu Phe Pro Met Gln Pro
1               5                   10                  15

His Leu Ser Tyr Ser Gln Pro His Leu Pro Gly Pro Gln Pro Gln Pro
            20                  25                  30

Phe

<210> SEQ ID NO 57
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 57

Leu Gln Leu Gln Pro Phe Pro Gln Pro Pro Leu Pro Tyr Met Gln Pro
1               5                   10                  15

His Leu Pro Tyr Ser Gln Pro Pro Leu Pro Tyr Gly Gln Ala Pro Pro
                20                  25                  30

Phe

<210> SEQ ID NO 58
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 58

Leu Gln Leu Gln Pro Phe Pro Gln Pro Pro Leu Pro Tyr Ser Gln Pro
1               5                   10                  15

His Arg Pro Tyr His Gln Pro His Arg Pro Tyr His Gln Pro Gln Pro
                20                  25                  30

Phe

<210> SEQ ID NO 59
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 59

Leu Gln Leu Gln Pro Phe Pro Gln Pro His Leu Phe Pro Pro Gln
1               5                   10                  15

<210> SEQ ID NO 60
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 60

Gln Lys Pro Tyr Arg Gln Pro Lys Leu Pro Tyr Pro Gln Pro Gln
1               5                   10                  15

<210> SEQ ID NO 61
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 61

Gln Leu Pro Tyr Ser Gln Pro His Arg Pro Tyr His Gln Pro Gln
1               5                   10                  15

<210> SEQ ID NO 62
<211> LENGTH: 15
<212> TYPE: PRT
<213> ORGANISM: Artificial sequence
<220> FEATURE:
<223> OTHER INFORMATION: modified alpha gliadin peptides amino acid
      sequence

```
<400> SEQUENCE: 62

Leu Gln Leu Gln Pro Phe Pro Gln Pro His Leu Phe Pro Pro Gln
1               5                   10                  15

<210> SEQ ID NO 63
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 63

Leu Gln Leu Gln Ser Phe Pro Gln Pro His Leu Pro Gly Pro Gln
1               5                   10                  15

<210> SEQ ID NO 64
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 64

Leu Gln Leu Gln Pro Phe Pro Gln Pro Pro Leu Pro Tyr Gly Gln
1               5                   10                  15

<210> SEQ ID NO 65
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 65

Leu Gln Leu Gln Pro Phe Pro Gln Pro His Leu Pro Gly Gly Gln
1               5                   10                  15

<210> SEQ ID NO 66
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 66

Pro Gln Pro Gln Leu Phe Pro Gln Pro His Pro Phe Pro Pro Gln
1               5                   10                  15

<210> SEQ ID NO 67
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 67

Gln Lys Pro Tyr Arg Gln Pro Lys Leu Pro Tyr Pro Gln Pro Gln
1               5                   10                  15

<210> SEQ ID NO 68
<211> LENGTH: 15
<212> TYPE: PRT
```

-continued

```
<213> ORGANISM: Artificial sequence
<220> FEATURE:
<223> OTHER INFORMATION: modified alpha gliadin peptides amino acid
      sequence

<400> SEQUENCE: 68

Gln Leu Pro Tyr Ser Gln Pro His Arg Pro Tyr His Gln Pro Gln
1               5                   10                  15

<210> SEQ ID NO 69
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 69

His Leu Pro Gly Pro Gln Pro His Leu Ser Tyr Pro Gln Pro His
1               5                   10                  15

<210> SEQ ID NO 70
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 70

His Leu Pro Gly Gly Gln Pro His Leu Pro Gly Gly Gln Pro His
1               5                   10                  15

<210> SEQ ID NO 71
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 71

His Pro Phe Pro Pro Gln Pro His Pro Phe Pro Pro Gln Pro His
1               5                   10                  15

<210> SEQ ID NO 72
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 72

Thr Leu Pro Ser Pro Gln Pro Thr Leu Gly Tyr Gly Gln Pro Thr
1               5                   10                  15

<210> SEQ ID NO 73
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 73

Ser Leu Pro Met Pro Gln Pro Ser Leu Arg Tyr Arg Gln Pro Ser
1               5                   10                  15
```

<210> SEQ ID NO 74
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 74

Ser Tyr Pro Gln Pro His Leu Pro Gly Pro Gln Pro Glu Pro Phe
1               5                   10                  15

<210> SEQ ID NO 75
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 75

Pro Tyr Pro Gln Pro Pro Leu Pro Tyr Gly Gln Ala Pro Pro Phe
1               5                   10                  15

<210> SEQ ID NO 76
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 76

Pro Tyr Ser Gln Pro His Arg Pro Tyr His Gln Pro Gln Pro Phe
1               5                   10                  15

<210> SEQ ID NO 77
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 77

Pro Tyr Arg Gln Pro Lys Leu Pro Tyr Arg Gln Pro Gln Pro Phe
1               5                   10                  15

<210> SEQ ID NO 78
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 78

Pro Gly Gly Gln Pro His Leu Pro Gly Gly Gln Pro Gln Pro Phe
1               5                   10                  15

<210> SEQ ID NO 79
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 79

Phe Pro Pro Gln Pro His Pro Phe Pro Gln Pro Gln Pro Phe
1               5                   10                  15

<210> SEQ ID NO 80
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 80

Pro Gln Pro Phe Pro Pro Leu Pro Tyr Pro Gln Pro Gln Ser Phe
1               5                   10                  15

<210> SEQ ID NO 81
<211> LENGTH: 318
<212> TYPE: PRT
<213> ORGANISM: Artificial sequence
<220> FEATURE:
<223> OTHER INFORMATION: Alpha gliadin from wheat cultivar Chinese
      Spring

<400> SEQUENCE: 81

Met Lys Thr Phe Leu Ile Leu Ala Leu Val Ala Thr Thr Ala Ala Thr
1               5                   10                  15

Ala Val Arg Val Pro Val Pro Gln Leu Gln Pro Lys Asn Pro Ser Gln
                20                  25                  30

Gln Gln Pro Gln Glu Gln Val Pro Leu Val Gln Gln Gln Gln Phe Pro
            35                  40                  45

Gly Gln Gln Gln Phe Pro Pro Gln Gln Pro Tyr Pro Gln Pro Gln
50                  55                  60

Pro Phe Pro Ser Gln Gln Pro Tyr Leu Gln Leu Gln Pro Phe Pro Gln
65                  70                  75                  80

Pro Gln Pro Phe Leu Pro Gln Leu Pro Tyr Pro Gln Pro Gln Ser Phe
                85                  90                  95

Pro Pro Gln Gln Pro Tyr Pro Gln Gln Arg Pro Lys Tyr Leu Gln Pro
            100                 105                 110

Gln Gln Pro Ile Ser Gln Gln Gln Ala Gln Gln Gln Gln Gln Gln
            115                 120                 125

Gln Gln Gln Gln Gln Gln Gln Gln Gln Arg Gln Gln Ile Leu Gln
            130                 135                 140

Gln Ile Leu Gln Gln Gln Leu Ile Pro Cys Arg Asp Val Val Leu Gln
145                 150                 155                 160

Gln His Asn Ile Ala His Ala Ser Ser Gln Val Leu Gln Gln Ser Thr
                165                 170                 175

Tyr Gln Leu Leu Gln Gln Leu Cys Cys Gln Gln Leu Leu Gln Ile Pro
            180                 185                 190

Glu Gln Ser Arg Cys Gln Ala Ile His Asn Val Val His Ala Ile Ile
            195                 200                 205

Met His Gln Gln Glu Gln Gln Gln Leu Gln Gln Gln Gln Gln
            210                 215                 220

Gln Leu Gln Gln Gln Gln Gln Gln Gln Gln Gln Gln Pro Ser
225                 230                 235                 240

Ser Gln Val Ser Phe Gln Gln Pro Gln Arg Gln Tyr Pro Ser Ser Gln
                245                 250                 255

```
Val Ser Phe Gln Pro Ser Gln Leu Asn Pro Gln Ala Gln Gly Ser Val
            260                 265                 270

Gln Pro Gln Gln Leu Pro Gln Phe Ala Glu Ile Arg Asn Leu Ala Leu
        275                 280                 285

Gln Thr Leu Pro Ala Met Cys Asn Val Tyr Ile Pro Pro His Cys Ser
290                 295                 300

Thr Thr Ile Ala Pro Phe Gly Ile Phe Gly Thr Asn Tyr Arg
305                 310                 315
```

<210> SEQ ID NO 82
<211> LENGTH: 318
<212> TYPE: PRT
<213> ORGANISM: Artificial sequence
<220> FEATURE:
<223> OTHER INFORMATION: Alpha gliadin from wheat cultivar Cheyenne

<400> SEQUENCE: 82

```
Met Lys Thr Phe Leu Ile Leu Ala Leu Leu Ala Ile Val Ala Thr Thr
1               5                   10                  15

Ala Thr Thr Ala Val Arg Val Pro Val Pro Gln Leu Gln Pro Gln Asn
            20                  25                  30

Pro Ser Gln Gln Gln Pro Gln Glu Gln Val Pro Leu Val Gln Gln Gln
        35                  40                  45

Gln Phe Pro Gly Gln Gln Gln Phe Pro Pro Gln Gln Pro Tyr Pro
    50                  55                  60

Gln Pro Gln Pro Phe Pro Ser Gln Gln Pro Tyr Leu Gln Leu Gln Pro
65                  70                  75                  80

Phe Pro Gln Pro Gln Pro Phe Pro Pro Leu Pro Tyr Pro Gln Pro Gln
                85                  90                  95

Ser Phe Pro Pro Gln Gln Pro Tyr Pro Gln Gln Gln Pro Gln Tyr Leu
            100                 105                 110

Gln Pro Gln Gln Pro Ile Ser Gln Gln Ala Gln Gln Gln Gln
            115                 120                 125

Gln Gln Gln Gln Gln Gln Gln Gln Ile Leu Gln Gln Ile Leu
130                 135                 140

Gln Gln Gln Leu Ile Pro Cys Arg Asp Val Val Leu Gln His Asn
145                 150                 155                 160

Ile Ala His Ala Ser Ser Gln Val Leu Gln Gln Ser Thr Tyr Gln Leu
                165                 170                 175

Leu Gln Gln Leu Cys Cys Gln Gln Leu Leu Gln Ile Pro Glu Gln Ser
            180                 185                 190

Gln Cys Gln Ala Ile His Asn Val Ala His Ala Ile Met His Gln
        195                 200                 205

Gln Gln Gln Gln Gln Gln Glu Gln Lys Gln Gln Leu Gln Gln Gln Gln
210                 215                 220

Gln Gln Gln Gln Gln Leu Gln Gln Gln Gln Gln Gln Gln Gln
225                 230                 235                 240

Pro Ser Ser Gln Val Ser Phe Gln Gln Pro Gln Gln Gln Tyr Pro Ser
                245                 250                 255

Ser Gln Val Ser Phe Gln Pro Ser Gln Leu Asn Pro Gln Ala Gln Gly
            260                 265                 270

Ser Val Gln Pro Gln Gln Leu Pro Gln Phe Ala Glu Ile Arg Asn Leu
        275                 280                 285

Ala Leu Gln Thr Leu Pro Ala Met Cys Asn Val Tyr Ile Pro Pro His
    290                 295                 300
```

```
Cys Ser Thr Thr Ile Ala Pro Phe Gly Ile Ser Gly Thr Asn
305                 310                 315
```

<210> SEQ ID NO 83
<211> LENGTH: 293
<212> TYPE: PRT
<213> ORGANISM: Artificial sequence
<220> FEATURE:
<223> OTHER INFORMATION: Alpha gliadin CS-2 isolate

<400> SEQUENCE: 83

```
Val Arg Val Pro Val Pro Gln Leu Gln Pro Gln Asn Pro Ser Gln Gln
1               5                   10                  15

Gln Pro Gln Glu Gln Val Pro Leu Val Gln Gln Gln Gln Phe Pro Gly
            20                  25                  30

Gln Gln Gln Gln Phe Pro Pro Gln Gln Pro Tyr Pro Gln Pro Gln Pro
        35                  40                  45

Phe Pro Ser Gln Gln Pro Tyr Leu Gln Leu Gln Pro Phe Pro Gln Pro
    50                  55                  60

Gln Pro Phe Pro Pro Gln Leu Pro Tyr Pro Gln Pro Gln Ser Phe Pro
65                  70                  75                  80

Pro Gln Gln Pro Tyr Pro Gln Gln Pro Gln Tyr Leu Gln Pro Gln
                85                  90                  95

Gln Pro Ile Ser Gln Gln Gln Ala Gln Gln Gln Gln Gln Gln Gln Gln
            100                 105                 110

Gln Gln Gln Gln Gln Gln Gln Ile Leu Gln Gln Ile Leu Gln Gln Gln
        115                 120                 125

Leu Ile Pro Cys Arg Asp Val Val Leu Gln Gln His Asn Ile Ala His
130                 135                 140

Ala Ser Ser Gln Val Leu Gln Gln Ser Thr Tyr Gln Leu Leu Gln Gln
145                 150                 155                 160

Leu Cys Cys Gln Gln Leu Leu Gln Ile Pro Glu Gln Ser Arg Cys Gln
                165                 170                 175

Ala Ile His Asn Val Ala His Ala Ile Ile Met His Gln Gln Gln Gln
            180                 185                 190

Gln Gln Gln Glu Gln Gln Gln Leu Gln Gln Gln Gln Gln Gln Gln Gln
        195                 200                 205

Leu His Gln Gln Arg Gln Gln Pro Ser Ser Gln Val Ser Phe Gln Gln
210                 215                 220

Pro Gln Gln Gln Tyr Pro Ser Ser Gln Val Ser Phe Gln Pro Ser Gln
225                 230                 235                 240

Leu Asn Pro Gln Ala Gln Gly Ser Val Gln Pro Gln Gln Leu Pro Gln
                245                 250                 255

Phe Ala Glu Ile Arg Asn Leu Ala Leu Gln Thr Leu Pro Ala Met Cys
            260                 265                 270

Asn Val Tyr Ile Pro Pro His Cys Ser Thr Thr Ile Ala Pro Phe Gly
        275                 280                 285

Ile Phe Gly Thr Asn
    290
```

<210> SEQ ID NO 84
<211> LENGTH: 279
<212> TYPE: PRT
<213> ORGANISM: Artificial sequence
<220> FEATURE:
<223> OTHER INFORMATION: Alpha gliadin from wheat cultivar Chinese
      Spring -continued

<400> SEQUENCE: 84

Met Lys Thr Phe Leu Ile Leu Ala Leu Leu Ala Ile Val Ala Thr Thr
1               5                   10                  15

Ala Thr Thr Ala Val Arg Val Pro Val Pro Gln Leu Gln Pro Gln Asn
            20                  25                  30

Pro Ser Lys Gln Gln Ser Gln Glu Gln Val Pro Leu Val Gln Gln Gln
        35                  40                  45

Gln Phe Leu Gly Gln Gln Gln Pro Phe Pro Pro Gln Gln Pro Tyr Pro
    50                  55                  60

Gln Pro Gln Pro Phe Pro Ser Gln Gln Pro Tyr Leu Gln Leu Gln Pro
65                  70                  75                  80

Phe Pro Gln Pro Gln Leu Pro Tyr Ser Gln Pro Gln Pro Phe Arg Pro
                85                  90                  95

Gln Gln Pro Tyr Pro Gln Pro Gln Pro Gln Tyr Ser Gln Pro Gln Glu
            100                 105                 110

Pro Ile Ser Gln Gln Gln Gln Gln Gln Gln Gln Gln Gln Gln Ile Leu
        115                 120                 125

Gln Gln Ile Leu Gln Gln Gln Leu Ile Pro Cys Met Asp Val Val Leu
    130                 135                 140

Gln Gln His Asn Ile Ala His Gly Arg Ser Gln Val Leu Gln Gln Ser
145                 150                 155                 160

Thr Tyr Gln Leu Leu Gln Glu Leu Cys Cys Gln His Leu Trp Gln Ile
                165                 170                 175

Pro Glu Gln Ser Gln Cys Gln Ala Ile Gln Asn Val Val Asn Ala Ile
            180                 185                 190

Ile Leu His Gln Gln Lys Gln Gln Gln Pro Ser Ser Gln Val
        195                 200                 205

Ser Phe Gln Gln Pro Leu Gln Gln Tyr Pro Leu Gly Gln Gly Ser Phe
    210                 215                 220

Arg Pro Ser Gln Gln Asn Pro Gln Asp Gln Gly Ser Val Gln Pro Gln
225                 230                 235                 240

Gln Leu Pro Gln Phe Glu Glu Ile Arg Asn Leu Ala Leu Gln Thr Leu
                245                 250                 255

Pro Ala Met Cys Asn Val Tyr Ile Pro Pro Tyr Cys Thr Ile Ala Pro
            260                 265                 270

Phe Gly Ile Phe Gly Thr Asn
        275

<210> SEQ ID NO 85
<211> LENGTH: 306
<212> TYPE: PRT
<213> ORGANISM: Artificial sequence
<220> FEATURE:
<223> OTHER INFORMATION: Alpha gliadin from wheat cultivar Chinese
      Spring

<400> SEQUENCE: 85

Met Lys Thr Phe Leu Ile Leu Ala Leu Leu Ala Ile Val Ala Thr Thr
1               5                   10                  15

Ala Thr Thr Ala Val Arg Val Pro Val Pro Gln Leu Gln Pro Gln Asn
            20                  25                  30

Pro Ser Gln Gln Gln Pro Gln Glu Gln Val Pro Leu Val Gln Gln Gln
        35                  40                  45

Gln Phe Leu Gly Gln Gln Gln Pro Phe Pro Pro Gln Gln Pro Tyr Pro
    50                  55                  60

Gln Pro Gln Pro Phe Pro Ser Gln Gln Pro Tyr Leu Gln Leu Gln Pro
65                  70                  75                  80

Phe Pro Gln Pro Gln Leu Pro Tyr Ser Gln Pro Gln Pro Phe Arg Pro
                85                  90                  95

Gln Gln Pro Tyr Pro Gln Pro Gln Pro Gln Tyr Ser Gln Leu Gln Gln
            100                 105                 110

Pro Ile Ser Gln Gln Gln Gln Gln Gln Gln Gln Gln Gln Gln Gln Gln
        115                 120                 125

Gln Gln Gln Gln Gln Gln Gln Gln Gln Gln Gln Gln Gln Gln Gln Gln
    130                 135                 140

Gln Gln Gln Gln Gln Glu Gln Gln Ile Leu Gln Gln Ile Leu Gln Gln
145                 150                 155                 160

Gln Leu Ile Pro Cys Met Asp Val Val Leu Gln Gln His Asn Ile Ala
                165                 170                 175

His Gly Arg Ser Gln Val Leu Gln Gln Ser Thr Tyr Gln Leu Leu Gln
            180                 185                 190

Glu Leu Cys Cys Gln His Leu Trp Gln Ile Pro Glu Gln Ser Gln Cys
        195                 200                 205

Gln Ala Ile His Asn Val Val His Ala Ile Ile Leu His Gln Gln Gln
    210                 215                 220

Lys Gln Gln Gln Gln Pro Ser Ser Gln Val Ser Phe Gln Gln Pro
225                 230                 235                 240

Gln Gln Gln Tyr Pro Leu Gly Gln Gly Ser Phe Arg Pro Ser Gln Gln
                245                 250                 255

Asn Pro Gln Ala Gln Gly Ser Val Gln Pro Gln Gln Leu Pro Gln Phe
            260                 265                 270

Glu Glu Ile Arg Asn Leu Ala Leu Gln Thr Leu Pro Ala Met Cys Asn
        275                 280                 285

Val Tyr Ile Pro Pro Tyr Cys Thr Ile Val Pro Phe Gly Ile Phe Gly
    290                 295                 300

Thr Asn
305

<210> SEQ ID NO 86
<211> LENGTH: 287
<212> TYPE: PRT
<213> ORGANISM: Artificial sequence
<220> FEATURE:
<223> OTHER INFORMATION: Alpha gliadin from wheat cultivar Chinese
      Spring

<400> SEQUENCE: 86

Met Lys Thr Phe Leu Ile Leu Val Leu Leu Ala Ile Val Ala Thr Thr
1               5                   10                  15

Ala Pro Thr Ala Val Arg Phe Pro Val Pro Gln Leu Gln Pro Gln Asn
                20                  25                  30

Pro Ser Gln Gln Leu Pro Gln Glu Gln Val Pro Leu Val Gln Gln Gln
            35                  40                  45

Gln Phe Leu Gly Gln Gln Pro Phe Pro Gln Gln Pro Tyr Pro
    50                  55                  60

Gln Pro Gln Phe Pro Ser Gln Leu Pro Tyr Leu Gln Leu Gln Pro Phe
65                  70                  75                  80

Pro Gln Pro Gln Leu Pro Tyr Ser Gln Pro Gln Pro Phe Arg Pro Gln
                85                  90                  95

Gln Pro Tyr Pro Gln Pro Gln Pro Gln Tyr Ser Gln Pro Gln Gln Pro
            100                 105                 110

-continued

```
Ile Ser Gln Gln Gln Gln Gln Gln Gln Gln Gln Gln Gln Gln
        115                 120                 125

Gln Gln Gln Gln Gln Ile Leu Gln Gln Ile Leu Gln Gln Leu Ile
    130                 135                 140

Pro Cys Met Asp Val Val Leu Gln Gln His Asn Lys Ala His Gly Arg
145                 150                 155                 160

Ser Gln Val Leu Gln Gln Ser Thr Tyr Gln Leu Leu Arg Glu Leu Cys
                165                 170                 175

Cys Gln His Leu Trp Gln Ile Pro Glu Gln Ser Gln Cys Gln Ala Ile
            180                 185                 190

His Asn Val Val His Ala Ile Ile Leu His Gln Gln Lys Gln Gln
        195                 200                 205

Gln Gln Gln Pro Ser Ser Gln Val Ser Phe Gln Gln Pro Leu Gln Gln
    210                 215                 220

Tyr Pro Leu Gly Gln Gly Ser Phe Arg Pro Ser Gln Gln Asn Pro Gln
225                 230                 235                 240

Thr Gln Gly Ser Val Gln Pro Gln Gln Leu Pro Gln Phe Glu Glu Ile
                245                 250                 255

Arg Asn Leu Ala Leu Gln Thr Leu Pro Ser Met Cys Asn Val Tyr Ile
            260                 265                 270

Pro Pro Tyr Cys Thr Ile Ala Pro Phe Gly Ile Phe Gly Thr Asn
        275                 280                 285

<210> SEQ ID NO 87
<211> LENGTH: 298
<212> TYPE: PRT
<213> ORGANISM: Artificial sequence
<220> FEATURE:
<223> OTHER INFORMATION: Alpha gliadin from wheat cultivar Cheyenne

<400> SEQUENCE: 87

Met Lys Thr Phe Leu Ile Leu Ala Leu Leu Ala Ile Val Ala Thr Thr
1               5                   10                  15

Ala Thr Ile Ala Val Arg Val Pro Val Pro Gln Leu Gln Pro Gln Asn
            20                  25                  30

Pro Ser Gln Gln Gln Pro Gln Glu Gln Val Pro Leu Val Gln Gln Gln
        35                  40                  45

Gln Phe Pro Gly Gln Gln Gln Pro Phe Pro Pro Gln Gln Pro Tyr Pro
    50                  55                  60

Gln Pro Gln Pro Phe Pro Ser Gln Gln Pro Tyr Leu Gln Leu Gln Pro
65                  70                  75                  80

Phe Pro Gln Pro Gln Leu Pro Tyr Pro Gln Pro Gln Gln Pro Phe Pro
                85                  90                  95

Gln Pro Gln Leu Pro Tyr Ser Gln Pro Gln Pro Phe Arg Pro Gln Gln
            100                 105                 110

Pro Tyr Pro Gln Pro Gln Pro Gln Tyr Ser Gln Pro Gln Gln Pro Ile
        115                 120                 125

Ser Gln Gln Gln Gln Gln Gln Gln Gln Gln Gln Gln Gln Gln
    130                 135                 140

Gln Ile Leu Gln Gln Ile Leu Gln Gln Leu Ile Pro Cys Met Asp
145                 150                 155                 160

Val Val Leu Gln Gln His Asn Ile Ala His Gly Arg Ser Gln Val Leu
                165                 170                 175

Gln Gln Ser Thr Tyr Gln Leu Leu Gln Glu Leu Cys Cys Gln His Leu
            180                 185                 190
```

```
Trp Gln Ile Pro Glu Gln Ser Gln Cys Gln Ala Ile His Asn Val Val
        195                 200                 205
His Ala Ile Ile Leu His Gln Gln Lys Pro Gln Gln Gln Gln Pro Ser
    210                 215                 220
Ser Gln Val Ser Phe Gln Gln Pro Leu Gln Gln Tyr Pro Leu Gly Gln
225                 230                 235                 240
Gly Ser Phe Arg Pro Ser Gln Gln Asn Pro Gln Ala Arg Gly Ser Val
                245                 250                 255
Gln Pro Gln Gln Leu Pro Gln Phe Glu Glu Ile Arg Asn Leu Ala Leu
                260                 265                 270
Gln Thr Leu Pro Ala Met Cys Asn Val Tyr Ile Pro Pro Tyr Cys Thr
            275                 280                 285
Ile Ala Pro Phe Gly Ile Phe Gly Thr Asn
        290                 295
```

<210> SEQ ID NO 88
<211> LENGTH: 298
<212> TYPE: PRT
<213> ORGANISM: Artificial sequence
<220> FEATURE:
<223> OTHER INFORMATION: Alpha gliadin from wheat cultivar Conil

<400> SEQUENCE: 88

```
Met Lys Thr Phe Leu Ile Leu Ala Leu Leu Ala Ile Val Ala Thr Thr
1               5                   10                  15
Ala Thr Ile Ala Val Arg Val Pro Val Pro Gln Leu Gln Pro Gln Asn
            20                  25                  30
Pro Ser Gln Gln Gln Pro Gln Glu Gln Val Pro Leu Val Gln Gln Gln
        35                  40                  45
Gln Phe Pro Gly Gln Gln Gln Pro Phe Pro Pro Gln Gln Pro Tyr Pro
    50                  55                  60
Gln Leu Gln Pro Phe Pro Ser Gln Gln Pro Tyr Met Gln Leu Gln Pro
65                  70                  75                  80
Phe Pro Gln Pro Gln Leu Pro Tyr Pro Gln Pro Gln Leu Pro Tyr Pro
                85                  90                  95
Gln Pro Gln Pro Phe Arg Pro Gln Gln Ser Tyr Pro Gln Pro Gln Pro
                100                 105                 110
Gln Tyr Ser Gln Pro Gln Gln Pro Ile Ser Gln Gln Gln Gln Gln Gln
            115                 120                 125
Gln Gln Gln Gln Gln Gln Gln Gln Ile Leu Gln Gln Ile Leu Gln
        130                 135                 140
Gln Gln Leu Ile Pro Cys Arg Asp Val Val Leu Gln Gln His Asn Ile
145                 150                 155                 160
Ala His Gly Ser Ser Gln Val Leu Gln Glu Ser Thr Tyr Gln Leu Val
                165                 170                 175
Gln Gln Leu Arg Cys Gln Gln Leu Trp Gln Ile Pro Glu Gln Ser Arg
                180                 185                 190
Cys Gln Ala Ile His Asn Val Val His Ala Ile Ile Leu His Gln Gln
            195                 200                 205
His His His His Gln Gln Gln Gln Gln Gln Gln Gln Pro Leu
        210                 215                 220
Ser Gln Val Ser Phe Gln Gln Pro Gln Gln Tyr Pro Ser Gly Gln
225                 230                 235                 240
Gly Phe Phe Gln Pro Ser Gln Gln Asn Pro Gln Ala Gln Gly Ser Val
                245                 250                 255
```

```
Gln Pro Gln Gln Leu Pro Gln Phe Glu Glu Ile Arg Asn Leu Ala Leu
                260                 265                 270

Gln Met Leu Pro Ala Met Cys Asn Val Tyr Ile Pro Pro Tyr Cys Thr
            275                 280                 285

Ile Ala Pro Phe Gly Ile Phe Gly Thr Asn
        290                 295

<210> SEQ ID NO 89
<211> LENGTH: 299
<212> TYPE: PRT
<213> ORGANISM: Artificial sequence
<220> FEATURE:
<223> OTHER INFORMATION: Alpha gliadin from wheat cultivar Conil

<400> SEQUENCE: 89

Met Lys Thr Phe Leu Ile Leu Ala Leu Leu Ala Ile Val Ala Thr Thr
1               5                   10                  15

Ala Thr Ile Ala Val Arg Val Pro Val Pro Gln Leu Gln Pro Gln Asn
            20                  25                  30

Pro Ser Gln Gln Gln Pro Gln Glu Gln Val Pro Leu Val Gln Gln Gln
        35                  40                  45

Gln Phe Pro Gly Gln Gln Gln Pro Phe Pro Pro Gln Gln Pro Tyr Pro
    50                  55                  60

Gln Leu Gln Pro Phe Pro Ser Gln Gln Pro Tyr Met Gln Leu Gln Pro
65                  70                  75                  80

Phe Pro Gln Pro Gln Leu Pro Tyr Pro Gln Pro Gln Leu Pro Tyr Pro
                85                  90                  95

Gln Pro Gln Pro Phe Arg Pro Gln Gln Ser Tyr Pro Gln Pro Gln Pro
            100                 105                 110

Gln Tyr Ser Gln Pro Gln Gln Pro Ile Ser Gln Gln Gln Gln Gln Gln
        115                 120                 125

Gln Gln Gln Gln Gln Gln Ile Leu Gln Gln Ile Leu Gln Gln Gln
    130                 135                 140

Leu Thr Pro Cys Arg Asp Val Val Leu Gln Gln His Ser Ile Ala His
145                 150                 155                 160

Gly Ser Ser Gln Val Leu Gln Gln Ser Thr Tyr Gln Leu Val Gln Gln
                165                 170                 175

Leu Cys Cys Gln Gln Leu Trp Gln Ile Pro Glu Gln Ser Arg Cys Gln
            180                 185                 190

Ala Ile His Asn Val Val His Ala Ile Leu His Gln Gln Gln Gln
        195                 200                 205

Gln Gln Gln Gln Gln Gln Gln Gln Gln Gln Gln Gln Gln Gln Pro
    210                 215                 220

Leu Ser Gln Val Cys Ser Gln Gln Ser Gln Gln Gln Tyr Pro Ser Gly
225                 230                 235                 240

Gln Gly Ser Phe Gln Pro Ser Gln Gln Asn Pro Gln Ala Gln Gly Ser
                245                 250                 255

Val Gln Pro Gln Gln Leu Pro Gln Phe Glu Glu Ile Arg Asn Leu Ala
            260                 265                 270

Leu Glu Thr Leu Pro Ala Met Cys Asn Val Tyr Ile Pro Pro Tyr Cys
        275                 280                 285

Thr Ile Ala Pro Val Gly Ile Phe Gly Thr Asn
    290                 295

<210> SEQ ID NO 90
```

```
<211> LENGTH: 7
<212> TYPE: PRT
<213> ORGANISM: Artificial sequence
<220> FEATURE:
<223> OTHER INFORMATION: single alpha gliadin amino acid sequence

<400> SEQUENCE: 90

Gln Leu Pro Tyr Pro Gln Pro
1               5

<210> SEQ ID NO 91
<211> LENGTH: 7
<212> TYPE: PRT
<213> ORGANISM: Artificial sequence
<220> FEATURE:
<223> OTHER INFORMATION: single alpha gliadin amino acid sequence

<400> SEQUENCE: 91

Gln Leu Pro Tyr Ser Gln Pro
1               5

<210> SEQ ID NO 92
<211> LENGTH: 7
<212> TYPE: PRT
<213> ORGANISM: Artificial sequence
<220> FEATURE:
<223> OTHER INFORMATION: single alpha gliadin amino acid sequence

<400> SEQUENCE: 92

Pro Leu Pro Tyr Pro Gln Pro
1               5

<210> SEQ ID NO 93
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 93

Leu Gln Leu Gln Pro Phe Pro Gln Pro Gln Leu Pro Tyr Ser Gln Pro
1               5                   10                  15

Gln Leu Pro Tyr Pro Gln Pro Gln Leu Pro Tyr Pro Gln Pro Gln Pro
                20                  25                  30

Phe

<210> SEQ ID NO 94
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 94

Pro Gln Pro Gln Gln Phe Pro Gln Pro Gln Leu Pro Tyr Pro Gln Pro
1               5                   10                  15

Gln Leu Pro Tyr Pro Gln Pro Gln Leu Pro Tyr Pro Gln Pro Gln Pro
                20                  25                  30

Phe

<210> SEQ ID NO 95
<211> LENGTH: 32
<212> TYPE: PRT
```

<213> ORGANISM: Artificial sequence
<220> FEATURE:
<223> OTHER INFORMATION: modified alpha gliadin peptides amino acid sequence

<400> SEQUENCE: 95

Pro Gln Pro Gln Pro Phe Leu Pro Gln Leu Pro Tyr Pro Gln Pro Gln
1 5 10 15

Leu Pro Tyr Pro Gln Pro Gln Leu Pro Tyr Pro Gln Pro Gln Pro Phe
20 25 30

<210> SEQ ID NO 96
<211> LENGTH: 33
<212> TYPE: PRT
<213> ORGANISM: Artificial sequence
<220> FEATURE:
<223> OTHER INFORMATION: modified alpha gliadin peptides amino acid sequence

<400> SEQUENCE: 96

Leu Gln Leu Gln Pro Phe Pro Gln Pro Glu Leu Ser Tyr Ser Gln Pro
1 5 10 15

Glu Leu Ser Tyr Ser Gln Pro Glu Leu Ser Tyr Ser Gln Pro Gln Pro
20 25 30

Phe

<210> SEQ ID NO 97
<211> LENGTH: 22
<212> TYPE: PRT
<213> ORGANISM: Artificial sequence
<220> FEATURE:
<223> OTHER INFORMATION: modified alpha gliadin peptides amino acid sequence

<400> SEQUENCE: 97

Leu Gln Leu Gln Pro Phe Pro Gln Pro Gln Gln Pro Tyr Pro Gln Pro
1 5 10 15

Gln Leu Leu Tyr Pro Gln
20

<210> SEQ ID NO 98
<211> LENGTH: 22
<212> TYPE: PRT
<213> ORGANISM: Artificial sequence
<220> FEATURE:
<223> OTHER INFORMATION: modified alpha gliadin peptides amino acid sequence

<400> SEQUENCE: 98

Leu Gln Leu Gln Pro Phe Pro Gln Pro Gln Leu Pro Tyr Pro His Pro
1 5 10 15

Gln Leu Pro Tyr Pro Gln
20

<210> SEQ ID NO 99
<211> LENGTH: 22
<212> TYPE: PRT
<213> ORGANISM: Artificial sequence
<220> FEATURE:
<223> OTHER INFORMATION: modified alpha gliadin peptides amino acid sequence

<400> SEQUENCE: 99

Leu Gln Leu Gln Pro Phe Pro Gln Pro Gln Leu Pro Tyr Pro Gln Pro
1 5 10 15

Gln Leu Leu Tyr Pro Gln
            20

<210> SEQ ID NO 100
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 100

Leu Gln Leu Gln Pro Phe Pro Gln Leu Gln Leu Pro Tyr Pro Gln
1               5                   10                  15

<210> SEQ ID NO 101
<211> LENGTH: 16
<212> TYPE: PRT
<213> ORGANISM: Artificial sequence
<220> FEATURE:
<223> OTHER INFORMATION: modified alpha gliadin peptides amino acid
      sequence

<400> SEQUENCE: 101

Gln Leu Gln Pro Phe Pro Gln Pro Glu Leu Ser Tyr Pro Gln Pro Gln
1               5                   10                  15

<210> SEQ ID NO 102
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 102

Gln Pro Gln Glu Phe Pro Pro Glu Leu Pro Tyr Pro Gln Pro Glu
1               5                   10                  15

<210> SEQ ID NO 103
<211> LENGTH: 16
<212> TYPE: PRT
<213> ORGANISM: Artificial sequence
<220> FEATURE:
<223> OTHER INFORMATION: modified alpha gliadin peptides amino acid
      sequence

<400> SEQUENCE: 103

Gln Pro Gln Pro Phe Pro Pro Glu Leu Pro Tyr Pro Gln Thr Gln Pro
1               5                   10                  15

<210> SEQ ID NO 104
<211> LENGTH: 16
<212> TYPE: PRT
<213> ORGANISM: Artificial sequence
<220> FEATURE:
<223> OTHER INFORMATION: modified alpha gliadin peptides amino acid
      sequence

<400> SEQUENCE: 104

Gln Leu Gln Pro Phe Pro Gln Ala Glu Leu Pro Tyr Ser Gln Pro Gln
1               5                   10                  15

<210> SEQ ID NO 105
<211> LENGTH: 15
<212> TYPE: PRT
<213> ORGANISM: Artificial sequence

```
<220> FEATURE:
<223> OTHER INFORMATION: modified alpha gliadin peptides amino acid
      sequence

<400> SEQUENCE: 105

Gln Pro Gln Pro Phe Leu Pro Glu Leu Pro Tyr Pro Gln Pro Glu
1               5                   10                  15

<210> SEQ ID NO 106
<211> LENGTH: 16
<212> TYPE: PRT
<213> ORGANISM: Artificial sequence
<220> FEATURE:
<223> OTHER INFORMATION: modified alpha gliadin peptides amino acid
      sequence

<400> SEQUENCE: 106

Gln Leu Gln Pro Phe Ser Gln Pro Glu Leu Pro Tyr Ser Gln Pro Gln
1               5                   10                  15

<210> SEQ ID NO 107
<211> LENGTH: 11
<212> TYPE: PRT
<213> ORGANISM: Artificial sequence
<220> FEATURE:
<223> OTHER INFORMATION: modified alpha gliadin peptides amino acid
      sequence

<400> SEQUENCE: 107

Pro Phe Pro Gln Pro Glu Leu Pro Ala Pro Gln
1               5                   10

<210> SEQ ID NO 108
<211> LENGTH: 10
<212> TYPE: PRT
<213> ORGANISM: Artificial sequence
<220> FEATURE:
<223> OTHER INFORMATION: modified alpha gliadin peptides amino acid
      sequence

<400> SEQUENCE: 108

Gln Pro Gln Pro Gln Leu Pro Glu Gln Gln
1               5                   10

<210> SEQ ID NO 109
<211> LENGTH: 10
<212> TYPE: PRT
<213> ORGANISM: Artificial sequence
<220> FEATURE:
<223> OTHER INFORMATION: modified alpha gliadin peptides amino acid
      sequence

<400> SEQUENCE: 109

Gln Pro Gln Gln Gln Leu Pro Glu Gln Gln
1               5                   10

<210> SEQ ID NO 110
<211> LENGTH: 10
<212> TYPE: PRT
<213> ORGANISM: Artificial sequence
<220> FEATURE:
<223> OTHER INFORMATION: modified alpha gliadin peptides amino acid
      sequence

<400> SEQUENCE: 110

Gln Pro Gln Pro Ser Leu Pro Glu Gln Gln
1               5                   10
```

<210> SEQ ID NO 111
<211> LENGTH: 10
<212> TYPE: PRT
<213> ORGANISM: Artificial sequence
<220> FEATURE:
<223> OTHER INFORMATION: modified alpha gliadin peptides amino acid
      sequence

<400> SEQUENCE: 111

Gln Pro Gln Pro Gln Phe Pro Glu Gln Gln
1               5                   10

<210> SEQ ID NO 112
<211> LENGTH: 11
<212> TYPE: PRT
<213> ORGANISM: Artificial sequence
<220> FEATURE:
<223> OTHER INFORMATION: modified alpha gliadin peptides amino acid
      sequence

<400> SEQUENCE: 112

Pro Gln Pro Lys Leu Pro Tyr Pro Gln Pro Glu
1               5                   10

<210> SEQ ID NO 113
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 113

Leu Gln Leu Gln Ser Phe Pro Gln Pro His Leu Pro Gly Pro Gln Pro
1               5                   10                  15

Gln Leu Ser Tyr Pro Gln Pro His Leu Pro Gly Pro Gln Pro Gln Pro
                20                  25                  30

Phe

<210> SEQ ID NO 114
<211> LENGTH: 33
<212> TYPE: PRT
<213> ORGANISM: Artificial sequence
<220> FEATURE:
<223> OTHER INFORMATION: modified alpha gliadin peptides amino acid
      sequence

<400> SEQUENCE: 114

Leu Gln Leu Gln Pro Phe Pro Gln Pro Glu Leu Pro Tyr Pro Gln Pro
1               5                   10                  15

Glu Leu Pro Tyr Pro Gln Pro Glu Leu Pro Tyr Pro Gln Pro Gln Pro
                20                  25                  30

Phe

<210> SEQ ID NO 115
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 115

Gln Leu Arg Pro Phe Pro Gln Pro Gln Leu Pro Tyr Pro Gln Pro
1               5                   10                  15

```
<210> SEQ ID NO 116
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 116

Gln Leu Gln Pro Phe Pro His Pro Gln Leu Pro Tyr Pro Trp Pro
1               5                  10                  15

<210> SEQ ID NO 117
<211> LENGTH: 15
<212> TYPE: PRT
<213> ORGANISM: Artificial sequence
<220> FEATURE:
<223> OTHER INFORMATION: modified alpha gliadin peptides amino acid
      sequence

<400> SEQUENCE: 117

Gln Leu Gln Pro Phe Pro Gln Ala Gln Leu Pro Tyr Pro Gln Pro
1               5                  10                  15

<210> SEQ ID NO 118
<211> LENGTH: 6
<212> TYPE: PRT
<213> ORGANISM: Artificial Sequence
<220> FEATURE:
<223> OTHER INFORMATION: Meganucleases recognition sequence

<400> SEQUENCE: 118

Gly Ile Tyr Tyr Ile Gly
1               5

<210> SEQ ID NO 119
<211> LENGTH: 9
<212> TYPE: PRT
<213> ORGANISM: Artificial Sequence
<220> FEATURE:
<223> OTHER INFORMATION: Meganucleases recognition sequence

<400> SEQUENCE: 119

Leu Ala Gly Leu Ile Asp Ala Asp Gly
1               5
```